(12) United States Patent
Kikuchi et al.

(10) Patent No.: US 8,113,716 B2
(45) Date of Patent: Feb. 14, 2012

(54) BEARING WITH LUBRICATION OIL FILTER

(75) Inventors: Takashi Kikuchi, Nissin (JP); Yutaka Matsuyama, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 1006 days.

(21) Appl. No.: 12/066,934

(22) PCT Filed: Jun. 29, 2007

(86) PCT No.: PCT/IB2007/001782
§ 371 (c)(1),
(2), (4) Date: Mar. 14, 2008

(87) PCT Pub. No.: WO2008/004061
PCT Pub. Date: Jan. 10, 2008

(65) Prior Publication Data
US 2008/0253709 A1    Oct. 16, 2008

(30) Foreign Application Priority Data

Jun. 30, 2006  (JP) .................................. 2006-182635

(51) Int. Cl.
*F16C 33/10* (2006.01)
*F16C 33/66* (2006.01)
*F16C 33/02* (2006.01)

(52) U.S. Cl. ......... 384/288; 384/473; 384/322; 384/399

(58) Field of Classification Search .................. 384/250, 384/288, 290, 294, 322, 429–430, 432, 435, 384/457, 462, 468, 473, 399; 123/192.1
See application file for complete search history.

(56) References Cited

U.S. PATENT DOCUMENTS

| | | | | | |
|---|---|---|---|---|---|
| 3,321,254 | A | * | 5/1967 | Dock | 384/114 |
| 3,911,659 | A | * | 10/1975 | Mandl | 384/222 |
| 4,114,961 | A | * | 9/1978 | Pithie | 384/295 |
| 4,696,584 | A | | 9/1987 | Tielemans | |
| 4,772,136 | A | | 9/1988 | Carter | |
| 4,815,937 | A | * | 3/1989 | Aubry et al. | 416/140 |
| 5,492,416 | A | | 2/1996 | Gabelli et al. | |
| 6,312,159 | B1 | * | 11/2001 | Ishida et al. | 384/294 |
| 6,425,689 | B1 | * | 7/2002 | Herdin | 384/322 |
| 6,792,909 | B1 | * | 9/2004 | Decuir | 123/192.1 |
| 7,040,874 | B1 | * | 5/2006 | Martin et al. | 417/407 |

FOREIGN PATENT DOCUMENTS

| | | |
|---|---|---|
| EP | 1 076 186 A1 | 2/2001 |
| FR | 2711392 A1 * | 4/1995 |
| JP | 46-36341 Y | 12/1971 |
| JP | 59-99120 A | 6/1984 |
| JP | 60-114313 U | 8/1985 |
| JP | 01-117907 A | 5/1989 |
| JP | 6-74237 A | 3/1994 |
| JP | 6-323335 A | 11/1994 |
| JP | 7-293567 A | 11/1995 |
| JP | 8-42563 A | 2/1996 |

(Continued)

*Primary Examiner* — Marcus Charles
(74) *Attorney, Agent, or Firm* — Sughrue Mion, PLLC

(57) ABSTRACT

A bearing (crank bearing 6) is constituted of an upper bearing (61) that is attached to a cylinder block, a lower bearing (67) that is attached to a crank cap, and a bearing filter (71) for filtering engine oil. The bearing filter (71) is fitted in an oil hole (62A) of the upper bearing (61).

31 Claims, 68 Drawing Sheets

FOREIGN PATENT DOCUMENTS

| | | |
|---|---|---|
| JP | 8-163818 A | 6/1996 |
| JP | 9-53433 A | 2/1997 |
| JP | 2001-173634 A | 6/2001 |
| JP | 2001-241442 A | 9/2001 |
| JP | 2005-42818 A | 2/2005 |
| JP | 2005-69284 A | 3/2005 |
| SU | 875123 B * | 10/1981 |

* cited by examiner

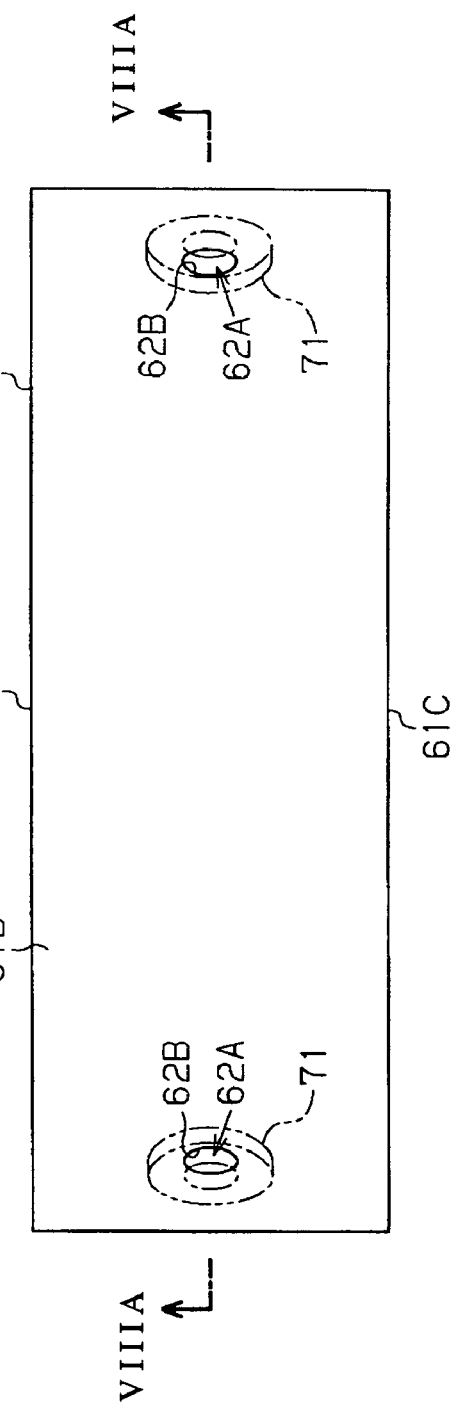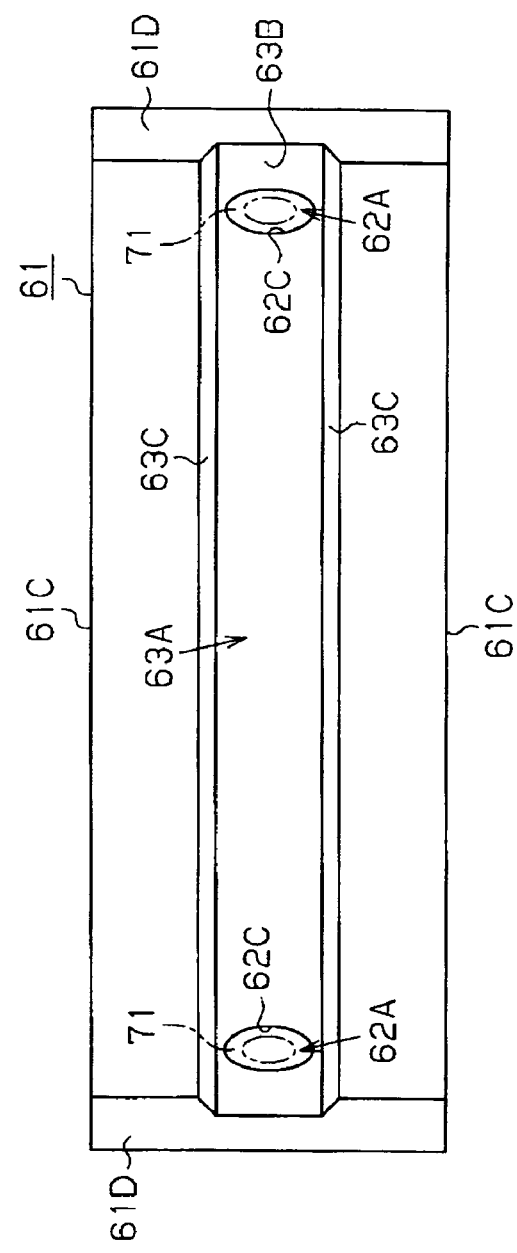
FIG. 4A
FIG. 4B

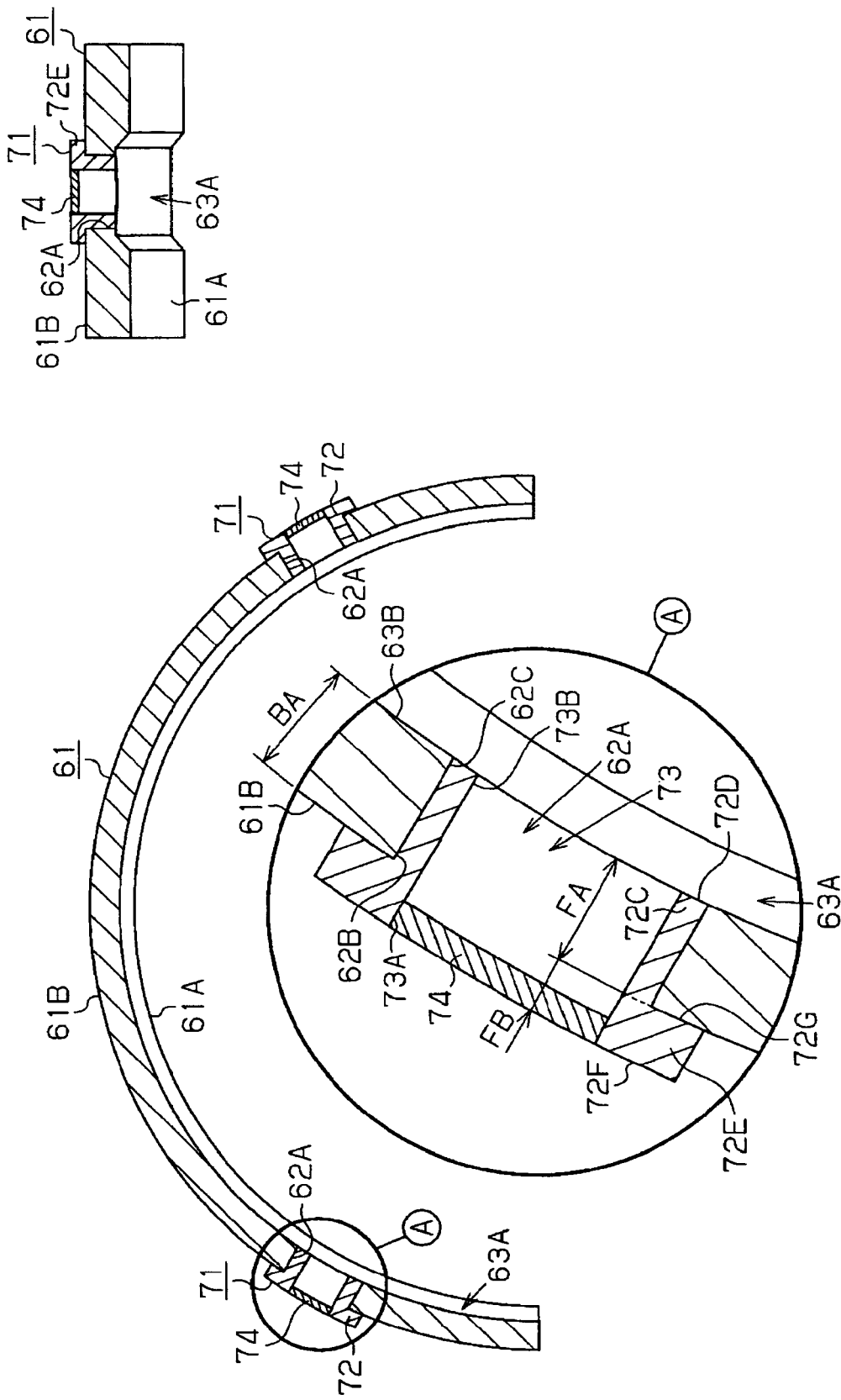

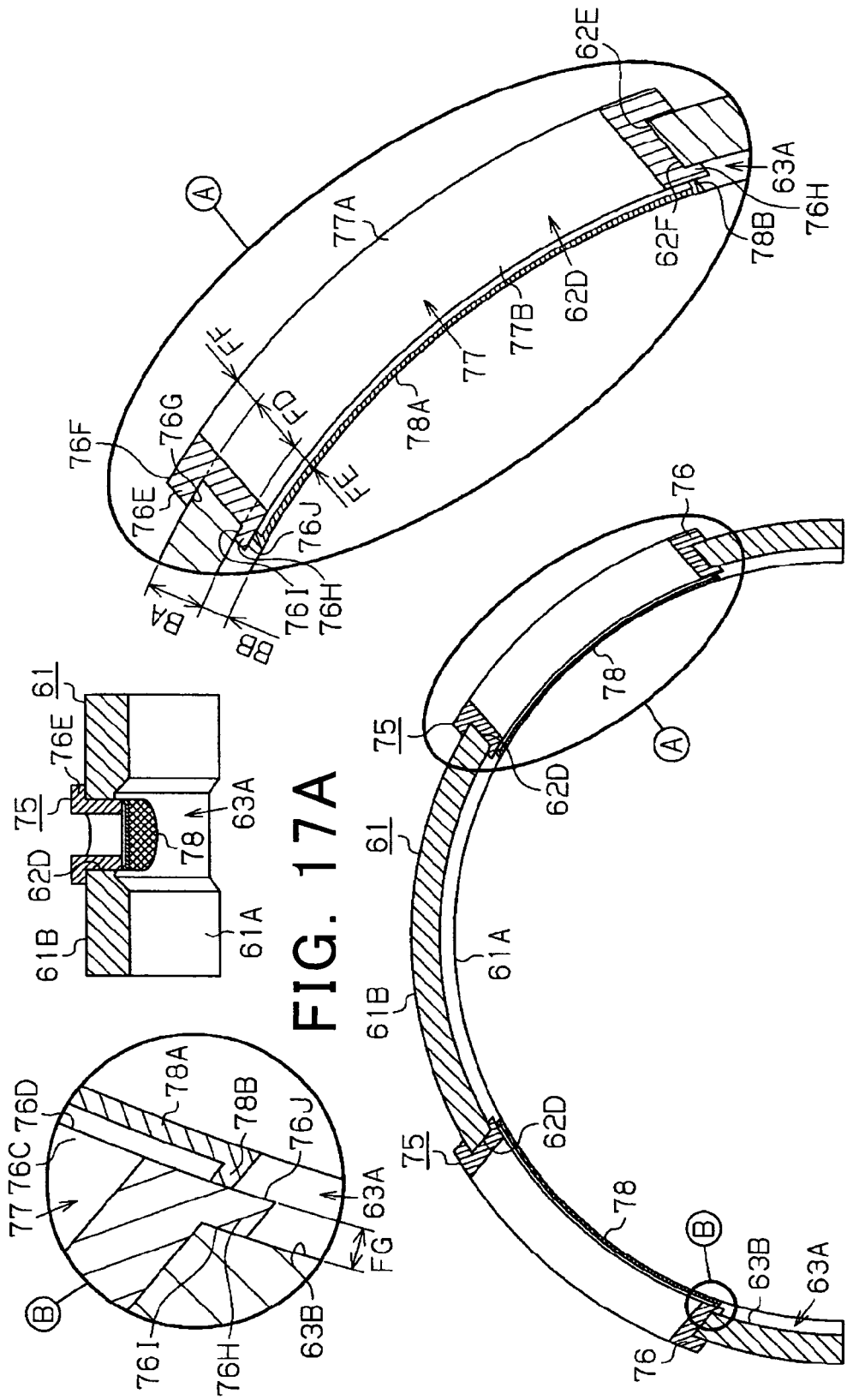

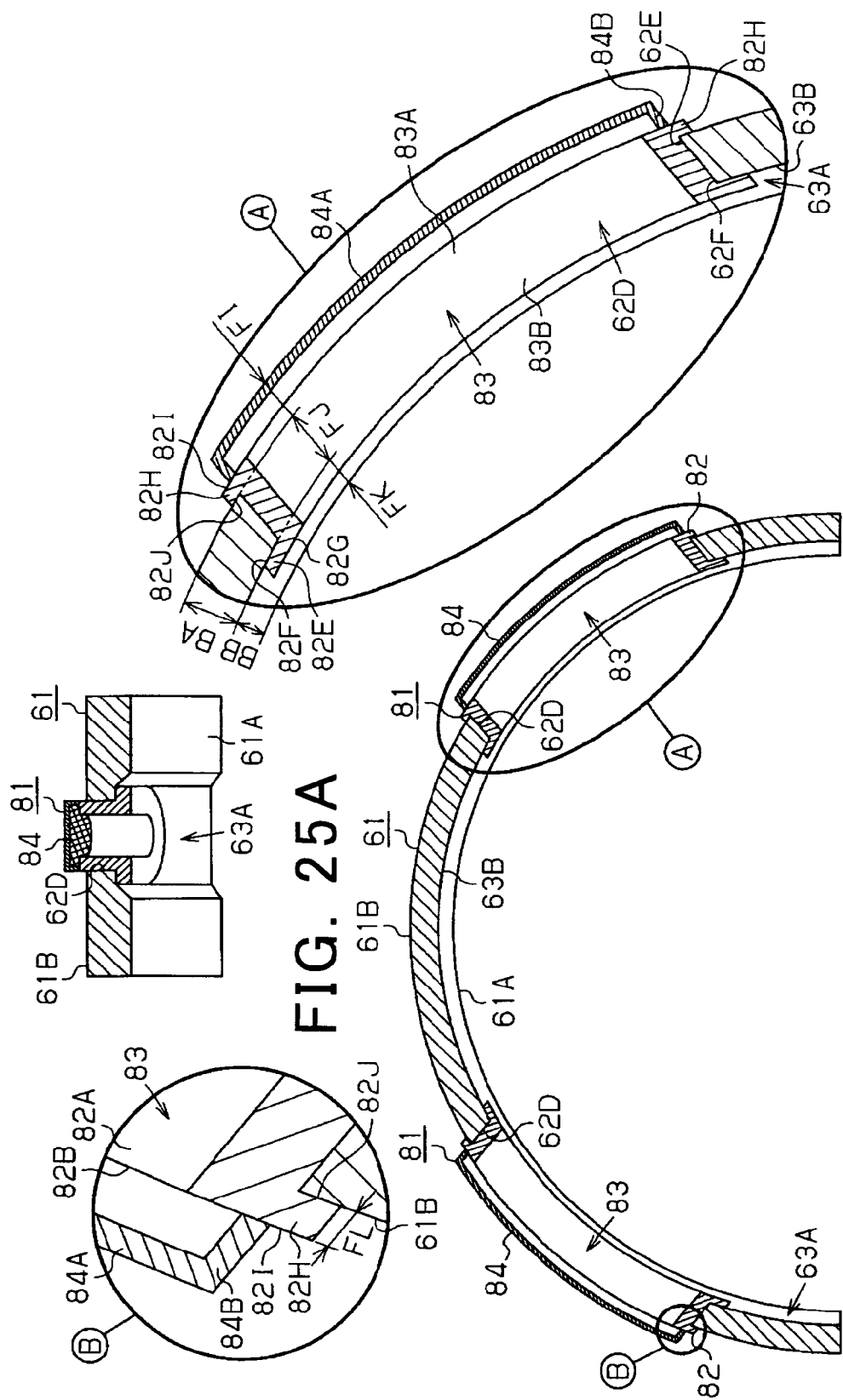

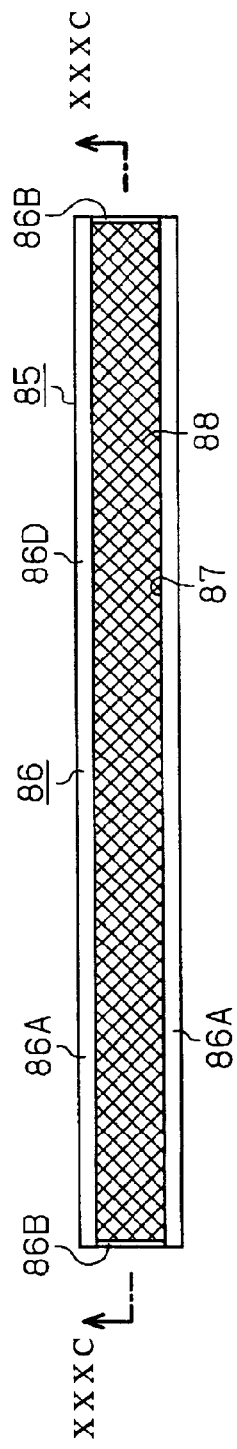
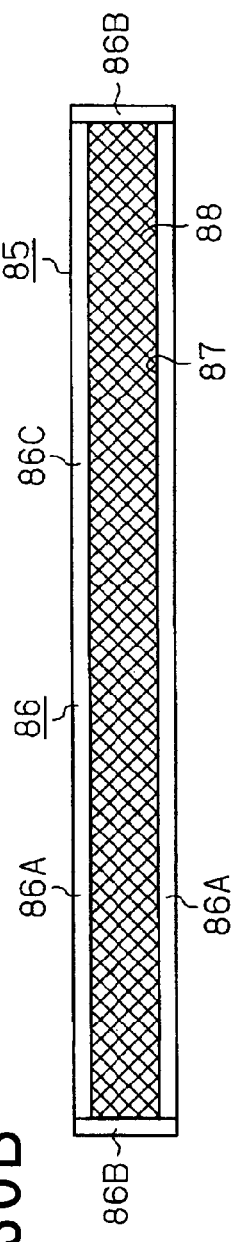
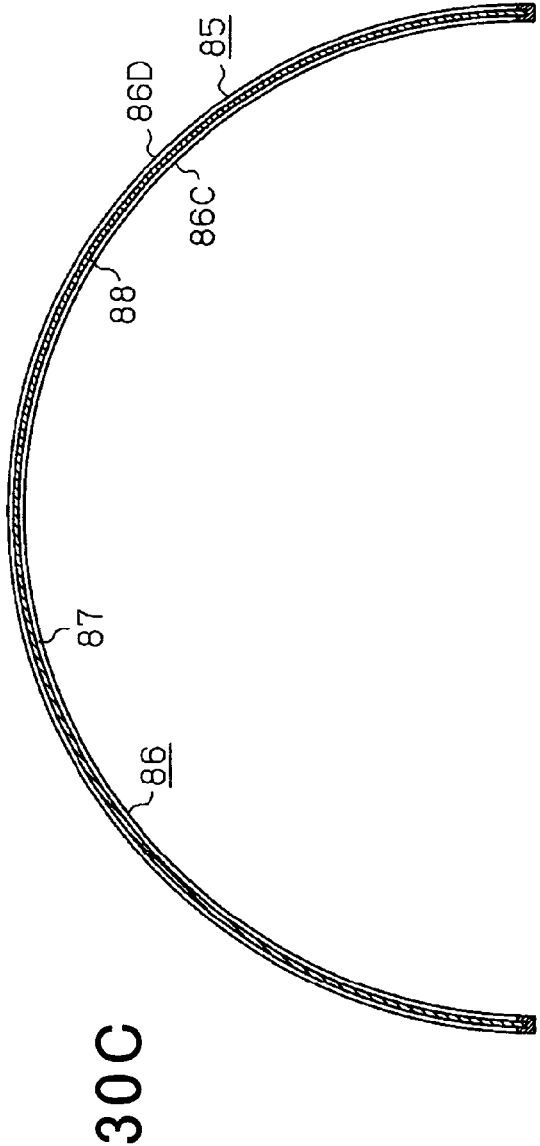
FIG. 30A
FIG. 30B
FIG. 30C

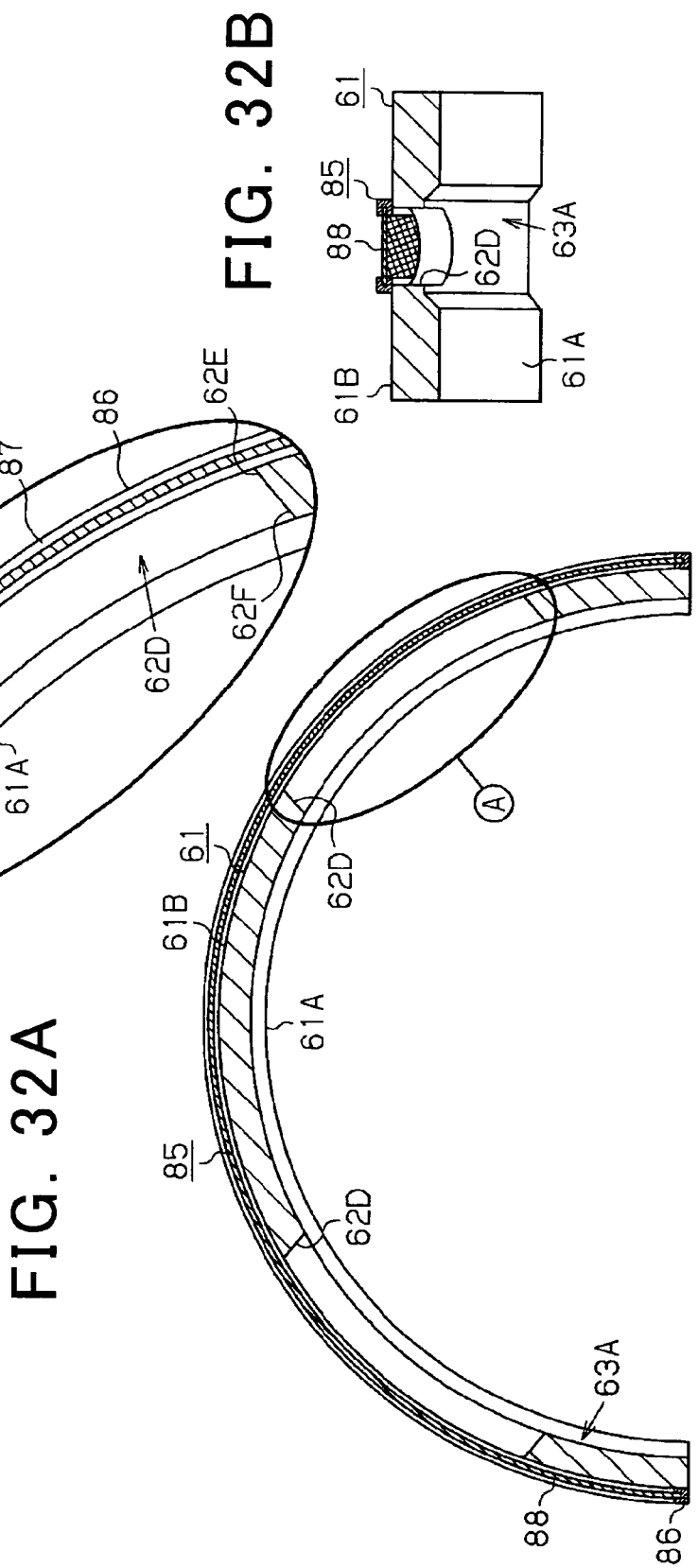

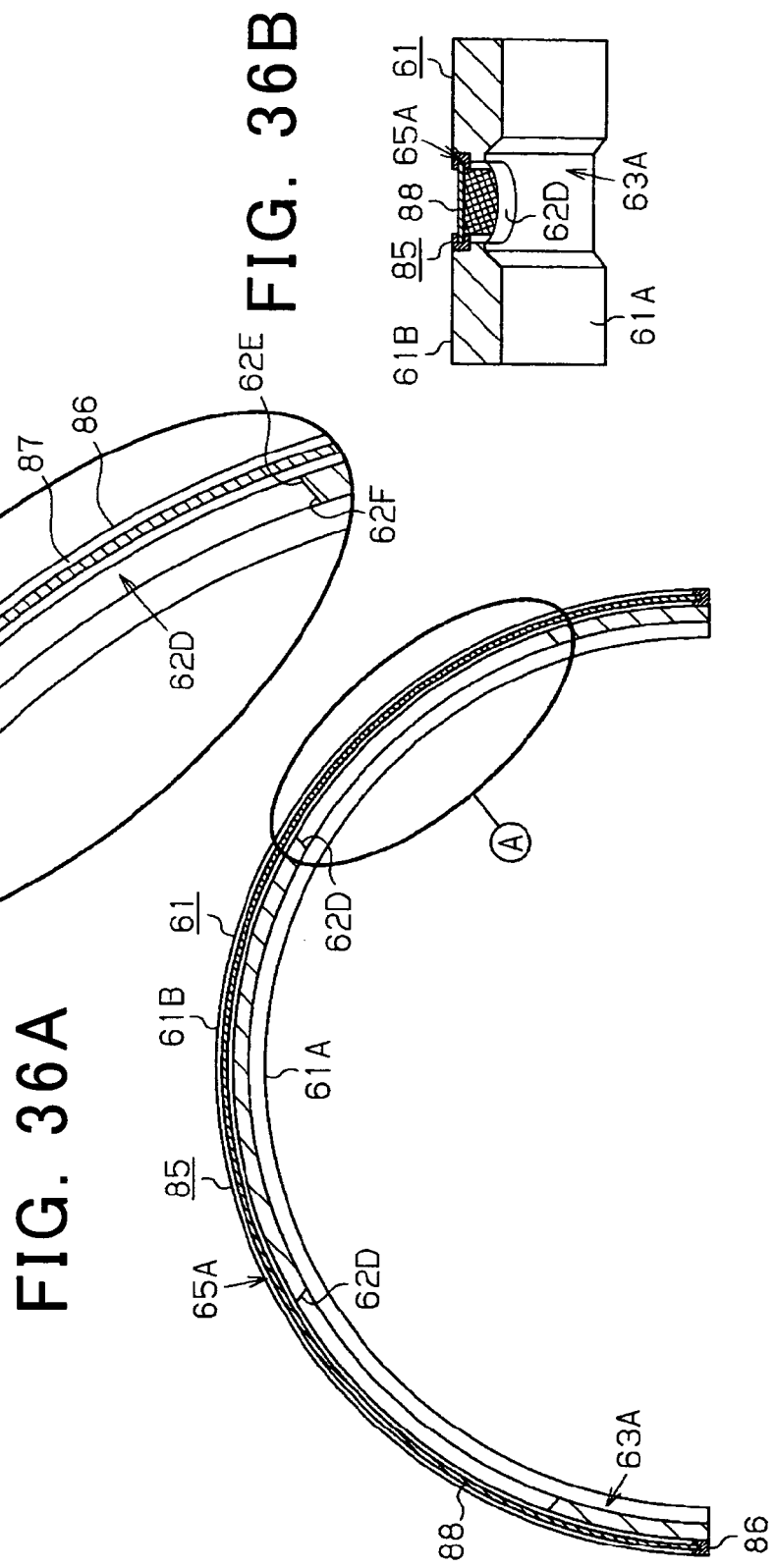

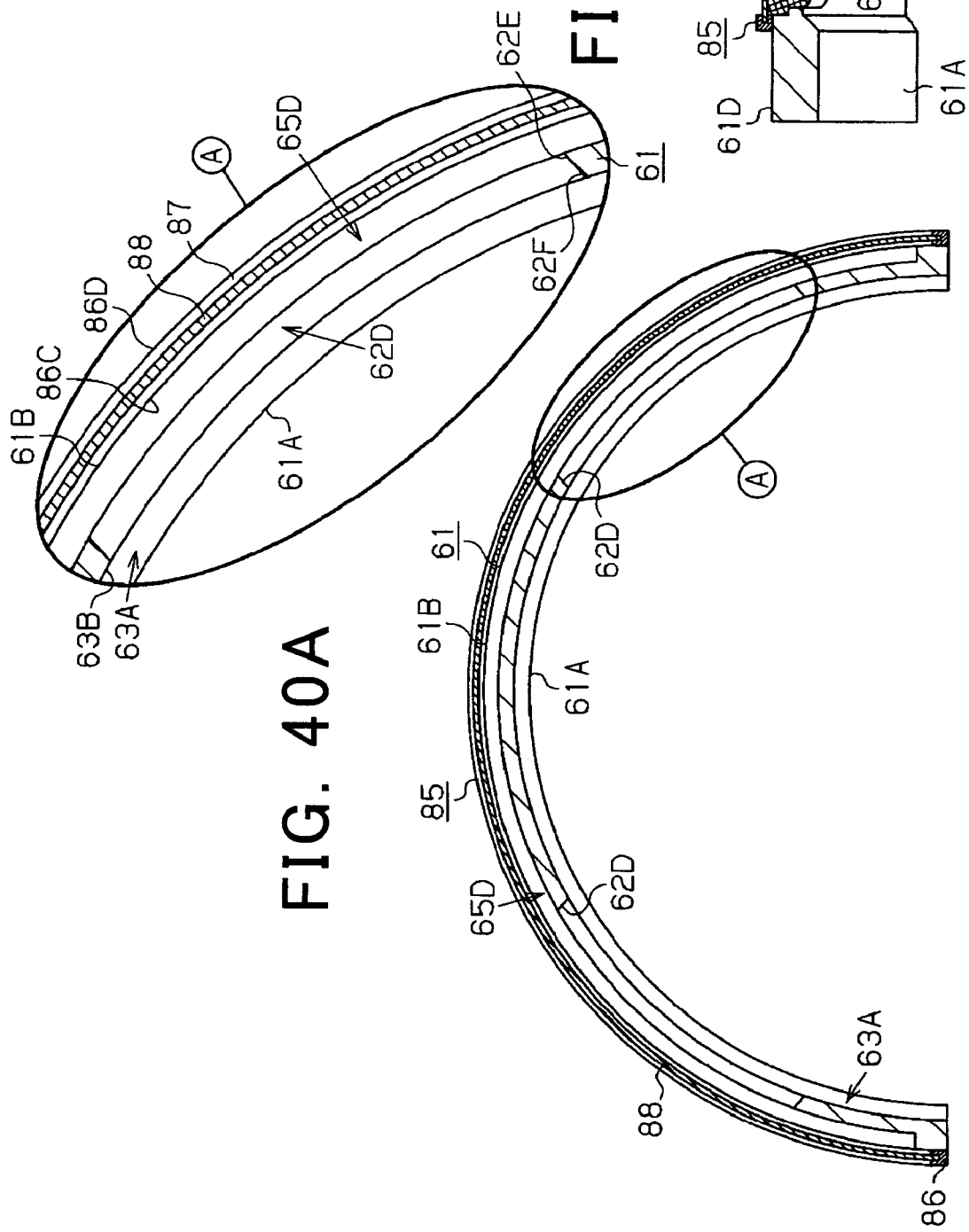

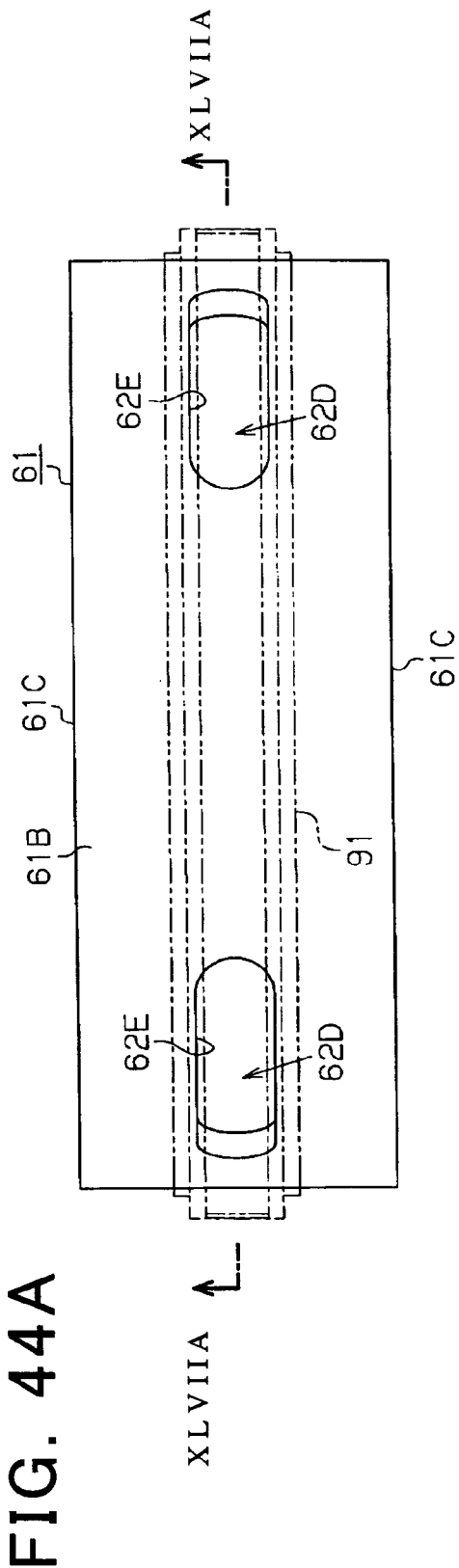
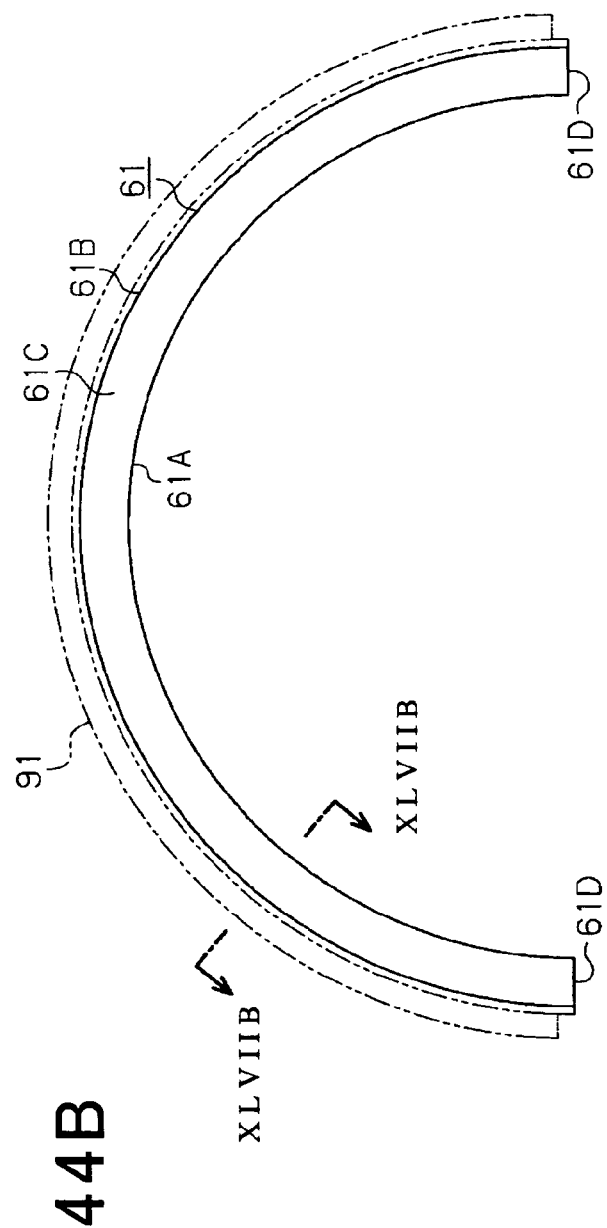
FIG. 44A
FIG. 44B

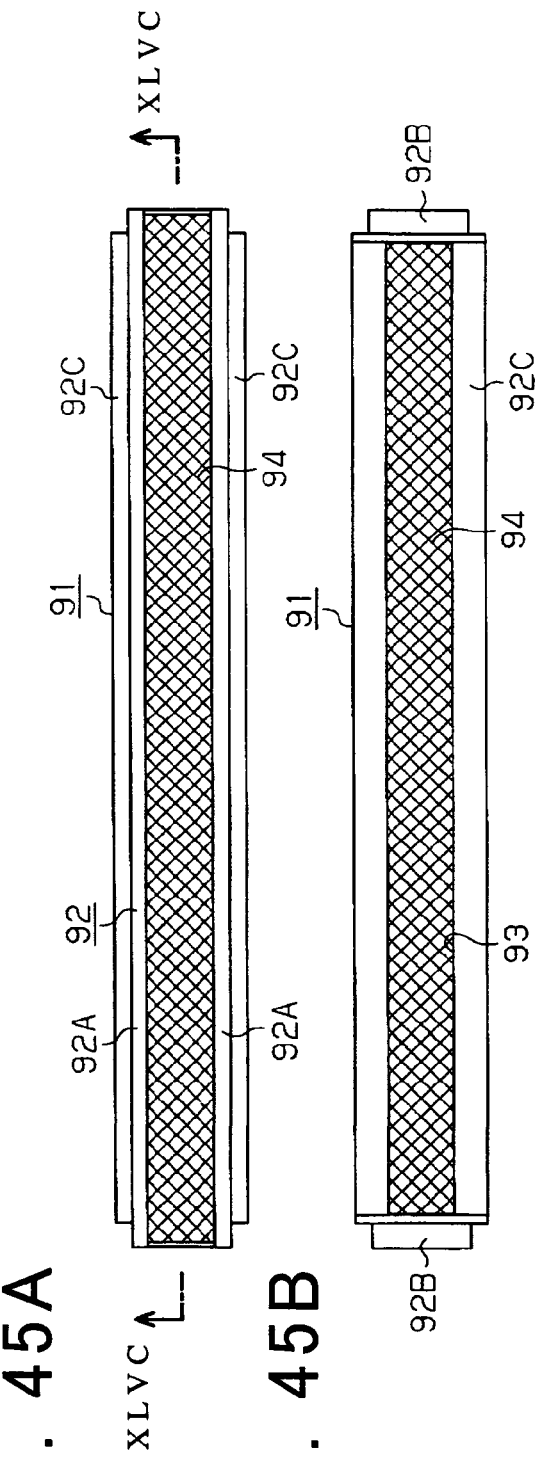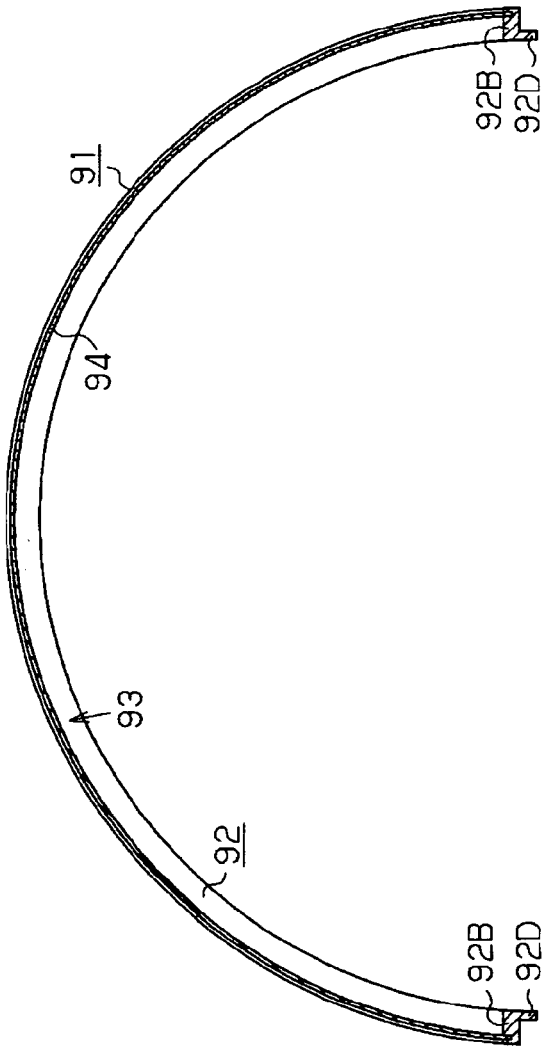
FIG. 45A
FIG. 45B
FIG. 45C

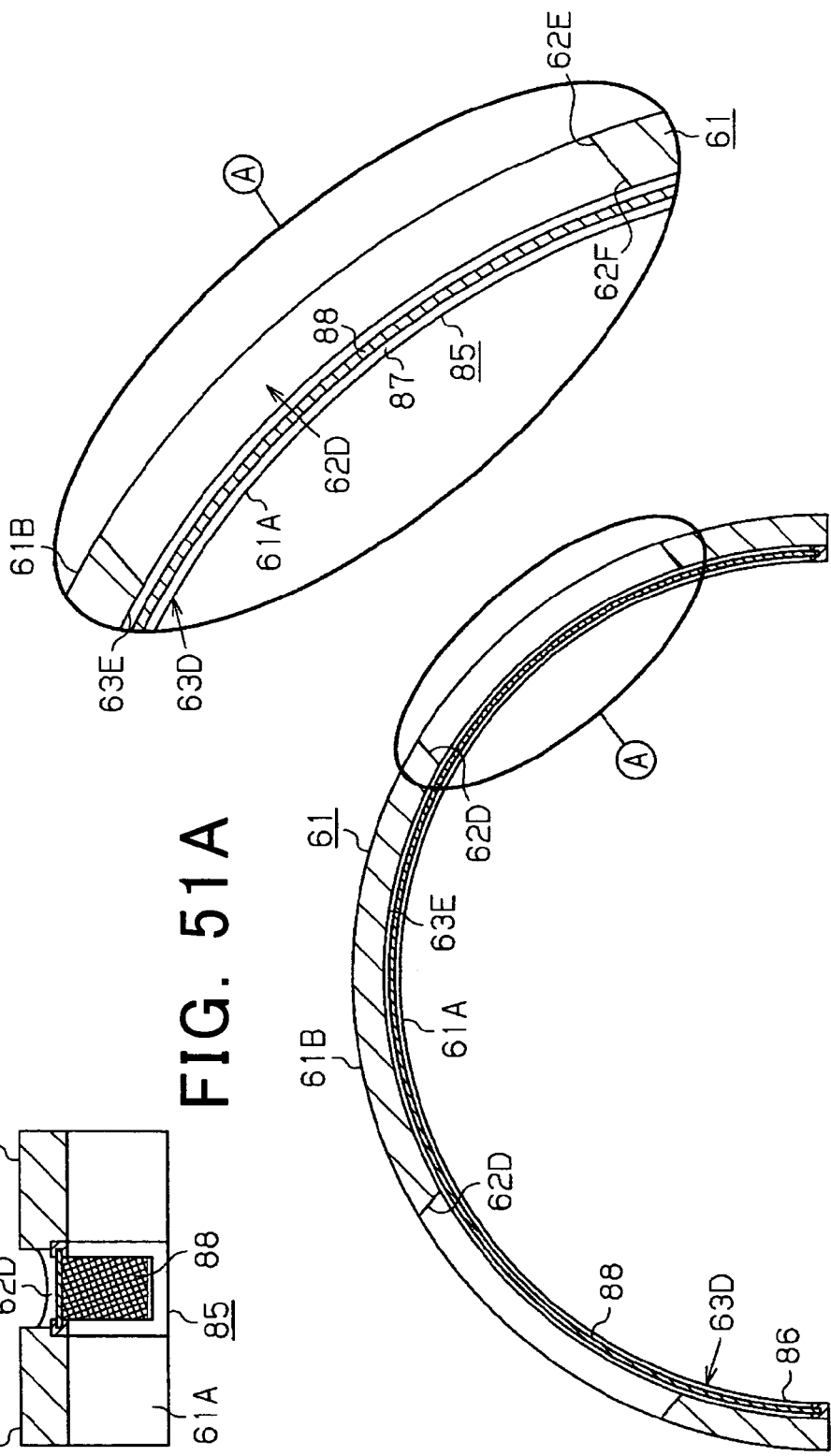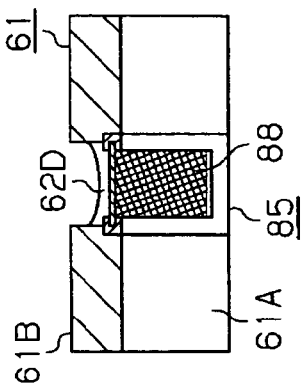

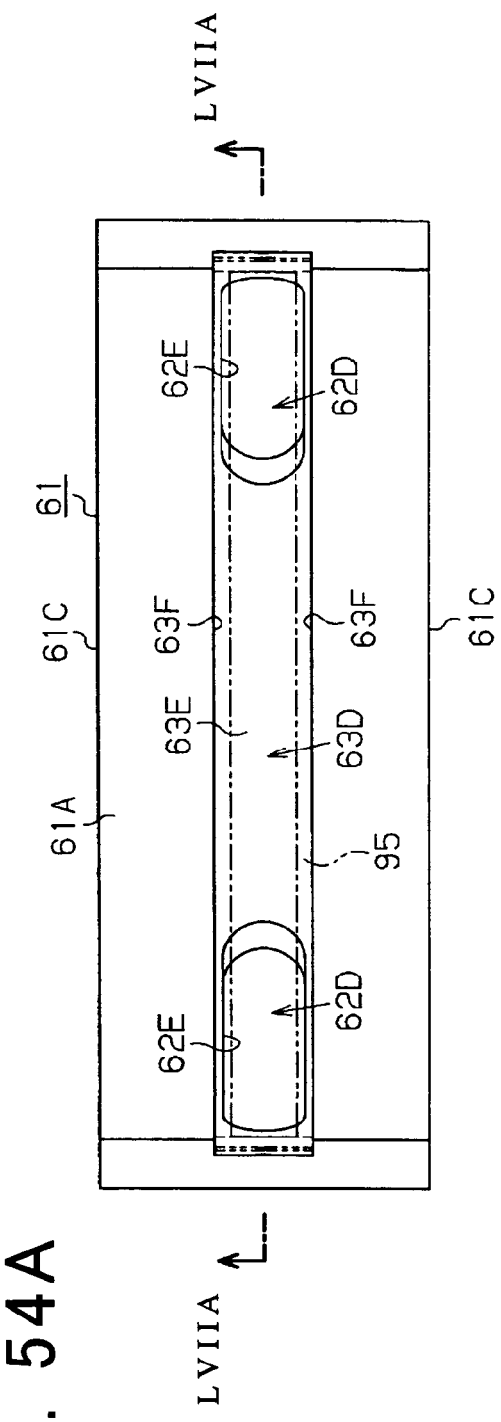
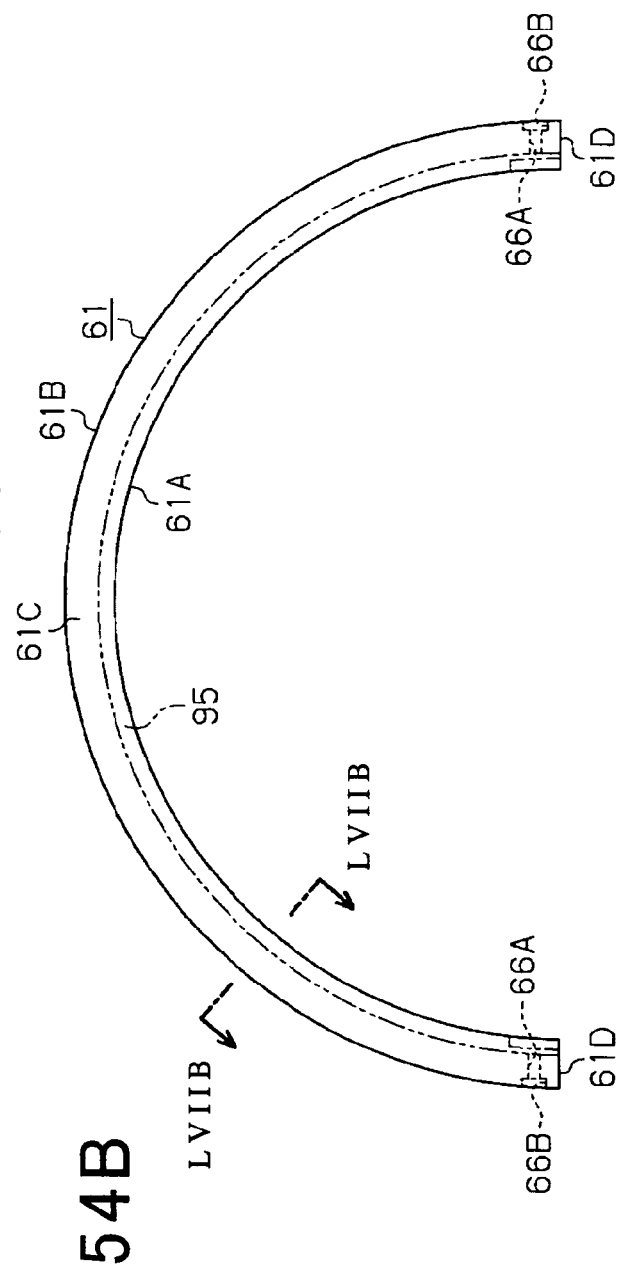
FIG. 54A
FIG. 54B

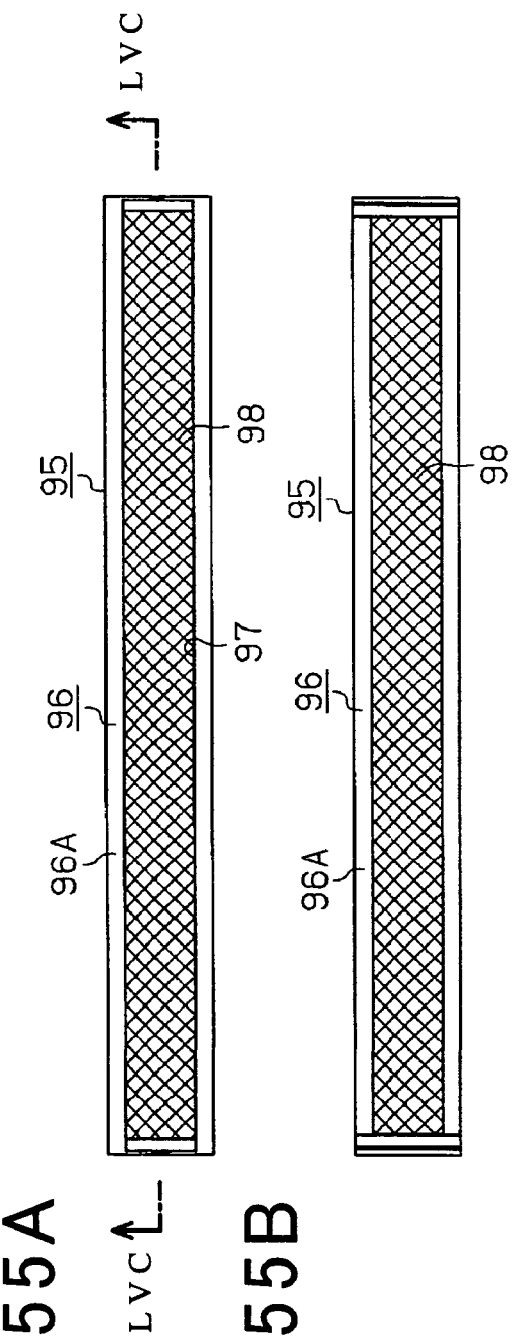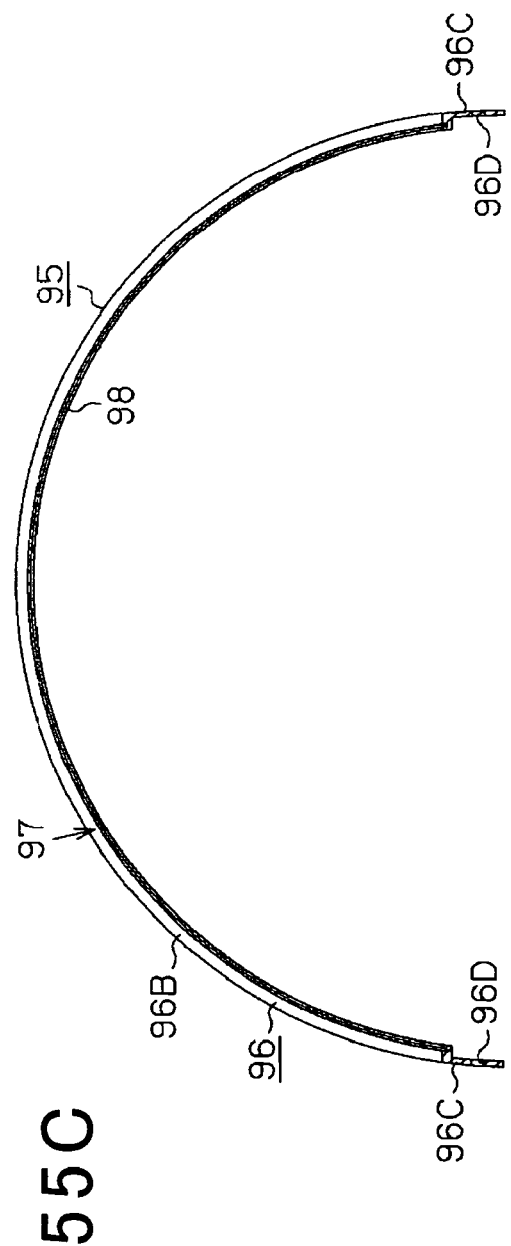
FIG. 55A  FIG. 55B  FIG. 55C

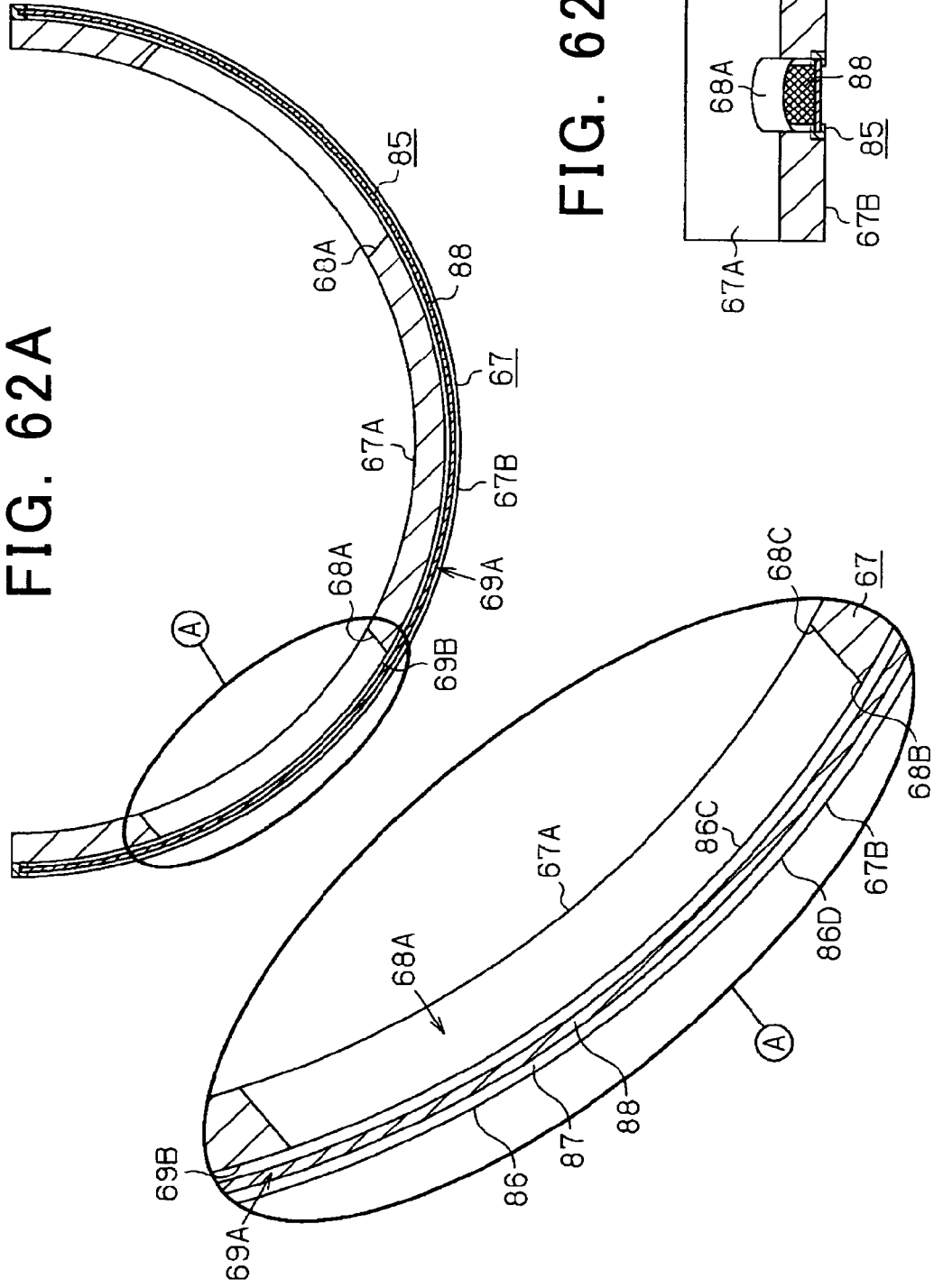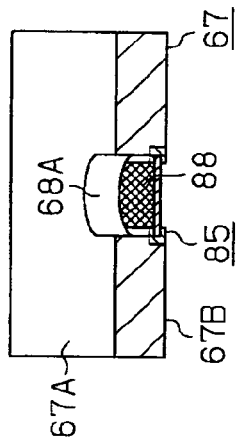

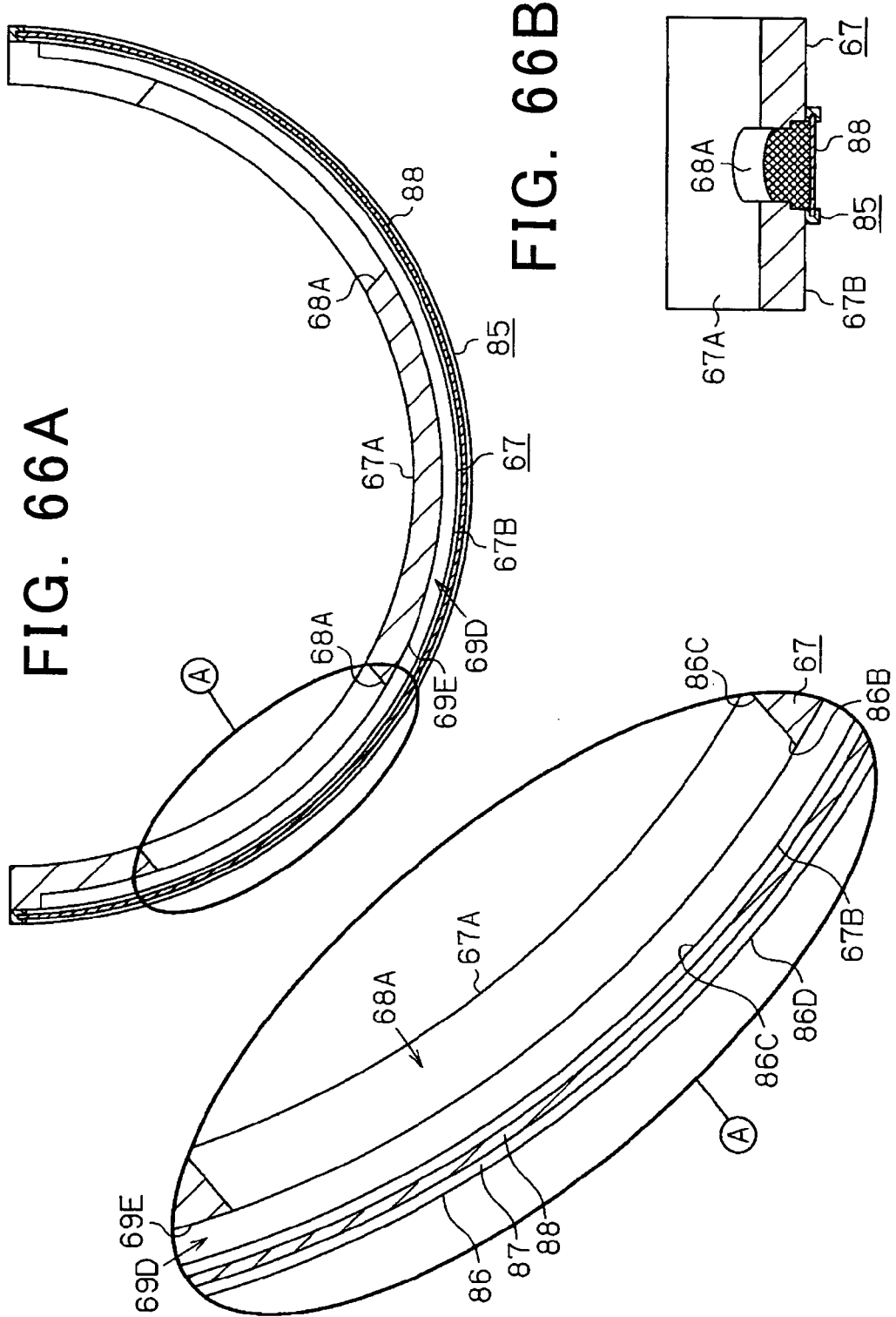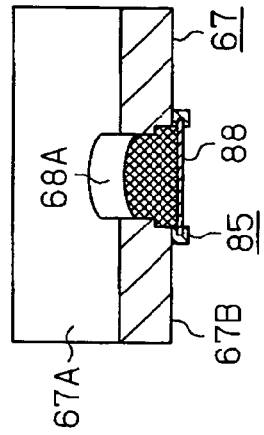

BEARING WITH LUBRICATION OIL FILTER

BACKGROUND OF THE INVENTION

1. Field of the Invention

The invention relates to a bearing that supports a shaft via lubrication oil.

2. Description of the Related Art

Japanese Patent Application Publication JP-A-2001-241442 describes a bearing that is applied to a crankshaft of an engine.

According to the bearing described in this publication, the crankshaft may be damaged due to foreign particles in the oil passages in the cylinder block when they enter between the crankshaft and the bearing. This problem occurs not only to such crankshaft bearings, but also to any bearings supporting a shaft via lubrication oil externally supplied.

SUMMARY OF THE INVENTION

The invention provides a bearing that prevents foreign particles from entering between the bearing and the shaft that the bearing supports.

(1) A first aspect of the invention relates to a plain bearing including a bearing body that supports a shaft via lubrication oil and a filter that is provided on the bearing body for filtering the lubrication oil.

According to the plain bearing described above, because the lubrication oil is filtered by the filter, foreign particles are prevented from entering between the bearing and the shaft.

(2) The plain bearing described above may be such that the lubrication oil is filtered by the filter before flowing into between the inner peripheral face of the bearing body and the outer peripheral face of the shaft.

(3) The plain bearing described above may be such that the bearing body has at least one bearing-body oil passage that is formed to distribute the lubrication oil from the outer side of the bearing body to the inner side of the bearing body, the filter has a filtering portion that filters the lubrication oil, and the lubrication oil flows into between the inner peripheral face of the bearing body and the outer peripheral face of the shaft via the bearing-body oil passage and the filtering portion of the filter.

(4) The plain bearing described above may be such that the bearing body has at least one oil-passage outlet which is an outlet of the bearing-body oil passage and which opens toward the inner side of the bearing body, and the lubrication oil, after passing through the oil-passage outlet, flows into between the inner peripheral face of the bearing body and the outer peripheral face of the shaft via the filtering portion of the filter.

According to this structure, because foreign particles are trapped by the filtering portion of the filter that is provided on the inner side of the bearing body, foreign particles are prevented from entering between the inner peripheral face of the bearing body and the outer peripheral face of the shaft.

(5) The plain bearing described above may be such that the bearing body has an inner groove that opens toward the inner side of the bearing body, and the lubrication oil, after passing through the oil-passage outlet, flows into between the inner peripheral face of the bearing body and the outer peripheral face of the shaft via the inner groove.

(6) The plain bearing described above may be such that the filter is arranged in the inner groove. According to this structure, because the filter is arranged in the inner groove, interferences between the filter and the shaft are prevented.

(7) The plain bearing described above may be such that faces of the bearing body that define the inner groove include a pair of side faces of the inner groove opposite each other across a space and a bottom face of the inner groove that connects the side faces, and the filtering portion of the filter has side walls, each of which is opposite the corresponding side face of the inner groove and a peripheral wall opposite the bottom face of the inner groove.

According to this structure, the maximum amount of foreign particles that can be trapped at the filter (the amount of foreign particles that the filter can trap before it clogs) is large as compared to when the filtering portion only has a peripheral wall, and therefore the possibility of clogging of the filter is low.

(8) The plain bearing described above may be such that the bearing body is provided with a plurality of the oil-passage outlets, and the lubrication oil, after passing through the plurality of oil-passage outlets, flows into between the inner peripheral face of the bearing body and the outer peripheral face of the shaft via the filtering portion of the filter.

(9) The plain bearing described above may be such that the oil passage outlet is an opening having an oblong shape and the filtering portion of the filter covers the oil passage outlet.

According to this structure, the maximum amount of foreign particles that can be trapped at the filter (the amount of foreign particles that the filter can trap before it clogs) is large as compared to when the oil-passage outlet is a circular opening, and therefore the possibility of clogging of the filter is low.

(10) The plain bearing described above may be such that the filtering area of the filtering portion of the filter is larger than the passage area of the oil-passage outlet.

According to this structure, the maximum amount of foreign particles that can be trapped at the filter (the amount of foreign particles that the filter can trap before it clogs) is large as compared to when the filtering area of the filtering portion of the filter is equal to the passage area of the oil-passage outlet, and therefore the possibility of clogging of the filter is low.

(11) The plain bearing described above may be such that, where a cross section of the oil passage outlet that is perpendicular to the flow direction of the lubrication oil is a reference cross section, an area in which the oil passage outlet overlaps with the reference cross section is substantially equal to the passage area of the oil passage outlet.

(12) The plain bearing described above may be such that, where the flow direction of the lubrication oil flowing through the oil passage outlet is a reference direction, a plane perpendicular to the reference direction is a reference plane, and a figure obtained by projecting the oil passage outlet onto the reference plane in the reference direction is an outlet figure, the area of the outlet figure is substantially equal to the passage area of the oil passage outlet.

(13) The plain bearing described above may be such that the bearing body has at least one oil-passage inlet which is an inlet of the bearing-body oil passage and which opens toward the outer side of the bearing body, and the lubrication oil, after passing through the filtering portion of the filter, flows into between the inner peripheral face of the bearing body and the outer peripheral face of the shaft via the oil-passage inlet.

According to this structure, because the filtering portion of the filter is provided on the outer side of the bearing body, even if the filter has come off from the bearing body, the filter, due to the presence of the bearing body, does not move from the outer side to the inner side of the bearing, and therefore interferences between the filter and the shaft can be prevented.

(14) The plain bearing described above may be such that the bearing body has an outer groove that opens toward the outer side of the bearing body and the lubrication oil, after passing through the outer groove, flows into between the inner peripheral face of the bearing body and the outer peripheral face of the shaft via the oil-passage inlet.

(15) The plain bearing described above may be such that the outer groove provides a space between the filtering portion of the filter and the bearing body.

According to this structure, because the whole part of the filtering portion of the filter is used to trap foreign particles, the possibility of clogging of the filter is low. Further, because a space is provided between the filtering portion and the bearing body by providing the outer groove, the size of the filter can be reduced as compared to when the filter is shaped to provide such a space without providing the outer groove.

(16) The plain bearing described above may be such that faces of the bearing body that define the outer groove include a pair of side faces of the outer groove opposite each other across a space and a bottom face of the outer groove that connects the side faces, and the filtering portion of the filter has side walls, each of which is opposite the corresponding side face of the outer groove and a peripheral wall opposite the bottom face of the outer groove.

According to this structure, the maximum amount of foreign particles that can be trapped at the filter (the amount of foreign particles that the filter can trap before it clogs) is large as compared to when the filtering portion only has a peripheral wall, and therefore the possibility of clogging of the filter is low.

(17) The plain bearing described above may be such that the bearing body is provided with a plurality of the oil-passage inlets and the lubrication oil, after passing through the filtering portion of the filter, flows into between the inner peripheral face of the bearing body and the outer peripheral face of the shaft via the plurality of oil-passage inlets.

(18) The plain bearing described above may be such that the oil-passage inlet is an opening having an oblong shape and the filtering portion of the filter covers the oil-passage inlet.

According to this structure, the maximum amount of foreign particles that can be trapped at the filter (the amount of foreign particles that the filter can trap before it clogs) is large as compared to when the oil-passage inlet is a circular opening, and therefore the possibility of clogging of the filter is low.

The plain bearing described above may be such that the filtering area of the filtering portion is larger than the passage area of the oil-passage inlet.

According to this structure, the maximum amount of foreign particles that can be trapped at the filter (the amount of foreign particles that the filter can trap before it clogs) is large as compared to when the filtering area of the filtering portion of the filter is equal to the passage area of the oil-passage inlet, and therefore the possibility of clogging of the filter is low.

(20) The plain bearing described above may be such that, where a cross section of the oil-passage inlet that is perpendicular to the flow direction of the lubrication oil is a reference cross section, an area in which the oil-passage inlet overlaps with the reference cross section is substantially equal to the passage area of the oil-passage inlet.

(21) The plain bearing described above may be such that, where the flow direction of the lubrication oil flowing through the oil-passage inlet is a reference direction, a plane perpendicular to the reference direction is a reference plane, and a figure obtained by projecting the oil-passage inlet onto the reference plane in the reference direction is an inlet figure, the area of the inlet figure is substantially equal to the passage area of the oil-passage inlet.

(22) The plain bearing described above may be such that a space is provided between the filtering portion of the filter and the bearing body.

According to this structure, because the whole part of the filtering potion is used to trap foreign particles, the possibility of clogging of the filter is low.

(23) The plain bearing described above may be such that the bearing body has at least one oil-passage inlet which is an inlet of the bearing-body oil passage and which opens toward the outer side of the bearing body and at least one oil-passage outlet which is an outlet of the bearing-body oil passage and which opens toward the inner side of the bearing body, and the filtering portion of the filter is arranged between the oil-passage inlet and the oil passage outlet.

(24) The plain bearing described above may be such that the lubrication oil is supplied to the outer side of the bearing body via an oil passage formed in a structure that is provided with the shaft, and the filter traps foreign particles in the oil passage formed in the structure.

According to this structure, because the filter traps foreign particles that come from the oil passage in the structure, foreign particles are prevented from flowing into between the inner peripheral face of the bearing body and the outer peripheral face of the shaft.

(25) The plain bearing described above may be such that the shaft is a rotational shaft of an engine.

(26) The plain bearing described above may be such that the engine is configured such that a crankshaft, which is the rotational shaft, is supported by a bearing portion provided in a cylinder block of the engine and an auxiliary member that is attached to the bearing portion and the plain bearing is constituted of the bearing body, having a semi-circular shape, that is attached to the bearing portion of the cylinder block and an auxiliary bearing, having a semi-circular shape, that is attached to the auxiliary member.

(27) The plain bearing described above may be such that the engine is configured such that a crankshaft, which is the rotational shaft, is supported by a bearing portion provided in a cylinder block of the engine and an auxiliary member that is attached to the bearing portion, and the plain bearing is constituted of the bearing body, having a semi-circular shape, that is attached to the auxiliary member and an auxiliary bearing, having a semi-circular shape, that is attached to the bearing portion of the cylinder block.

(28) The plain bearing described above may be such that the engine is configured such that a crankshaft, which is the rotational shaft, is supported by a bearing portion provided in a cylinder block of the engine and an auxiliary member that is attached to the bearing portion, and the bearing body is constituted of a first bearing body, having a semi-circular shape, that is attached to the bearing portion of the cylinder lock and a second bearing body, having a semi-circular shape, that is attached to the auxiliary member.

According to this structure, when filters are provided at the first and second bearing bodies, respectively, the maximum amount of foreign particles that can be trapped at the filter (the amount of foreign particles that the filter can trap before it clogs) is made large as compared to when only one of the first and second bearing bodies is provided with a filter, and thus the possibility of clogging of the filters is low.

(29) The plain bearing described above may be such that the engine is configured such that the lubrication oil that has been discharged from an oil pump flows to the bearing portion of the cylinder block via an oil filter and the filter traps foreign particles that pass through the oil filter and enter the bearing portion of the cylinder block together with the lubrication oil.

According to this structure, because the filter of the bearing body can trap foreign particles that are too small to be trapped by the oil filter, such small foreign particles can be prevented from entering between the crankshaft and the plain bearing.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4A is a plan view showing the planar structure of the upper bearing of the crank bearing of the first exemplary embodiment;

FIG. 4B is a bottom view showing the bottom structure of the upper bearing of the crank bearing of the first exemplary embodiment;

FIG. 8A is a cross-sectional view showing a cross section cutting through the upper bearing of the crank bearing of the first exemplary embodiment along the line VIIIA-VIIIA in FIG. 4A;

FIG. 8B is a cross-sectional view showing a cross section cutting through the upper bearing of the crank bearing of the first exemplary embodiment along the line VIIIB-VIIIB in FIG. 5A;

FIG. 17A is a cross-sectional view showing a cross section cutting through the upper bearing of the crank bearing of the third exemplary embodiment along the line XVIIA-XVIIA in FIG. 13A;

FIG. 17B is a cross-sectional view showing a cross section cutting through the upper bearing of the crank bearing of the third exemplary embodiment along the line XVIIB-XVIIB in FIG. 14A;

FIG. 25A is a cross-sectional view showing a cross section cutting through the upper bearing of the crank bearing of the fifth exemplary embodiment along the line XXVA-XXVA in FIG. 22A;

FIG. 25B is a cross-sectional view showing a cross section cutting through the upper bearing of the crank bearing of the fifth exemplary embodiment along the line XXVB-XXVB in FIG. 22B;

FIG. 30A is a plan view showing the planar structure of the bearing filter of the crank bearing of the sixth exemplary embodiment;

FIG. 30B is a bottom view showing the bottom structure of the bearing filter of the crank bearing of the sixth exemplary embodiment;

FIG. 30C is a cross-sectional view showing a cross section cutting through the bearing filter of the crank bearing of the sixth exemplary embodiment along the line XXXC-XXXC in FIG. 30A;

FIG. 32A is a cross-sectional view showing a cross section cutting through the upper bearing of the crank bearing of the sixth exemplary embodiment along the line XXXIIA-XXXIIA in FIG. 29A;

FIG. 32B is a cross-sectional view showing a cross section cutting through the upper bearing of the crank bearing of the sixth exemplary embodiment along the line XXXIIB-XXXIIB in FIG. 29B;

FIG. 36A is a cross-sectional view showing a cross section cutting through the upper bearing of the crank bearing of the seventh exemplary embodiment along the line XXXVIA-XXXVIA in FIG. 35A;

FIG. 36B is a cross-sectional view showing a cross section cutting through the upper bearing of the crank bearing of the seventh exemplary embodiment along the line XXXVIB-XXXVIB in FIG. 35B;

FIG. 40A is a cross-sectional view showing a cross section cutting through the upper bearing of the crank bearing of the eighth exemplary embodiment along the line XLA-XLA in FIG. 39A;

FIG. 40B is a cross-sectional view showing a cross section cutting through the upper bearing of the crank bearing of the eighth exemplary embodiment along the line XLB-XLB in FIG. 39B;

FIG. 44A is a plan view showing the planar structure of the upper bearing of the crank bearing of the ninth exemplary embodiment;

FIG. 44B is a front view showing the front structure of the upper bearing of the crank bearing of the ninth exemplary embodiment;

FIG. 45A is a plan view showing the planar structure of the bearing filter of the crank bearing of the ninth exemplary embodiment;

FIG. 45B is a bottom view showing the bottom structure of the bearing filter of the crank bearing of the ninth exemplary embodiment;

FIG. 45C is a cross-sectional view showing a cross section cutting through the bearing filter of the crank bearing of the ninth exemplary embodiment along the line XLVC-XLVC in FIG. 45A;

FIG. 51A is a cross-sectional view showing a cross section cutting through the upper bearing of the crank bearing of the tenth exemplary embodiment along the line LIA-LIA in FIG. 50A;

FIG. 51B is a cross-sectional view showing a cross section cutting through the upper bearing of the crank bearing of the tenth exemplary embodiment along the line LIB-LIB in FIG. 50B;

FIG. 54A is a plan view showing the planar structure of the upper bearing of the crank bearing of the eleventh exemplary embodiment;

FIG. 54B is a front view showing the front structure of the upper bearing of the crank bearing of the eleventh exemplary embodiment;

FIG. 55A is a plan view showing the planar structure of the bearing filter of the crank bearing of the eleventh exemplary embodiment;

FIG. 55B is a bottom view showing the bottom structure of the bearing filter of the crank bearing of the eleventh exemplary embodiment;

FIG. 55C is a cross-sectional view showing a cross section cutting through the bearing filter of the crank bearing of the eleventh exemplary embodiment along the line LVC-LVC in FIG. 55A;

FIG. 62A is a cross-sectional view showing a cross section cutting through the lower bearing of the crank bearing of the twelfth exemplary embodiment along the line LXIIA-LXIIA in FIG. 61A;

FIG. 62B is a cross-sectional view showing a cross section cutting through the lower bearing of the crank bearing of the twelfth exemplary embodiment along the line LXIIB-LXIIB in FIG. 61B;

FIG. 66A is a cross-sectional view showing a cross section cutting through the lower bearing of the crank bearing of the thirteenth exemplary embodiment along the line LXVIA-LXVIA in FIG. 65A;

FIG. 66B is a cross-sectional view showing a cross section cutting through the lower bearing of the crank bearing of the thirteenth exemplary embodiment along the line LXVIB-LXVIB in FIG. 65B;

DETAILED DESCRIPTION OF THE EXEMPLARY EMBODIMENTS

First Exemplary Embodiment

A first exemplary embodiment of the invention will be described with reference to FIG. 1 to FIG. 10. In the first exemplary embodiment, the invention is embodied as a plain bearing (crank bearing 6) for supporting a crankshaft 5 of an engine 1.

Figure 1:
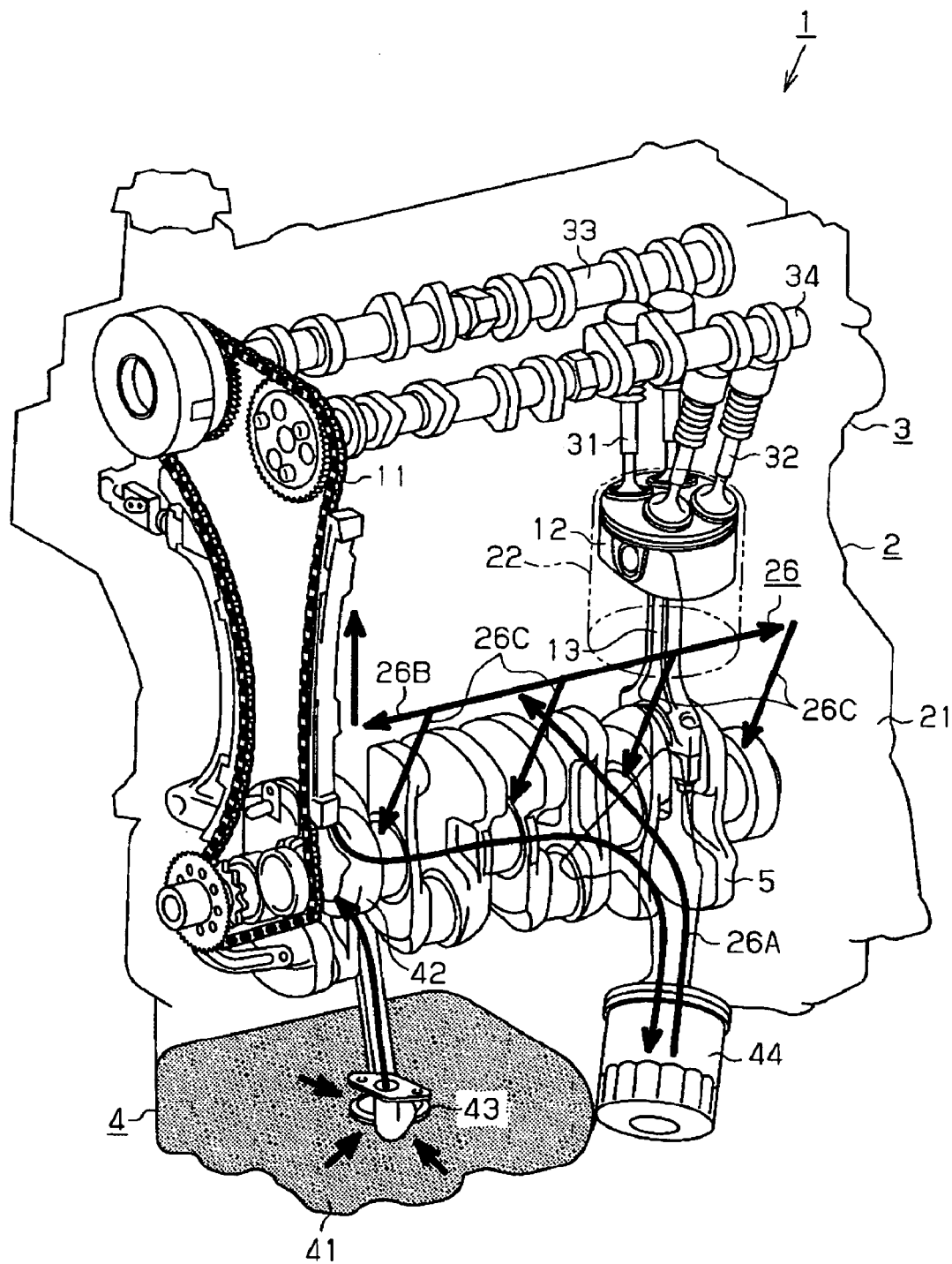
FIG. 1 is a perspective view showing the perspective structure of an engine incorporating an a crank bearing of the first exemplary embodiment, which is one example of a bearing of the invention.

The structure of the engine 1 will be described with reference to FIG. 1. The engine 1 is constituted of a cylinder block 2, a cylinder head 3, and an oil pan 4. In the cylinder block 2 are formed a plurality of cylinders 22 having combustion chambers in which air-fuel mixtures are combusted. Pistons 12 are arranged in the respective cylinders 22. The pistons 12 reciprocate as air-fuel mixtures are combusted in the respective cylinders 22. The crankshaft 5 is arranged in a crankcase 21 of the cylinder block 2. The crankshaft 5 converts the reciprocation of the pistons 12 into rotation. The crankshaft 5 and each piston 12 are linked to each other via a connecting rod 13. A timing chain 11 for transmitting torque to other devices and components of the engine 1 is wound around the crankshaft 5. Note that the cylinder block 2 may be regarded as a "structure that is provided with a shaft".

The oil pan 4 is provided with an oil pump 42 that pumps the engine oil 41 up from the bottom of the oil pan 4 and supplies it to various parts of the engine 1, an oil strainer 43 that is provided upstream of the oil inlet of the oil pump 42 to filter the engine oil 41, and an oil filter 44 that is provided downstream of the oil outlet of the oil pump 42 to filter the engine oil 41. The oil pump 42 is driven by the torque transmitted from the crankshaft 5 via the timing chain 11.

Also provided in the cylinder head 3 are intake valves 31 via which the intake ports are placed in communication with and shut off from the respective combustion chambers and exhaust valves 32 via which the exhaust ports are placed in communication with and shut off from the respective combustion chambers. The intake valves 31 are opened by the cams of an intake camshaft 33, and the exhaust valves 32 are opened by the cams of an exhaust camshaft 34. The intake camshaft 33 and the exhaust camshaft 34 are driven by the torque transmitted from the crankshaft 5 via the timing chain 11.

Figure 2:
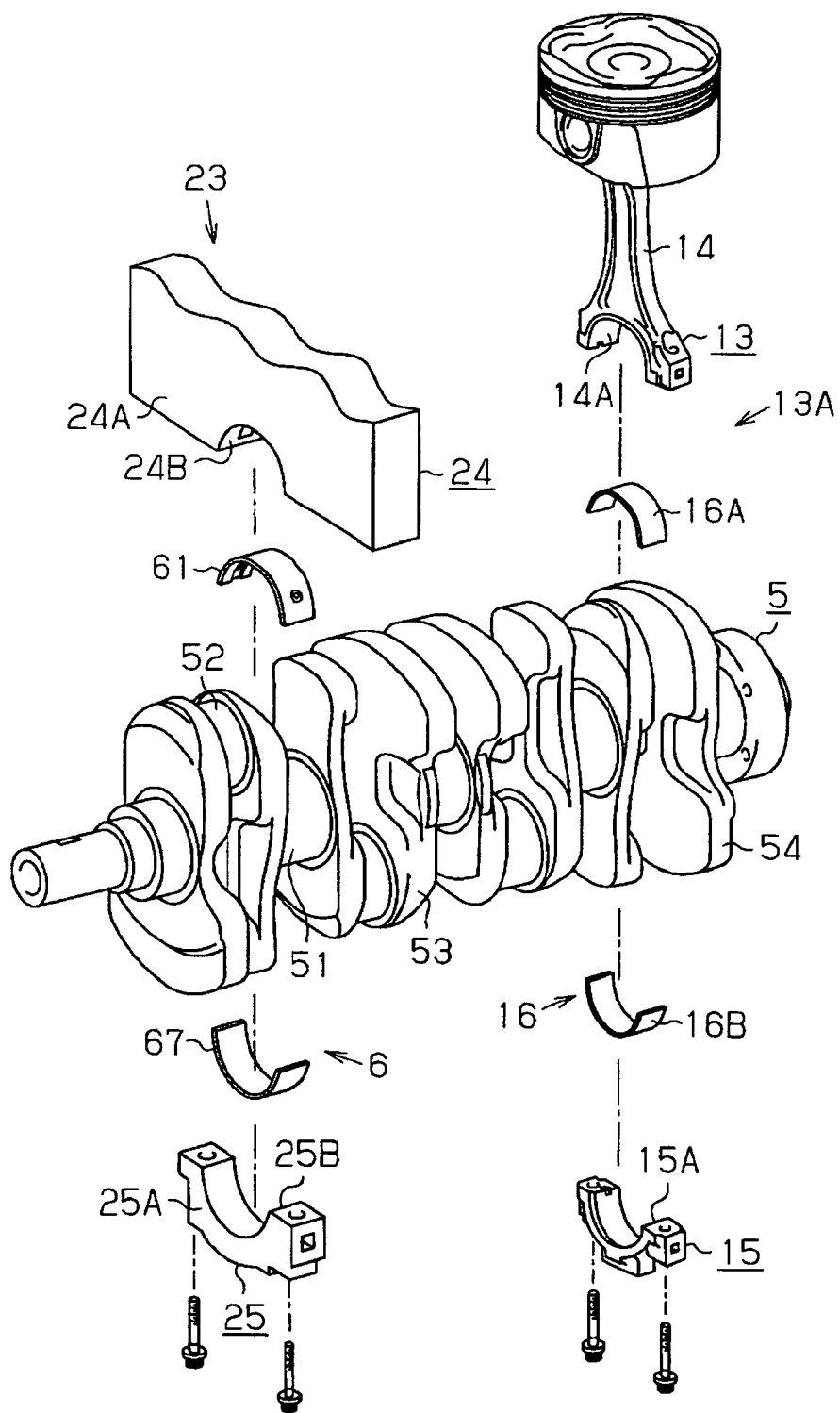
FIG. 2 is an exploded perspective view showing the perspective structures of the crankshaft and its peripheral elements incorporated in the engine of the first exemplary embodiment.

Hereinafter, the structure of the crankshaft 5 and the structure for supporting the crankshaft 5 will be described with reference to FIG. 2. The crankshaft 5 is constituted of crank journals 51 that together form the main shaft portion of the crankshaft 5, crank pins 52 to which the respective connecting rods 13 are attached, and cranks arms 53 that connect the crank journals 51 and the crank pins 52. Each crank arm 53 has a counter weight 54 for balancing the rotation of the crankshaft 5.

The crankcase 21 has a bearing portion (crank bearing portion 23 (See FIG. 9)) that supports the crankshaft 5 such that the crankshaft 5 is rotatable relative to the cylinder block 2. The crank bearing portion 23 is constituted of a partition wall 24 that divides the interior of the crankcase 21 into several chambers and a crank cap 25 that is provided at the bottom of the partition wall 24. More specifically, the crank bearing portion 23 is constituted of a bearing portion formed at the bottom of the partition wall 24 (partition-wall-side bearing portion 24A) and a bearing portion formed at the crank cap 25 (cap-side bearing portion 25A).

Figure 3:
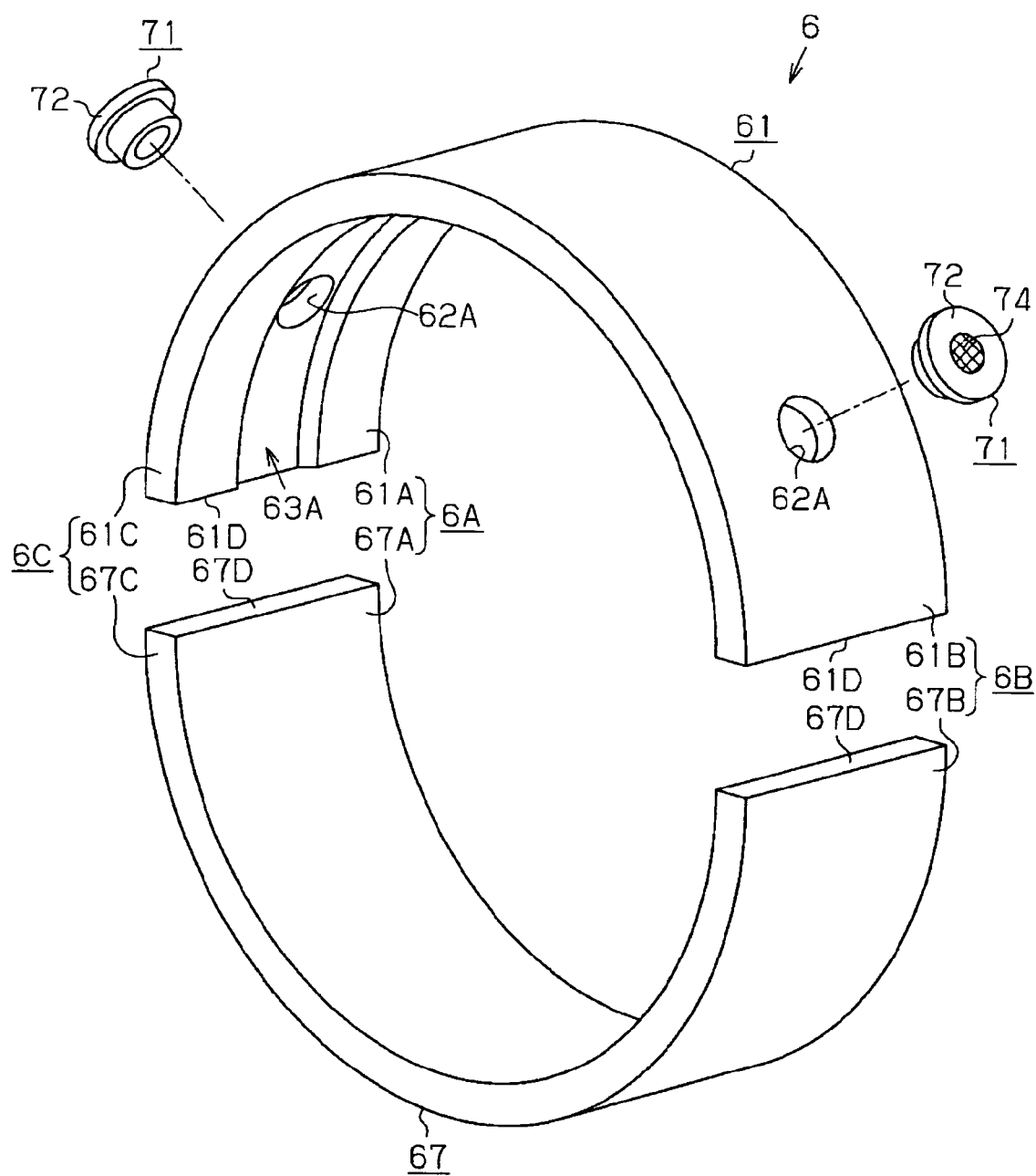
FIG. 3 is an exploded perspective view showing the perspective structure of the crank bearing of the first exemplary embodiment.
Figure 5A:
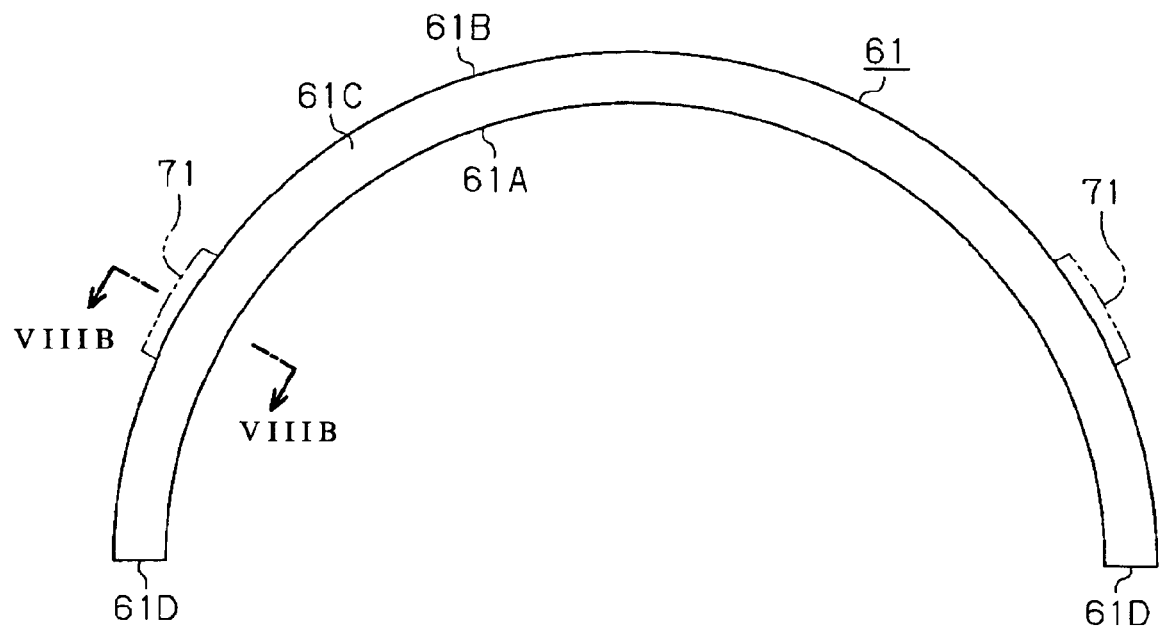
FIG. 5A is a front view showing the front structure of the upper bearing of the crank bearing of the first exemplary embodiment.
Figure 5B:
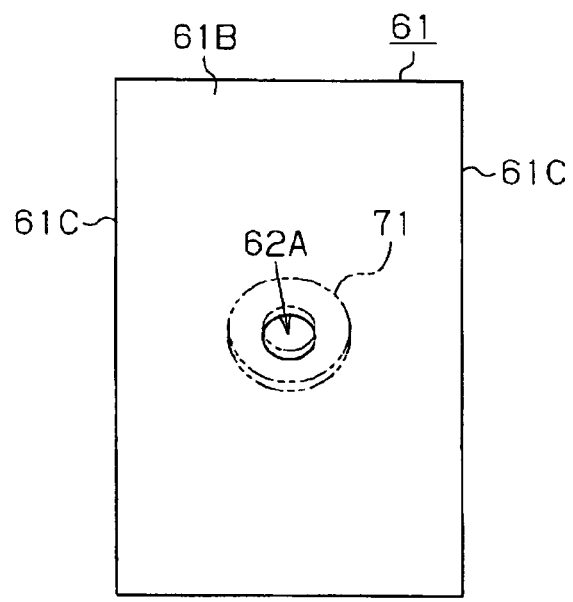
FIG. 5B is a side view showing the side structure of the upper bearing of the crank bearing of the first exemplary embodiment.
Figure 6A:
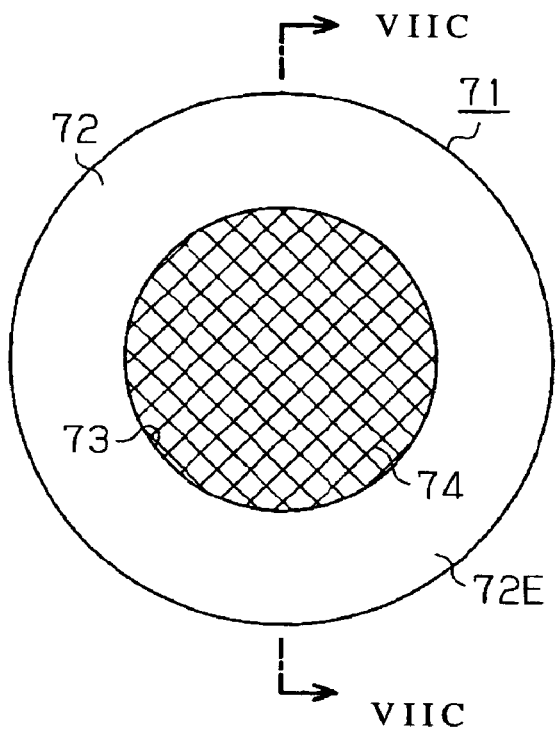
FIG. 6A is a plan view showing the planar structure of the bearing filter of the crank bearing of the first exemplary embodiment.
Figure 6B:
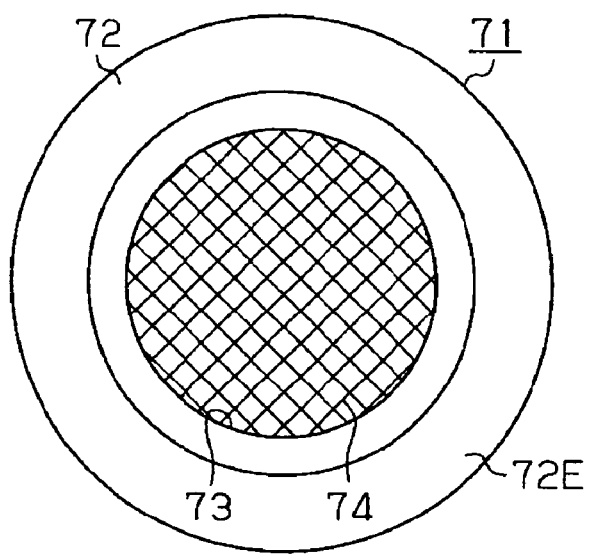
FIG. 6B is a bottom view showing the bottom structure of the bearing filter of the crank bearing of the first exemplary embodiment.
Figure 7A:
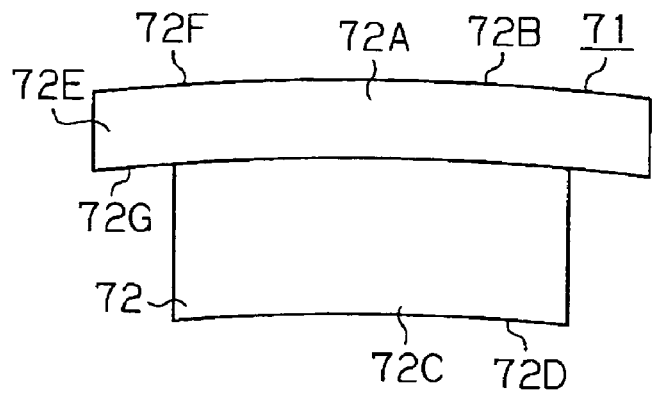
FIG. 7A is a front view showing the front structure of the bearing filter of the crank bearing of the first exemplary embodiment.
Figure 7B:
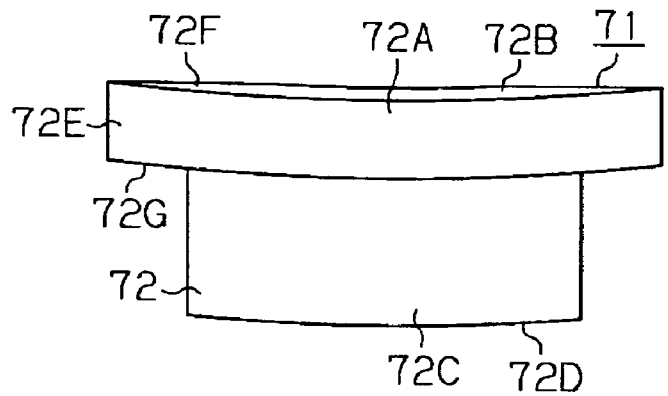
FIG. 7B is a side view showing the side structure of the bearing filter of the crank bearing of the first exemplary embodiment.
Figure 7C:
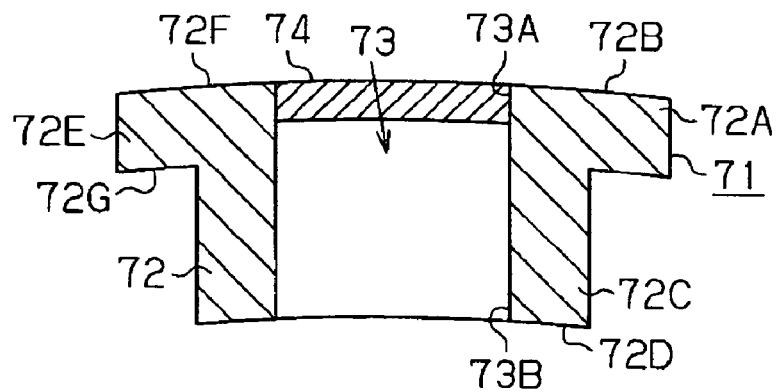
FIG. 7C is a cross-sectional view showing a cross section cutting through the bearing filter of the crank bearing of the first exemplary embodiment along the line VIIC-VIIC in FIG. 6A.

A crank bearing 6 is attached to the crank bearing portion 23, which is used to reduce the friction that occurs as the crankshaft 5 rotates (refer to FIG. 3). The crank bearing 6 is a two-piece slide bearing. That is, the crank bearing 6 is constituted of a semicircular upper bearing 61 that is attached to the partition wall 24 of the crankcase 21 and a semicircular lower bearing 67 that is attached to the crank cap 25.

The connecting rods 13 are attached to the crank pins 52 of the crankshaft 5. Each connecting rod 13 is constituted of a connecting rod body 14 to which the piston 12 is attached and a connecting rod cap 15 that is attached to the lower end of the connecting rod body 14. The connecting rod 13 has a bearing portion via which the connecting rod 13 is rotatably supported on the crankshaft 5 (connecting-rod bearing portion 13A (refer to FIG. 10)). The connecting-rod bearing portion 13A is constituted of a bearing portion formed at the lower end of the connecting rod body 14 (body bearing portion 14A) and a bearing portion formed at the connecting rod cap 15 (cap-side bearing portion 15A).

A connecting-rod bearing 16 is attached to the connecting-rod bearing portion 13A. The connecting-rod bearing 16 reduces the friction that occurs as the crankshaft 5 rotates. The connecting-rod bearing 16 is a two-piece slide bearing. That is, the connecting-rod bearing 16 is constituted of a semicircular upper bearing 16A that is attached to the connecting rod body 14 and a semicircular lower bearing 16B that is attached to the connecting rod cap 15.

Hereinafter, the structure of the crank bearing 6 will be described with reference to FIG. 3 to FIG. 5B. The crank bearing 6 is constituted of the upper bearing 61, the lower bearing 67, and bearing filters 71 for filtering the engine oil 41. Note that the upper bearing 61 of the first exemplary embodiment corresponds to "bearing body".

The upper bearing 61 is formed by joining a soft metal, such as aluminum, to an iron-based metal. The upper bearing 61 has two oil holes 62A for distributing the engine oil 41 from the outer side to the inner side of the crank bearing 6 and an inner peripheral groove 63A for distributing the engine oil 41 in the inner side of the upper bearing 61 to the inside of the crank journal 51. The bearing filters 71 are fitted in the respective oil holes 62A and thereby retained not to move relative to the upper bearing 61. The inner peripheral face of the upper bearing 61 (upper inner peripheral face 61A) curves to match the outline of the outer peripheral face of the crank journal 51 (journal outer peripheral face 51F (refer to FIG. 10)). The outer peripheral face of the upper bearing 61 (upper outer peripheral face 61B) curves to match the outline of the inner peripheral face of the partition-wall-side bearing portion 24A (bearing portion inner peripheral face 24B (refer to FIG. 9)). The side faces of the upper bearing 61 (upper side faces 61C) are flat and parallel to each other. The end faces of the upper bearing 61 (upper end faces 61D) are flat surfaces that match the outlines of the corresponding end faces of the lower bearing 67 (lower end faces 67D).

The inner peripheral groove 63A extends in the circumferential direction of the upper bearing 61 from the upper end face 61D at one end of the upper bearing 61 to the upper end face 61D at the other end. Thus, the inner peripheral groove 63A is defined by inner peripheral faces of the upper bearing 61, i.e., a pair of oil-groove side faces 63C opposite each other across a space and an oil-groove bottom face 63B connecting the side faces 63C. The oil-groove side faces 63C are tapered such that the distance between the oil-groove side faces 63C increases from the outer side to the inner side in the radial direction of the crank bearing 6. The oil-groove bottom face 63B curves to match the outline of the upper inner peripheral face 61A.

Each oil hole 62A has an oil hole inlet 62B that opens toward the outer side of the upper bearing 61 and an oil hole outlet 62C that opens toward the inner side of the upper bearing 61. That is, the oil holes 62A are through holes penetrating the upper bearing 61 from the upper outer peripheral face 61B to the oil-groove bottom face 63B.

The lower bearing 67 is formed by joining a soft metal, such as aluminum, to an iron-based metal. The inner peripheral face of the lower bearing 67 (lower inner peripheral face 67A) curves to match the outline of the journal outer peripheral face 51F. The outer peripheral face of the lower bearing 67 (lower outer peripheral face 67B) curves to match the outline of the inner peripheral face of the cap-side bearing portion 25A (bearing-portion inner peripheral face 25B (refer to FIG. 9)). The side faces of the lower bearing 67 (lower side faces 67C) are flat and parallel to each other. The end faces of the lower bearing 67 (lower end faces 67D) are flat surfaces that match the outlines of the corresponding end faces of the upper bearing 61 (upper end faces 61D).

Thus, the inner peripheral face of the crank bearing 6 (bearing inner peripheral face 6A) is constituted of the upper inner peripheral face 61A and the lower inner peripheral face 67A, and the outer peripheral face of the crank bearing 6 (bearing outer peripheral face 6B) is constituted of the upper outer peripheral face 61B and the lower outer peripheral face 67B. The side faces of the crank bearing 6 (side bearing faces 6C) are constituted of the upper side faces 61C and the lower side faces 67C. The inner diameter of the crank bearing 6 is smaller than the outer diameter of the crank journal 51, and thus there is a gap between the bearing inner peripheral face 6A and the journal outer peripheral face 51F when the crank journal 51 is supported on the crank bearing 6. Note that the space surrounded by the bearing inner peripheral face 6A corresponds to "the inside" of the crank bearing 6.

Next, the structure of the bearing filters 71 will be described with reference to FIG. 6A to FIG. 7C. Each bearing filter 71 is constituted of a filter body 72 that is shaped to match the outline of the oil hole 62A of the upper bearing 61 and a net 74 (filtering portion) that is attached to the filter body 72 to filter the engine oil 41.

The filter body 72 is made of iron-based metal or resin. An oil hole 73 is formed in the filter body 72 to distribute the engine oil 41 from one end (filter-body upper portion 72A) to the other end (filter-body lower portion 72C) of the filter body 72. A flange 72E is formed on the outer peripheral side of the filter-body upper portion 72A. The net 74 is attached to the inner peripheral side of the filter-body upper portion 72A.

The oil hole 73 has an oil hole inlet 73A that opens toward the outer side of the crank bearing 6 when the bearing filter 71 is fitted in the crank bearing 6 and an oil hole outlet 73B that opens toward the inner side of the crank bearing 6 when the bearing filters 71 is fitted in the crank bearing 6. That is, the oil hole 73 is a through hole penetrating the filter body 72 from the top face (filter-body top face 72B) to the bottom face (filter-body bottom face 72D). The oil hole inlet 73A is an opening through which the engine oil 41 is distributed from the outer side of the upper bearing 61 to the inside of the bearing filter 71 (the upper bearing 61), and the oil hole outlet opening 73B is an opening through which the engine oil 41 is distributed from the inside of the bearing filter 71 (the upper bearing 61) to the inner side of the upper bearing 61. The filter-body bottom face 72D curves to match the outline of the oil-groove bottom face 63B. The filter-body top face 72B curves to match the outline of the filter-body bottom face 72D.

The flange 72E is provided at the filter body 72 to retain the bearing filter 71 so as not to move relative to the upper bearing 61 inward in the radial direction. When the upper bearing 61 is attached on the partition-wall-side bearing portion 24A, the flange 72E is placed in a groove (bearing oil groove 24C (refer to FIG. 9) formed in the inner peripheral face of the partition-wall-side bearing portion 24A. The bearing oil groove 24C is provided as an oil groove through which the engine oil 41 that has flown out from an oil passage formed in the partition wall 24 (third oil passage 26C (refer to FIG. 9)) is distributed to the respective oil holes 62A of the upper bearing 61 (the oil holes 73 of the respective bearing filters 71). The top face of the flange 72E (flange top face 72F) is formed as part of the filter-body top face 72B. The bottom face of the flange 72E (flange bottom face 72G) curves to match the outline of the upper outer peripheral face 61B.

The net 74 is attached to the filter body 72 such that the engine oil 41 flowing through the filter body 72 is entirely filtered. The mesh size of the net 74 is smaller than the diameters of foreign particles that pass through the oil filter 44 and enter the oil passage in the cylinder block 2 (engine oil passage 26 (refer to FIG. 10)) together with the engine oil 41. That is, the mesh size of the net 74 is small enough to trap even extremely small foreign particles contained in the engine oil 41.

Next, a description will be made, with reference to FIG. 8A and FIG. 8B, of how the dimensions of each part of the bearing filter 71 are determined and how the bearing filter 71 is attached to the upper bearing 61. In the first exemplary embodiment, the dimensions of each part of the bearing filter 71 and the dimensions of each part of the upper bearing 61 are designated as follows.

(A) The height of the filter body 72 of the bearing filter 71 excluding the thickness of the flange 72E, i.e., the distance from the flange bottom face 72G to the filter-body bottom face 72D is denoted "filter height FA".

(B) The thickness of the flange 72E, i.e., the distance from the flange top face 72F to the flange bottom face 72G is denoted "flange thickness FB".

(C) The thickness of the portion of the bearing filter 71 at which the inner peripheral groove 63A is formed, i.e., the distance from the upper outer peripheral face 61B to the oil-groove bottom face 63B is denoted "bearing thickness BA".

The dimensions of each part of the bearing filter 71 are as follows. The filter height FA is equal to the bearing thickness BA. The flange thickness FB is smaller than the depth of the bearing oil groove 24C. The filter height FA may be changed as needed within the range not exceeding the bearing thickness BA. Also, the flange thickness FB may be changed as needed within the range that provides a space between the partition-wall-side bearing portion 24A and the oil hole inlet 73A.

The bearing filter 71 is attached to the upper bearing 61 as follows. The filter-body lower portion 72C is first inserted into the corresponding oil hole 62A from the outer side of the upper bearing 61, and then the filter body 72 is press-fitted inward in the radial direction of the upper bearing 61 until the flange bottom face 72G contacts the upper outer peripheral face 61B, so that the bearing filter 71 is fixed to the upper bearing 61.

Each oil hole inlet 62B of the upper bearing 61 is covered by the net 74. That is, the bearing filter 71 is attached such that the engine oil 41 that has flown out from the partition-wall-side bearing portion 24A entirely passes through the net 74 of the bearing filter 71 before flowing into between the bearing inner peripheral face 6A and the journal outer peripheral face 51F. Further, the whole part of the filter body 72 excluding the flange 72E is in the oil hole 62A. That is, no portion of the filter-body lower portion 72C protrudes inward in the radial direction from the oil-groove bottom face 63B.

Figure 9:
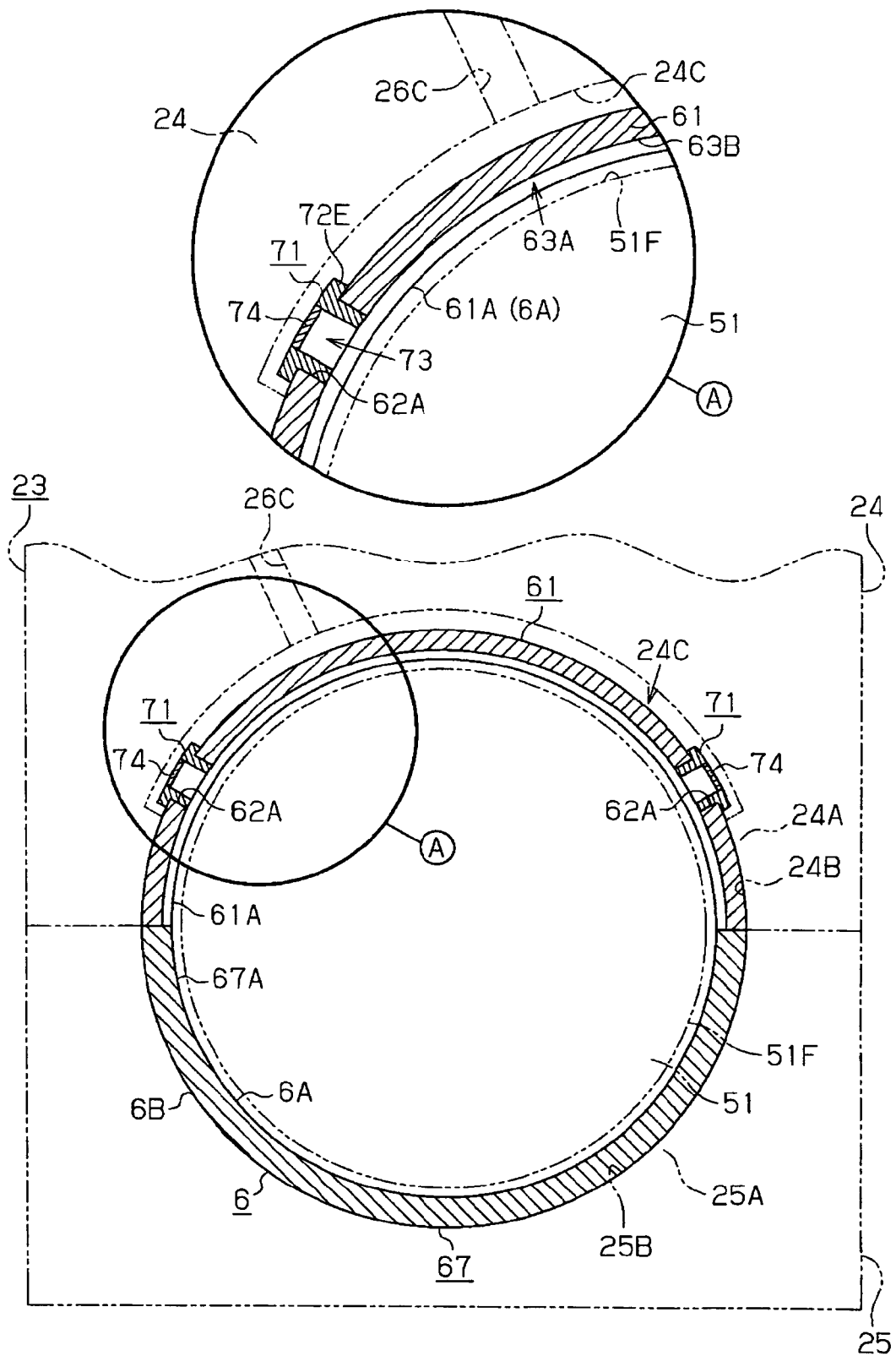
FIG. 9 is a cross-sectional view cutting through the crankshaft and its peripheral elements incorporated in the engine of the first exemplary embodiment along the radial direction of the crankshaft.

Next, the structure for supporting the crank journal 51 will be described with reference to FIG. 9. FIG. 9 is a cross-sectional view showing the portion of the engine 1 around the crank journal 51 in the state where the engine oil 41 is being supplied to the crankshaft 5.

In the engine 1, the crank bearing 6 is fixed to the crank bearing portion 23 such that the bearing outer peripheral face 6B contacts bearing inner peripheral faces 24B, 25B. Also, the upper bearing 61 is fixed to the partition-wall-side bearing portion 24A such that the bearing oil groove 24C and the oil holes 62A of the upper bearing 61 (the oil holes 73 of the bearing filters 71) communicate with each other. That is, the upper bearing 61 is fixed such that the engine oil 41 that has flown out from the oil passage in the partition wall 24 (the third oil passage 26C) enters the oil hole 73 of each bearing filter 71. The flange 72E of each bearing filter 71 is placed in the bearing oil groove 24C.

The crank journal 51 is supported by the crank bearing 6 via a layer of the engine oil 41. That is, the crank journal 51 is supported such that the journal outer peripheral face 51F is opposite the bearing inner peripheral face 6A via the layer of the engine oil 41. Namely, the friction between the crank journal 51 and the crank bearing 6 is fluid friction.

Figure 10:
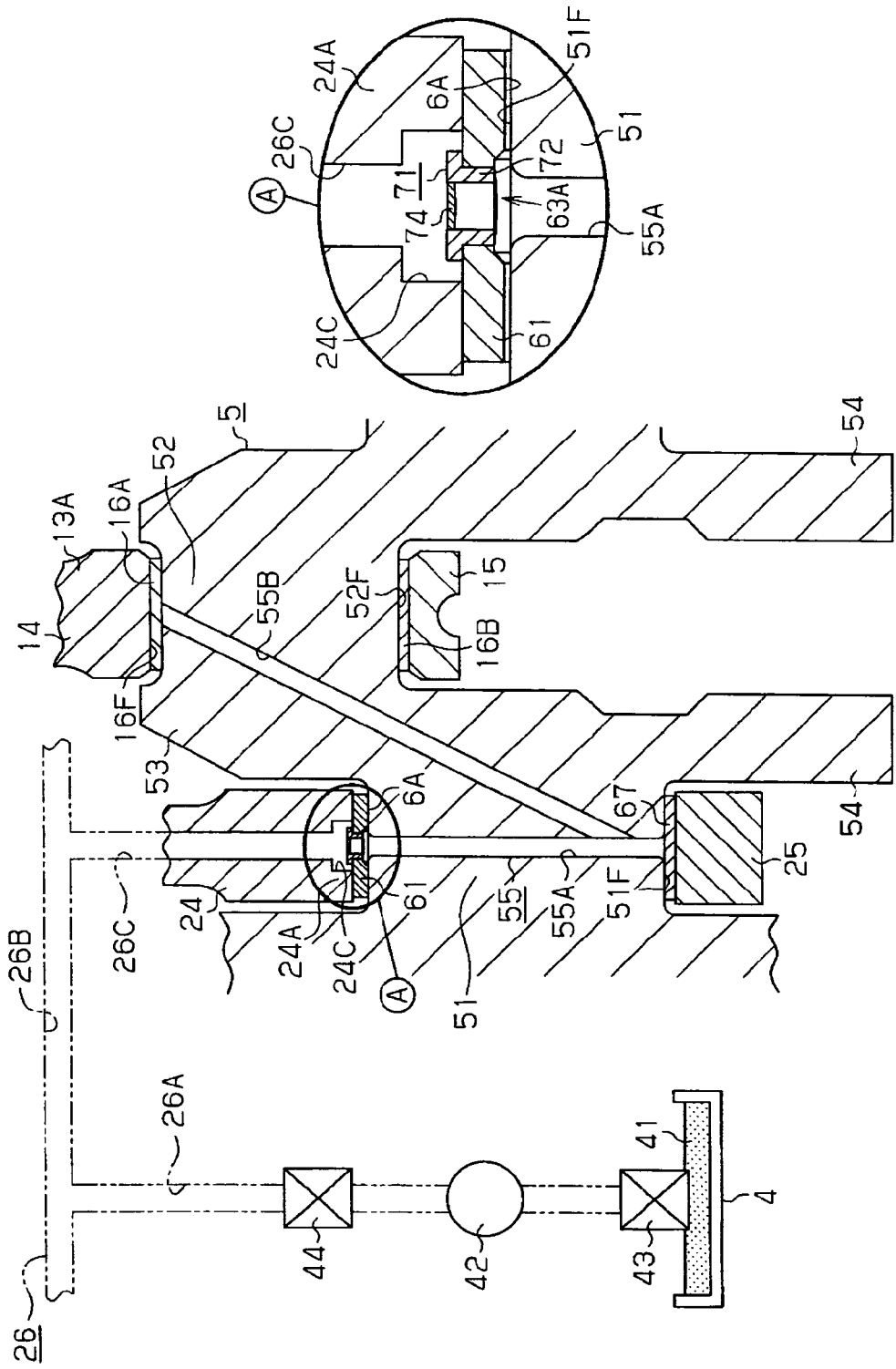
FIG. 10 is a cross-sectional view cutting through the crankshaft and its peripheral elements incorporated in the engine of the first exemplary embodiment along the axial direction of the crankshaft.

Next, the structure for lubricating the crankshaft 5 will be described with reference to FIG. 10. In the cylinder block 2, an oil passage (engine oil passage 26) is formed. Through this oil passage, the engine oil 41 that has been discharged from the oil pump 42 is supplied to various parts of the engine 1. The engine oil passage 26 is constituted of a first engine oil passage 26A extending from the bottom of the crankcase 21 to above the crankshaft 5, a second engine oil passage 26B extending in the axial direction of the crankshaft 5 above the crankshaft 5, and a third engine oil passage 26C extending from above the crankshaft 5 to the bottom face of the partition wall 24 (the bearing oil groove 24C).

The first oil passage 26A is formed as an oil passage through which the engine oil 41 that has been drawn into the inside of the cylinder block 2 is distributed from the bottom of the crankcase 21 to above the crankshaft 5. The second engine oil passage 26B is formed as an oil passage through which the engine oil 41 above the crankshaft 5 is distributed into the third oil passage 26C. The third oil passage 26C is formed as an oil passage through which the engine oil 41 on the inner side of the partition wall 24 is distributed to the bearing oil groove 24C.

In the crankshaft 5, a crank oil passage 55 is formed. Through the crank oil passage 55, the engine oil 41 is distributed from between the bearing inner peripheral face 6A and the journal outer peripheral face 51F into between the outer peripheral face of the crank pin 52 (pin outer peripheral face 52F) and the inner peripheral face of the connecting-rod bearing 16 (bearing inner peripheral face 16F). The crank oil passage 55 is constituted of a first crank oil passage 55A extending in the radial direction and penetrating the crank journal 51 and a second crank oil passage 55B extending from the crank journal 51 to the crank pin 52. The first crank oil passage 55A is formed as an oil passage through which the engine oil 41 is distributed from between the bearing inner peripheral face 6A and the journal outer peripheral face 51F to the inside of the crank journal 51. The second crank oil passage 55B is formed as an oil passage through which the engine oil 41 in the inside of the crank journal 51 is distributed into between the pin outer peripheral face 52F and the bearing inner peripheral face 16F.

The engine oil 41 is distributed to each part of the crankshaft 5 as described below. (A) The oil pump 42 pumps the engine oil 41 up from the oil pan 4 via the oil strainer 43. The engine oil 41 is then discharged from the oil pump 42 and enters the first oil passage 26A via the oil filter 44. Then, the engine oil 41 flows from the first oil passage 26A to the third oil passage 26C via the second engine oil passage 26B. The engine oil 41 then flows from the third oil passage 26C to the bearing oil groove 24C via the opening of the partition-wall-side bearing portion 24A. Then, the engine oil 41 flows from the bearing oil groove 24C to the inside of the filter body 72 (the upper bearing 61) via the net 74 of the bearing filter 71. The engine oil 41 then flows from the bearing filter 71 into between the bearing inner peripheral face 6A and the journal outer peripheral face 51F via the inner peripheral groove 63A of the upper bearing 61. As such, the layer of the engine oil 41 is maintained between the bearing inner peripheral face 6A and the journal outer peripheral face 51F, and the friction that occurs as the crankshaft 5 rotates therefore decreases.

(B) The engine oil 41 between the bearing inner peripheral face 6A and the journal outer peripheral face 51F enters the inside of the crank journal 51 via the inlet of the first crank oil passage 55A. Then, the engine oil 41 flows from the first crank oil passage 55A into between the pin outer peripheral face 52F and the bearing inner peripheral face 16F via the second crank oil passage 55B. As such, the layer of the engine oil 41 between the pin outer peripheral face 52F and the bearing inner peripheral face 16F is maintained, and the friction that occurs as the crankshaft 5 rotates therefore decreases.

Advantageous Effects of Exemplary Embodiment

The crank bearing of the first exemplary embodiment described in detail above provides the following advantageous effects.

(1) According to the crank bearing 6 of the first exemplary embodiment, the bearing filters 71 are fitted in the oil holes 62A of the upper bearing 61. Thus, the engine oil 41 is filtered by the bearing filters 71 before flowing into between the bearing inner peripheral face 6A and the journal outer peripheral face 51F, and this prevents foreign particles from entering between the bearing inner peripheral face 6A and the journal outer peripheral face 51F and prevents the crankshaft 5 from being damaged. Note that the foreign particles that are trapped by the bearing filters 71 include foreign particles that have been originally present in the engine oil passage 26, foreign particles that have been originally present in the bearing oil groove 24C, and foreign particles that pass through the oil filter 44 and enter the engine oil passage 26. Note that the "originally present" means that the foreign particles have been present in the engine oil passage 26 and in the bearing oil groove 24C since the engine 1 was assembled.

(2) Owing to the structure described above in the item (1), the crank bearing 6 (upper bearing 61 and lower bearing 67) can be made smaller than conventional crank bearings. Also, the cylinder block, or the like, can be produced at a low production cost.

(3) The structure described above in the item (1) prevents foreign particles from entering between the crank pin 52 and the connecting-rod bearing 16 (i.e., between the pin outer peripheral face 52F and the bearing inner peripheral face 16F), and this reduces the possibility of the connecting rod bearing 16 being damaged.

(4) Even though the engine oil 41 is supplied from the oil pan 4 to the oil passage in the cylinder block 2 after being filtered by the oil strainer 43 and the oil filter 44, the engine oil 41 may contain extremely small foreign particles that cannot be trapped by these filtering elements. To cope with this, in the engine 1 of the first exemplary embodiment, a net that can trap even extremely small foreign particles that pass through the oil filter 44 of the engine oil 41 is used as the net 74 of each bearing filter 71. Therefore, even if extremely small foreign particles that cannot be trapped by the oil filter 44 enter the oil passage in the cylinder block 2 together with the engine oil 41, the foreign particles are trapped by each net 74. Thus, such extremely small foreign particles are prevented from entering between the bearing inner peripheral face 6A and the journal outer peripheral face 51F, and this reduces the possibility of the crankshaft 5 being damaged.

(5) In recent years, various improvements have been made to obtain higher combustion pressures in engines, and, in such engines, crank journals tend to be pressed against crank bearings with forces greater than those for conventional engines. In such engines, it is considered that even extremely small foreign particles can cause damage of the crankshaft when they enter between the crankshaft and the crank bearing, thus requiring a sufficient washing of foreign particles. Meanwhile, because the combustion pressures of conventional engines are lower than those of the improved engines mentioned above, even if extremely small foreign particles enter between the crankshaft and the crank bearing, the possibility of damage of the crankshaft is low. That is, it can be said that conventional engines adopt a structure that tolerates, to some extent, small foreign particles to enter between the crankshaft and the crank bearing.

According to the crank bearing 6 of the first exemplary embodiment, extremely small foreign particles, such as those allowed to enter between the crankshaft and the crank bearing in a conventional engine, are trapped by the bearing filters 71 that are provided in the upper bearing 61. This reduces the possibility of damage of the crankshaft 5 due to extremely small foreign particles in the engine 1 that uses higher combustion pressures than conventional engines.

(6) According to the crank bearing 6 of the first exemplary embodiment, the upper bearing 61 and the bearing filters 71 are formed such that no portion of the filter body 72 of each bearing filter 71 protrudes inward in the radial direction from the bearing inner peripheral face 6A. This prevents interferences between each bearing filter 71 and the crank journal 51.

(7) According to the crank bearing 6 of the first exemplary embodiment, each bearing filter 71 has the flange 72E, and the bearing filters 71 are retained, via the flanges 72E, not to move inward in the radial direction relative to the upper bearing 61. This prevents interferences between the bearing filters 71 and the crank journal 51.

(8) According to the crank bearing 6 of the first exemplary embodiment, the upper bearing 61 and the bearing filters 71 are formed such that no portion of the filter-body lower portion 72C of each bearing filter 71 protrudes inward in the radial direction from the oil-groove bottom face 63B. Thus, the engine oil 41 can be smoothly distributed throughout the whole part of the inner peripheral groove 63A from the inside of each bearing filter 71 (the upper bearing 61), and therefore a sufficient amount of the engine oil 41 can be supplied to the connecting-rod bearing 16.

(9) The structure of the crank bearing 6 of the first exemplary embodiment is substantially the same as the structure of conventional crank bearings except that the crank bearing 6 has the bearing filters 71. That is, the crank bearing 6 can be formed by simply fitting the bearing filters 71 into oil holes of a conventional crank bearing. As such, the crank bearing 6 can be manufactured using existing crank bearings. Thus, the crank bearing 6 can be easily put into practical use. Namely, the crank bearing 6 can be produced with a high production efficiency and at a low production cost.

Second Exemplary Embodiment

Figure 11A:
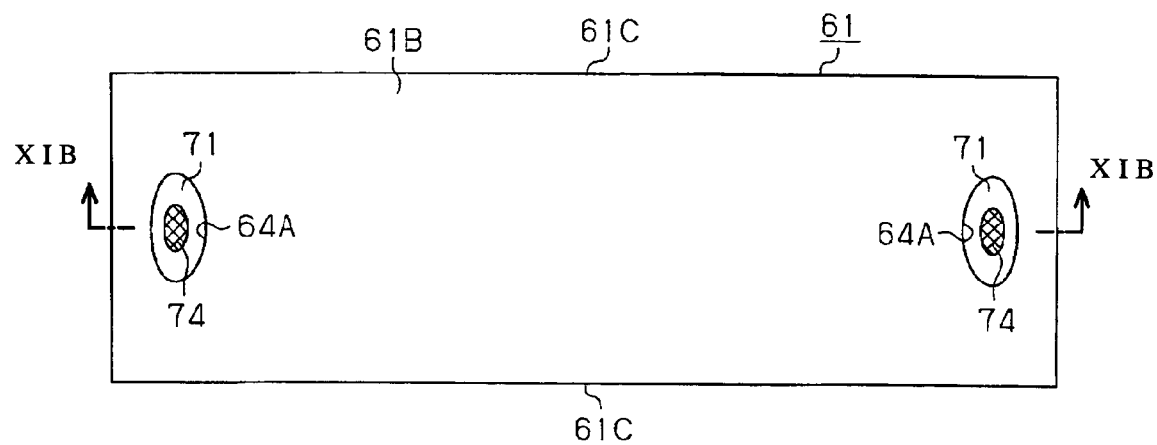
FIG. 11A is a plan view showing the plan structure of the upper bearing of a crank bearing of the second exemplary embodiment, which is one example of a bearing of the invention.
Figure 11B:
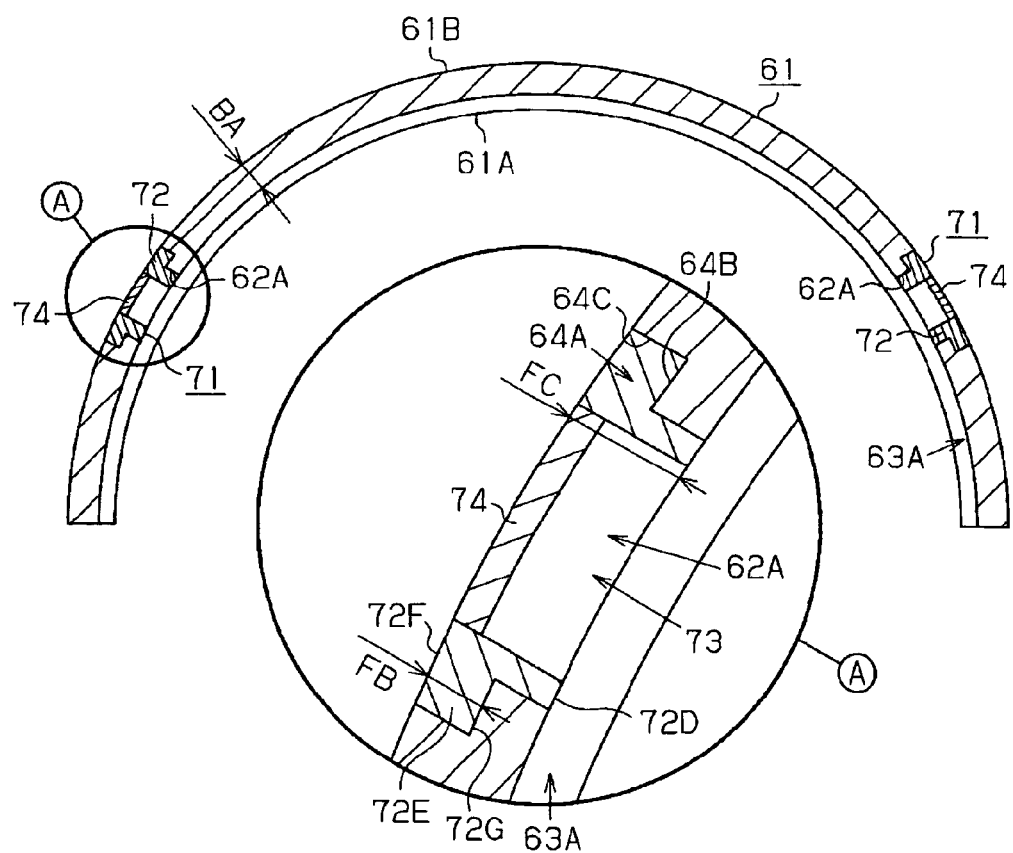
FIG. 11B is a cross-sectional view showing a cross section cutting through the upper bearing of the crank bearing of the second exemplary embodiment along the line XIB-XIB in FIG. 11A.

A second exemplary embodiment of the invention will be described with reference to FIG. 11A and FIG. 11B. The crank bearing of the second exemplary embodiment can be obtained by modifying part of the crank bearing of the first exemplary embodiment. Namely, the structure of the crank bearing of the second exemplary embodiment is the same as that of the crank bearing of the first exemplary embodiment except the points that will be described below. Note that the parts and components that are the same as those in the first exemplary embodiment are denoted by the same reference numerals in each drawing.

A countersunk hole 64A into which the flange 72E of the bearing filter 71 is fitted is formed at the inlet side of each oil hole 62A of the upper bearing 61. The countersunk hole 64A is defined by a hole bottom face 64B on the radially inner side of the upper outer peripheral face 61B and a hole side face 64C that extends in the circumferential direction about the center of the countersunk hole 64A.

Next, a description will be made of how the dimensions of each part of the bearing filter 71 are determined and of how each bearing filter 71 is attached to the upper bearing 61. In the second exemplary embodiment, the height of the bearing body 72 of each bearing filter 71, i.e., the distance from the filter-body top face 72B to the filter-body bottom face 72D will be denoted "filter height FC".

The dimensions of each part of the bearing filter 71 are as follows. The filter height FC is equal to the bearing thickness BA. The flange thickness FB is equal to the depth of the countersunk hole 64A. The filter height FC may be changed as needed within the range not exceeding the bearing thickness BA. Also, the flange thickness FB may be changed as needed within the range that flanges 72E are placed in the respective countersunk holes 64A.

Each bearing filter 71 is attached to the upper bearing 61 as follows. That is, the filter-body lower portion 72C is first inserted into the oil hole 62A from the outer side of the upper bearing 61, and then the filter body 72 is press-fitted until the flange bottom face 72G contacts the hole bottom face 64B, so that the bearing filter 71 is fixed to the upper bearing 61.

In the above-described structure of the upper bearing 61, the whole part of each filter body 72 is in the oil hole 62A. That is, each filter body 72 is formed and arranged such that no portion of the filter-body lower portion 72C protrudes inward in the radial direction from the oil-groove bottom face 63B and no portion of the filter-body upper portion 72A protrudes outward in the radial direction from the upper outer peripheral face 61B.

Advantageous Effects of Exemplary Embodiment

According to the crank bearing of the second exemplary embodiment described above in detail, the following advantageous effect can be obtained as well as the advantageous effects (1) to (8) in the first exemplary embodiment.

(10) According to the crank bearing 6 of the second exemplary embodiment, the upper bearing 61 and the bearing filters 71 are formed such that no portion of the filter-body upper portion 72A of each bearing filter 71 protrudes outward in the radial direction from the upper outer peripheral face 61B. Thus, the size of the crank bearing 6 can be reduced.

Third Exemplary Embodiment

A third exemplary embodiment of the invention will be described with reference to FIG. 12 to FIG. 19. The crank bearing of the third exemplary embodiment can be obtained by modifying part of the crank bearing of the first exemplary embodiment. Namely, the structure of the crank bearing of the third exemplary embodiment is the same as that of the crank bearing of the first exemplary embodiment except the points that will be described below. Note that the parts and components that are the same as those in the first exemplary embodiment are denoted by the same reference numerals in each drawing.

Figure 12:
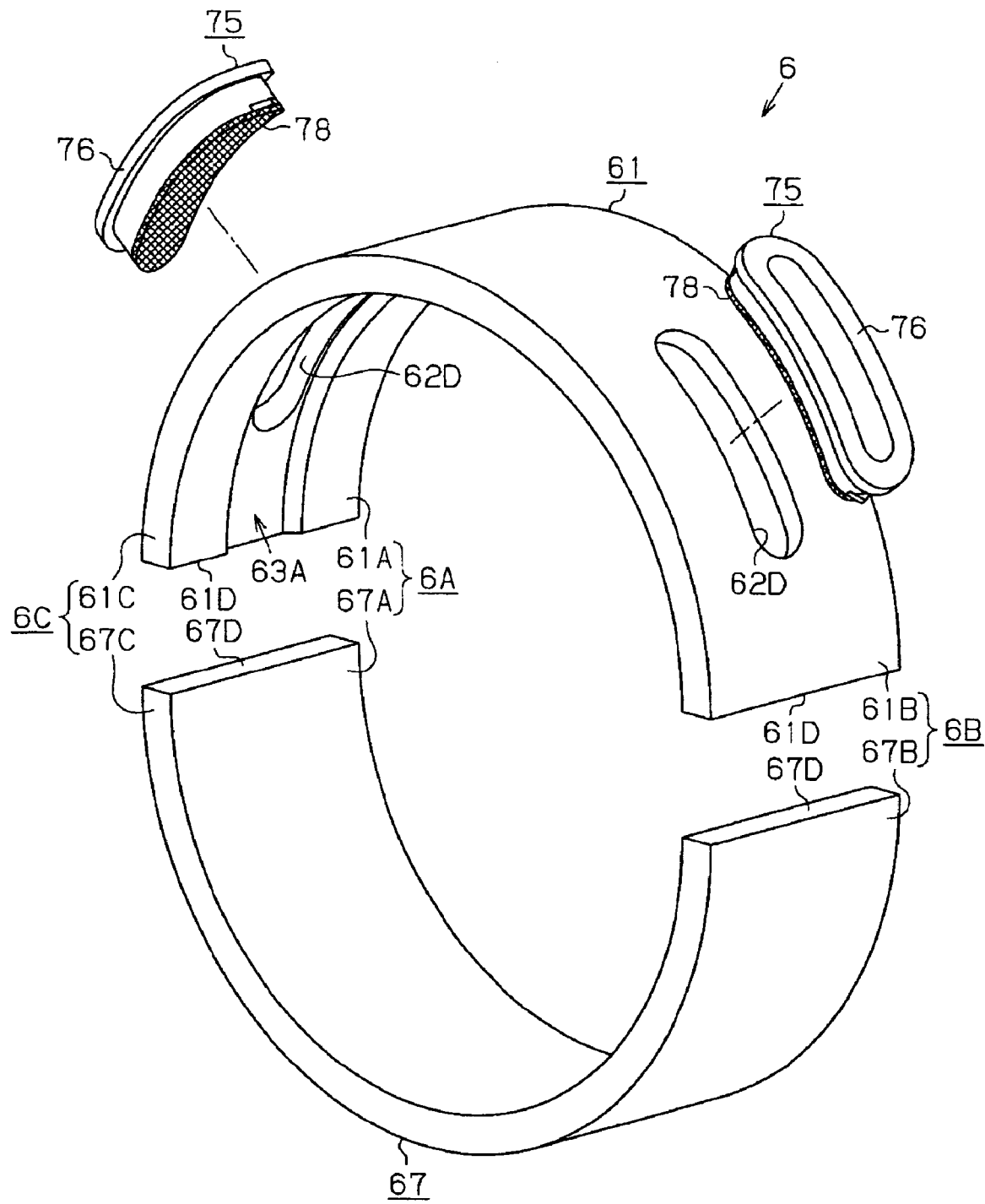
FIG. 12 is an exploded perspective view showing the perspective structure of a crank bearing of the third exemplary embodiment, which is one example of a bearing of the invention.
Figure 13A:
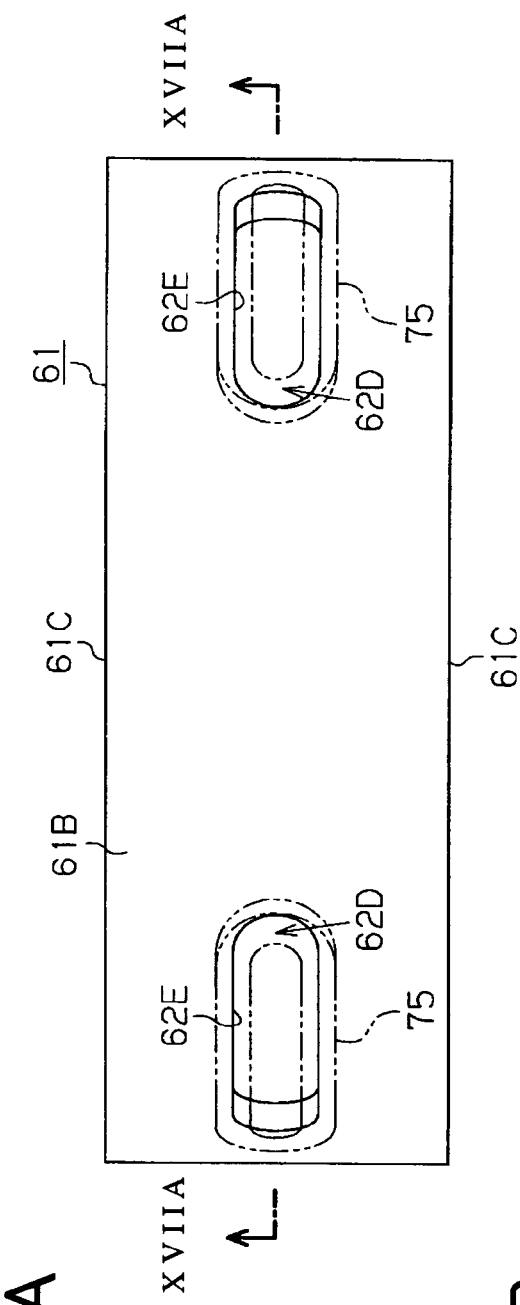
FIG. 13A is a plan view showing the planar structure of the upper bearing of the crank bearing of the third exemplary embodiment.
Figure 13B:
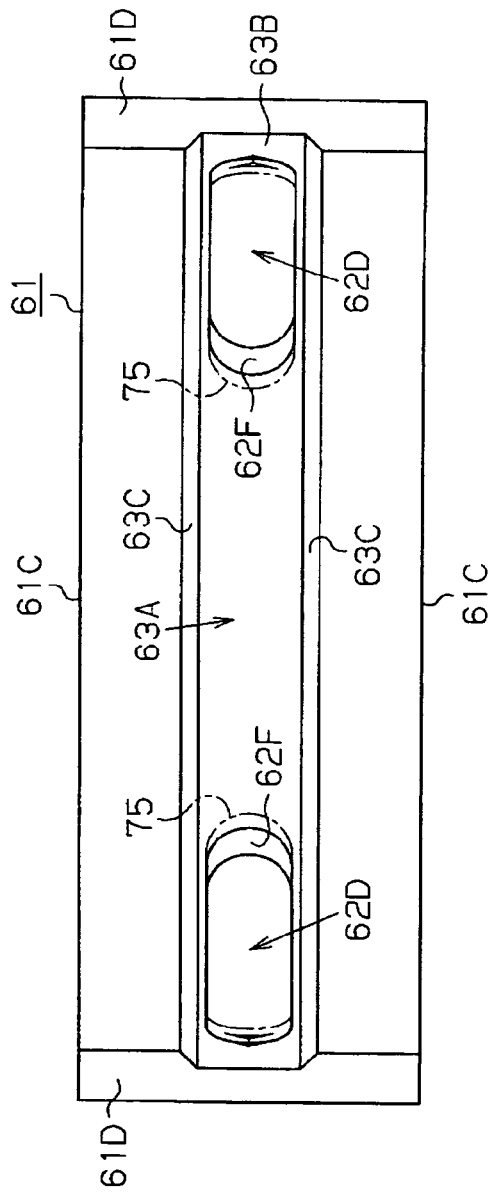
FIG. 13B is a bottom view showing the bottom structure of the upper bearing of the crank bearing of the third exemplary embodiment.
Figure 14A:
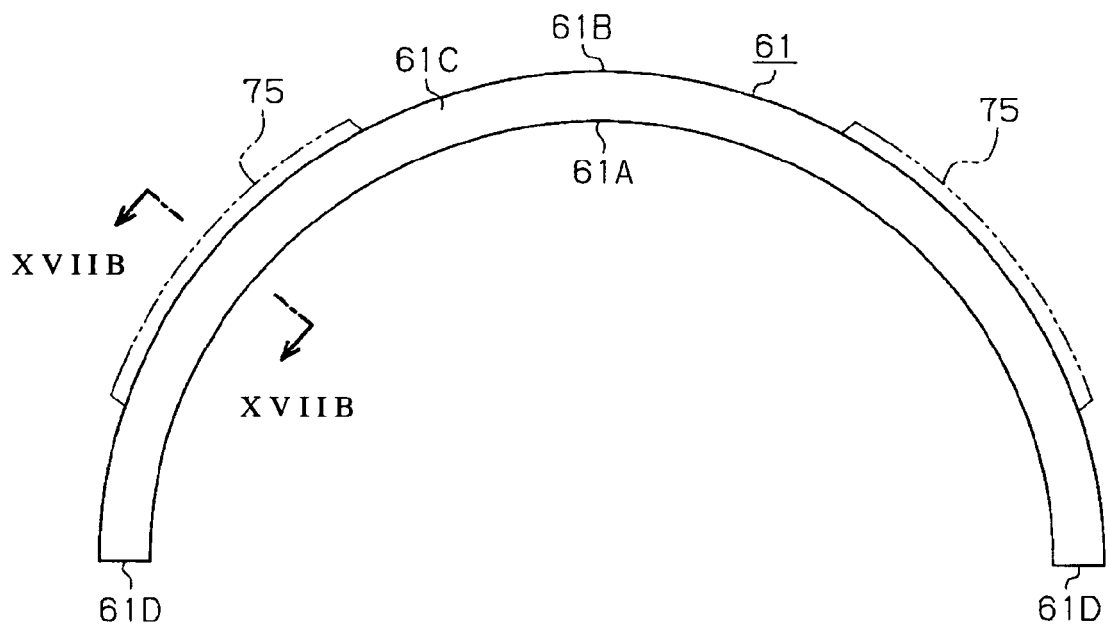
FIG. 14A is a front view showing the front structure of the upper bearing of the crank bearing of the third exemplary embodiment.
Figure 14B:
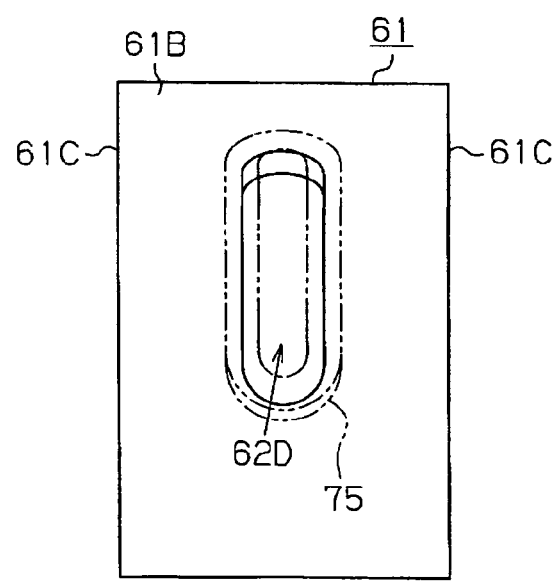
FIG. 14B is a side view showing the side structure of the upper bearing of the crank bearing of the third exemplary embodiment.
Figure 15A:
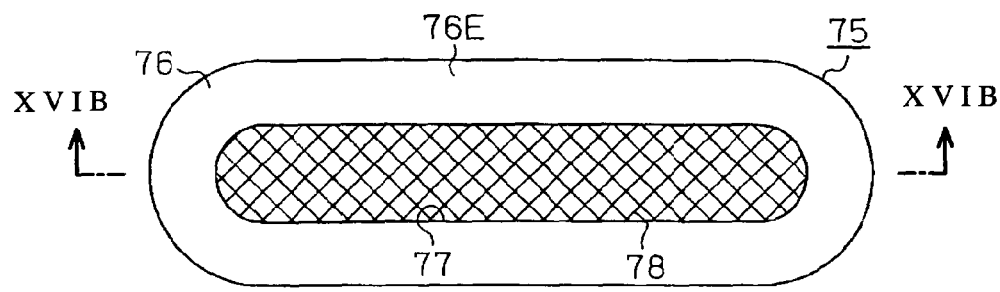
FIG. 15A is a plan view showing the planar structure of the bearing filter of the crank bearing of the third exemplary embodiment.
Figure 15B:
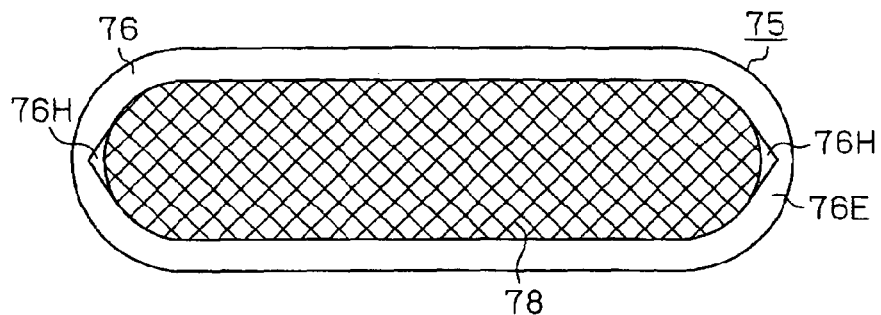
FIG. 15B is a bottom view showing the bottom structure of the bearing filter of the crank bearing of the third exemplary embodiment.
Figure 15C:
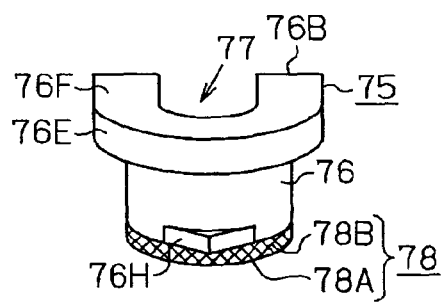
FIG. 15C is a side view showing the side structure of the bearing filter of the crank bearing of the third exemplary embodiment.

The structure of the crank bearing 6 of the third exemplary embodiment will be described with reference to FIG. 12 to FIG. 14. The upper bearing 61 has oil holes 62D through which the engine oil 41 is distributed from the outer side to the inner side of the crank bearing 6 and an inner peripheral oil groove 63A through which the engine oil 41 is distributed from the inner side of the upper bearing 61 to the inside of the crank journal 51. Bearing filters 75 for filtering the engine oil 41 are fitted in the respective oil holes 62D. Being fitted in the oil holes 62D, the bearing filters 75 are retained not to move relative to the upper bearing 61.

The oil holes 62D are oblong holes extending in the circumferential direction of the upper bearing 61. Each oil hole 62D has an oil hole inlet 62E that opens toward the outer side of the upper bearing 61 and an oil hole outlet 62F that opens toward the inner side of the upper bearing 61. That is, the oil holes 62D are through holes penetrating the upper bearing 61 from the upper outer peripheral face 61B to the oil-groove bottom face 63B.

Next, the structure of the bearing filters 71 will be described with reference to FIG. 15A to FIG. 16B. Each bearing filter 75 is constituted of a filter body 76 shaped to match the outline of the oil hole 62D of the upper bearing 61 and a net 78 that is attached to the filter body 76 to filter the engine oil 41.

The filter body 76 is made of resin. An oil hole 77 is formed in the filter body 76 to distribute the engine oil 41 from one end (filter-body upper portion 76A) to the other end (filter-body lower portion 76C) of the filter body 76. Projections 76H are provided on the outer peripheral side of the filter-body lower portion 76C. A flange 76E is formed on the outer peripheral side of the filter-body upper portion 76A. The net 78 is attached to the inner peripheral side of the filter-body upper portion 76A.

The oil hole 77 has an oil hole inlet 77A that opens toward the outer side of the crank bearing 6 when the bearing filter 75 is attached to the crank bearing 6 and an oil hole outlet 77B that opens toward the inner side of the crank bearing 6 when the bearing filter 75 is attached to the crank bearing 6. That is, the oil hole 77 is a through hole penetrating the filter body 76 from the top face (filter-body top face 76B) to the bottom face (filter-body bottom face 76D) of the filter body 76. The filter-body top face 76B curves to match the outline of the upper outer peripheral face 61B. The filter-body bottom face 76D curves to match the outline of the oil-groove bottom face 63B.

The flange 76E is provided at each bearing filter 75 to retain the bearing filter 75 so as not to move inward in the radial direction relative to the upper bearing 61. When the upper bearing 61 is attached to the partition-wall-side bearing portion 24A, the flange 76E is placed in the bearing oil groove 24C (refer to FIG. 18). The top face of the flange 76E (flange top face 76F) is formed as part of the filter-body top face 76B. The bottom face of the flange 76E (flange bottom face 76G) curves to match the outline of the upper outer peripheral face 61B.

The projections 76H are provided at each filter body 76 to retain the bearing filter 75 so as not to move outward in the radial direction relative to the upper bearing 61. The projections 76H are provided on the outer peripheral face of the filter body 76 at the positions opposite each other across the center of the oil hole 77. The top face of each projection 76H (projection top face 76I) curves to match the outline of the oil-groove bottom face 63B. The bottom face of each projection 76H (projection bottom face 76J) is formed as part of the filter-body bottom face 76D.

The net 78 is attached to the filter body 76 such that the engine oil 41 flowing through the filter body 76 can be entirely filtered. The net 78 has a peripheral wall portion 78A shaped to match the outline of the upper inner peripheral face 61A and a side wall portion 78B connecting the filter body 76 and the peripheral wall portion 78A. The peripheral wall portion 78A is arranged opposite the oil-groove bottom face 63B across a space when the bearing filter 75 is attached to the upper bearing 61. The side-wall portion 78B is arranged opposite each oil-groove side face 63C across a space when the bearing filter 75 is attached to the upper bearing 61. The mesh size of the net 78 is smaller than the diameters of foreign particles that flow through the oil filter 44 and enter the engine oil passage 26 in the cylinder block 2 (refer to FIG. 10) together with the engine oil 41. That is, the mesh size of the net 78 is small enough to trap even extremely small foreign particles contained in the engine oil 41.

Next, a description will be made, with reference to FIG. 17A and FIG. 17B, of how the dimensions of each part of the bearing filter 75 are determined and of how the bearing filter 75 is attached to the upper bearing 61. In the third exemplary embodiment, the dimensions of each part of each bearing filter 75 and the upper bearing 61 are designated as follows.

(A) The distance from the flange bottom face 76G of the bearing filter 75 to the projection top face 76I is denoted "filter upper portion height FD".

(B) The distance from the projection top face 76I of the bearing filter 75 to the peripheral wall portion 78A of the net 78 is denoted "filter lower portion height FE".

(C) The thickness of the flange 76E of the bearing filter 75, i.e., the distance from the flange top face 76F to the flange bottom face 76G is denoted "flange thickness FF".

(D) The thickness of each projection 76H of the bearing filter 75, i.e., the distance from the projection top face 76I to the projection bottom face 76J is denoted "projection thickness FG".

(E) The depth of the inner peripheral groove 63A of the upper bearing 61 is denoted "oil groove depth BB".

The dimensions of each part of the bearing filter 75 are as follows. The filter upper portion height FD is equal to the bearing thickness BA. The filter lower portion height FE is smaller than the oil groove depth BB of the bearing oil groove 24C. The projection thickness FG is as small as possible within the range not exceeding the oil groove depth BB but providing each projection 76H with a sufficient rigidity. Note that the filter lower portion height FE may be changed as needed within the range that provides a space between the partition-wall-side bearing portion 24A and the oil hole inlet 77A. Also, the projection height FG may be changed as needed within the range not exceeding the oil groove depth BB but providing each projection 76H with a sufficient rigidity.

Each bearing filter 75 is attached to the upper bearing 61 as follows. That is, the net 78 is first inserted into the oil hole 62D from the outer side of the upper bearing 61, and then the filter body 76 is press-fitted inward in the radial direction of the upper bearing 61 until the flange bottom face 76G and the projection top face 76I contact the upper outer peripheral face 61B and the oil-groove bottom face 63B, respectively, so that the bearing filter 75 is fixed to the upper bearing 61.

The oil hole outlet 77B (the oil hole outlet 62F) of the upper bearing 61 is covered by the net 78. That is, each bearing filter 75 is attached such that the engine oil 41 that has flown out from the filter body 76 (the oil holes 62D) entirely passes through the net 78 before flowing into between the bearing inner peripheral face 6A and the journal outer peripheral face 51F via the inner peripheral groove 63A. Also, the filter-body lower portion 76C of the filter body 76 is placed close to the oil-groove bottom face 63B, and the net 78 is disposed in the inner peripheral groove 63A. That is, the peripheral wall portion 78A and the side-wall portion 78B do not protrude inward in the radial direction from the upper inner peripheral face 61A. A space is provided between the net 78 and the upper bearing 61.

Figure 18:
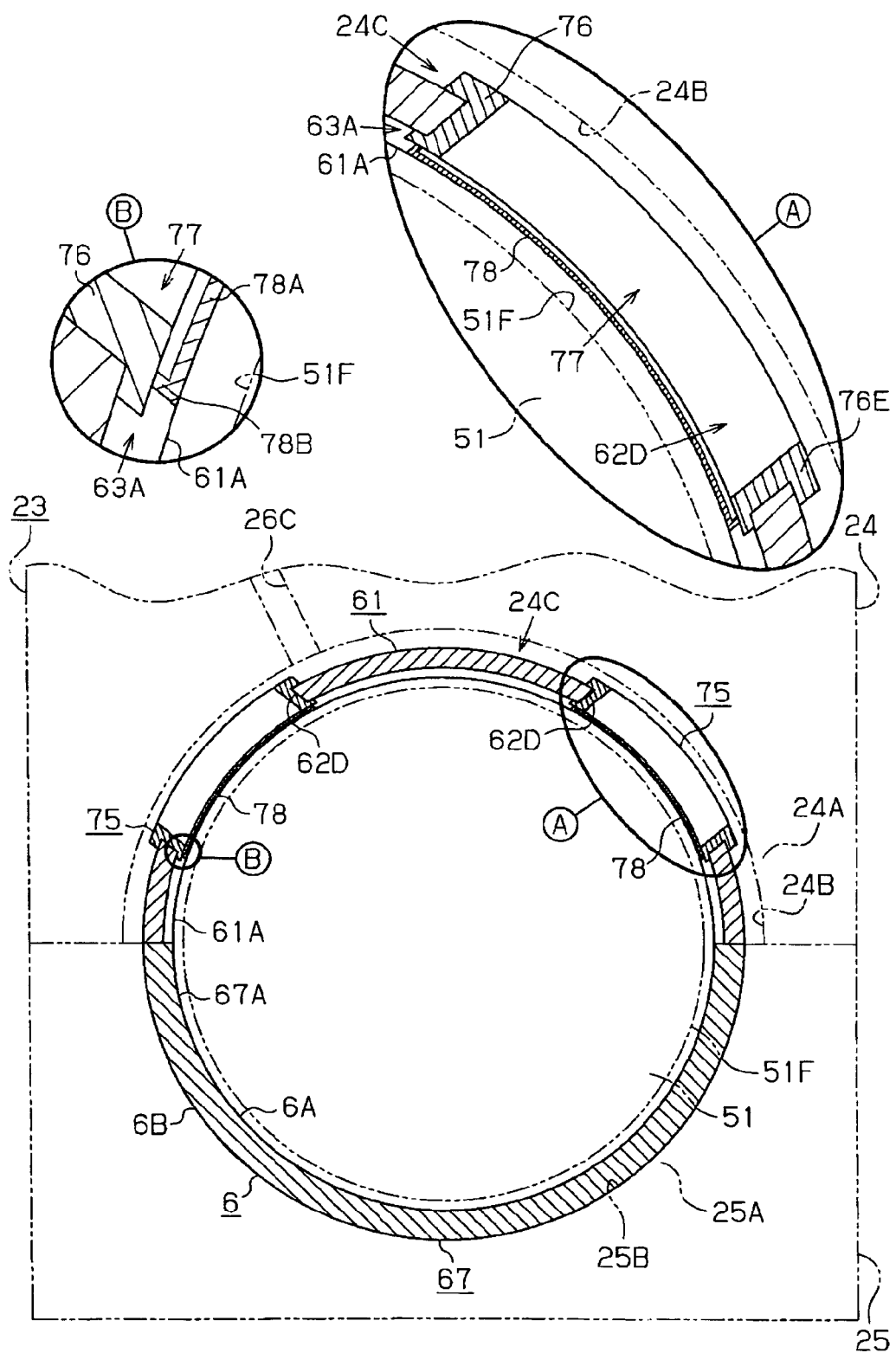
FIG. 18 is a cross-sectional view cutting through the crankshaft and its peripheral elements incorporated in the engine of the third exemplary embodiment along the radial direction of the crankshaft.

The structure for supporting the crank journal 51 will be described with reference to FIG. 18. FIG. 18 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C and the oil holes 62D of the upper bearing 61 (the oil holes 77 of the bearing filters 75) communicate with each other. That is, the upper bearing 61 is fixed such that the engine oil 41 that has flown out from the third oil passage 26C flows into the oil hole 77 of each bearing filter 75. The flange 72E of each bearing filter 71 is placed in the bearing oil groove 24C. A space is provided between the journal outer peripheral face 51F and the net 78.

The engine oil 41 in the cylinder block 2 is distributed to each part of the crankshaft 5 as follows. The engine oil 41 flows from the third oil passage 26C into the bearing oil groove 24C via the opening of the partition-wall-side bearing portion 24A. Then, the engine oil 41 flows from the bearing oil groove 24C to the inside of the filter body 76 (the upper bearing 61) via the inlet of the oil hole 77 of each bearing filter 75. Then, the engine oil 41 flows from the inside of the bearing filter 75 into between the bearing inner peripheral face 6A and the journal outer peripheral face 51F via the net 78 and the inner peripheral groove 63A.

Figure 19A:
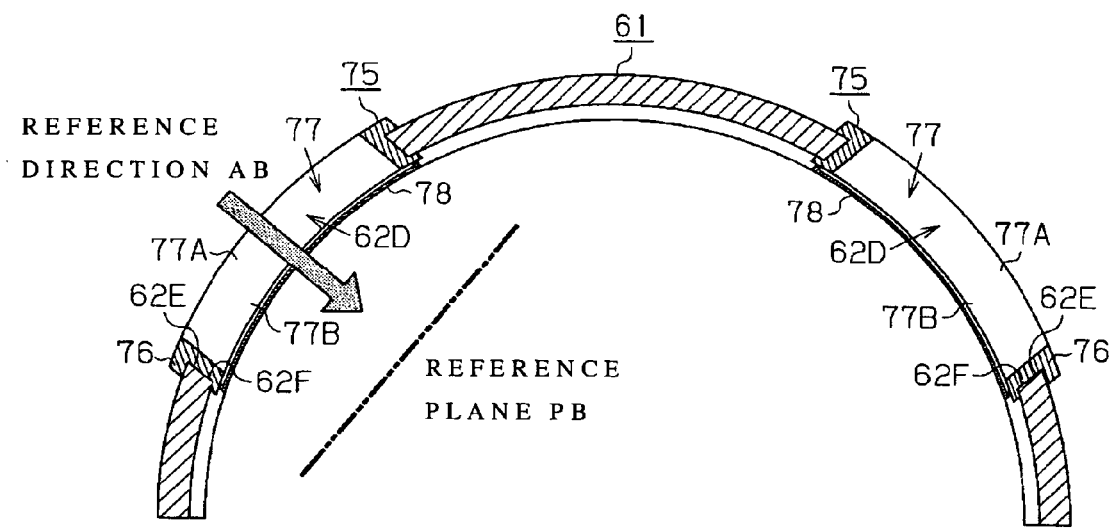
FIG. 19A is another cross-sectional view showing the cross section cutting through the upper bearing of the crank bearing of the third exemplary embodiment along the line XVIIA-XVIIA in FIG. 13A.
Figure 19B:
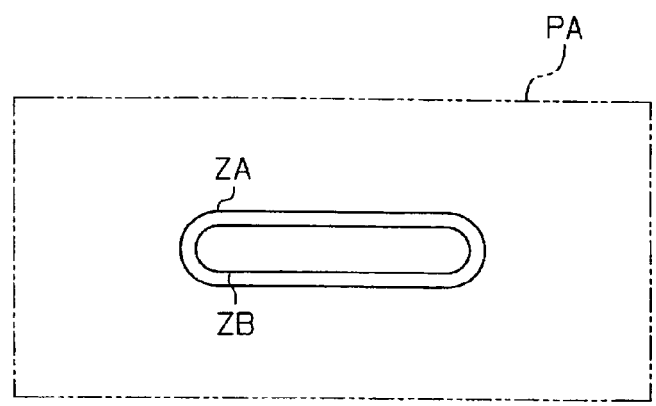
FIG. 19B is a projected view showing the oil hole outlet of the upper bearing and the oil hole outlet of the bearing filter of the third exemplary embodiment.

Next, a description will be made, with reference to FIG. 19A and FIG. 19B, of how the area of the net 78 is determined. The surface area of the net 78 is denoted "reference area SN1". The area of the portion of the bearing filter 75 of the crank bearing 6 through which the engine oil 41 passes is denoted "effective area SX1". The flow direction of the engine oil 41 passing through the oil hole outlet 62F is denoted "reference direction AA". The plane perpendicular to the reference direction AA is denoted "reference plane PA". The figure obtained by projecting the oil hole outlet 62F onto the reference plane PA in the reference direction AA is denoted "outlet figure ZA". The area of the outlet figure ZA is denoted "passage area SA" of the oil hole outlet 62F. The figure obtained by projecting the oil hole outlet 77B onto the reference plane PA in the reference direction AA is denoted "outlet figure ZB", and the area of the outlet figure ZB is denoted "passage area SB" of the oil hole outlet 77B.

According to the crank bearing 6, the reference area SN1 of the net 78 is larger than the passage area SA of the oil hole outlet 62F and the passage area SB of the oil hole outlet 77B, and the reference area SN1 and the effective area SX1 are equal to each other. That is, by providing a space between the net 78 and the upper bearing 61, the effective area SX1 is made equal to the reference area SN1.

Advantageous Effects of Exemplary Embodiment

According to the crank bearing of the third exemplary embodiment described above, the following advantageous effects can be obtained as well as the advantageous effects (1) to (5) in the first exemplary embodiment.

(11) According to the crank bearing 6 of the third exemplary embodiment, the oblong oil holes 62D are formed in the upper bearing 61 and the filters (the bearing filters 75) of the crank bearing 6 are formed to match the outlines of the oil holes 62D. Thus, as compared to when the oil holes of the upper bearing 61 are circular, the maximum amount of foreign particles that can be trapped at each bearing filter 75 (the amount of foreign particle that can be trapped at each bearing filter 75 before the net 78 clogs (maximum foreign particle trap amount)) increases. Thus, clogging of the net 78 can be prevented appropriately.

(12) According to the crank bearing 6 of the third exemplary embodiment, the net 78 of each bearing filter 75 is placed in the inner peripheral groove 63A (the oil hole outlet 62F side). This prevents the foreign particles that have been originally present in the upper outer peripheral face 61B and in the oil holes 62D of the upper bearing 61 from flowing into between the bearing inner peripheral face 6A and the journal outer peripheral face 51F. Note that the "originally present" means that the foreign particles have been present in the upper outer peripheral face 61B and in the oil holes 62D since the engine 1 was assembled.

(13) According to the crank bearing 6 of the third exemplary embodiment, the upper bearing 61 and the bearing filters 75 are formed such that no portion of the net 78 of each bearing filter 75 protrudes inward in the radial direction from the bearing inner peripheral face 6A. This prevents interferences between each bearing filter 75 and the crank journal 51.

(14) According to the crank bearing 6 of the third exemplary embodiment, the flange 76E is formed on each bearing filter 75 to retain the bearing filter 75 so as not to move inward in the radial direction relative to the upper bearing 61. This prevents interferences between each bearing filter 75 and the crank journal 51.

(15) According to the crank bearing 6 of the third exemplary embodiment, the upper bearing 61 and the bearing filter 75 are formed such that the oil hole outlet 77B of each filter body 76 is located close to the oil-groove bottom face 63B. Therefore, the engine oil 41 in the bearing filter 75 (the upper bearing 61) is smoothly distributed throughout the whole part of the inner peripheral groove 63A, and thus a sufficient amount of the engine oil 41 can be supplied to the connecting-rod bearing 16.

(16) In the engine 1, a space is provided between the partition-wall-side bearing portion 24A and the bearing filter 75. Therefore, each bearing filter 75 may move outward in the radial direction relative to the upper bearing 61. In this case, the effective area SX1 decreases as the net 78 partially, or entirely, moves into the oil hole 62D, and therefore the maximum amount of foreign particles that can be trapped at the bearing filter 75 decreases accordingly. To counter this, in the crank bearing 6 of the third exemplary embodiment, the projections 76H are provided at each bearing filter 75 to retain the bearing filter 75 so as not to move outward in the radial direction relative to the upper bearing 61. As such, in the third exemplary embodiment, the reduction of the maximum foreign particle trap amount of the bearing filter 75 can be effectively suppressed.

(17) According to the crank bearing 6 of the third exemplary embodiment, the oil hole outlet 77B of each filter body 76 is provided close to the oil-groove bottom face 63B by setting the projection height FG as small as possible within the range not exceeding the oil groove depth BB but providing each projection 76H with a sufficient rigidity. As such, the engine oil 41 that has flown out from each oil hole outlet 77B smoothly distributed throughout the whole part of the inner peripheral groove 63A via the net 78. Thus, a sufficient amount of the engine oil 41 can be supplied to the connecting-rod bearing 16 while each bearing filter 75 is retained by the projections 76H so as not to move outward in the radial direction.

(18) The crank bearing 6 of the third exemplary embodiment adopts the structure in which the net 78 is provided outside of the oil hole 62D so that the reference area SN1 of the net 78 is larger than the passage area SA of the oil hole outlet 62F and the passage area SB of the oil hole outlet 77B. That is, based on this structure, the reference area SN1 is made larger than the passage areas SA and SB. As such, the maximum foreign particles trap amount of the filter is large as compared to when the net of the crank bearing 6 is disposed in the oil hole of the upper bearing 61, and therefore the possibility of clogging of the net 78 decreases accordingly.

(19) According to the crank bearing 6 of the third exemplary embodiment, the effective area SX1 is made equal to the reference area SN1 by providing a space between the net 78 of the bearing filter 75 and the upper bearing 61. Thus, the whole part of the net 78 can be used to trap foreign particles, and therefore the possibility of clogging of the net 78 decreases accordingly.

Advantageous Effects of Exemplary Embodiments

Note that the third exemplary embodiment may be modified as described below.

In the third exemplary embodiment, the two projections 76H are provided on each bearing filter 75. However, any number of projections 76H may be provided as long as the bearing filter 75 can be appropriately retained by the projections 76H so as not to move outward in the radial direction relative to the upper bearing 61.

In the third exemplary embodiment, the passage area SA of the oil hole outlet 62F may alternatively be defined as follows. Assuming Where the cross section of the oil hole outlet 62F perpendicular to the flow direction of the engine oil 41 is a reference cross section, the passage area SA is defined as an area in which the oil hole outlet 62F overlaps with the reference cross section.

In the third exemplary embodiment, the passage area SB of the oil hole outlet 77B may alternatively be defined as follows. Where the cross section of the oil hole outlet 77B perpendicular to the flow direction of the engine oil 41 is a reference cross section, the passage area SB is defined as an area in which the oil hole outlet 77B overlaps with the reference cross section.

Fourth Exemplary Embodiment

Figure 20A:
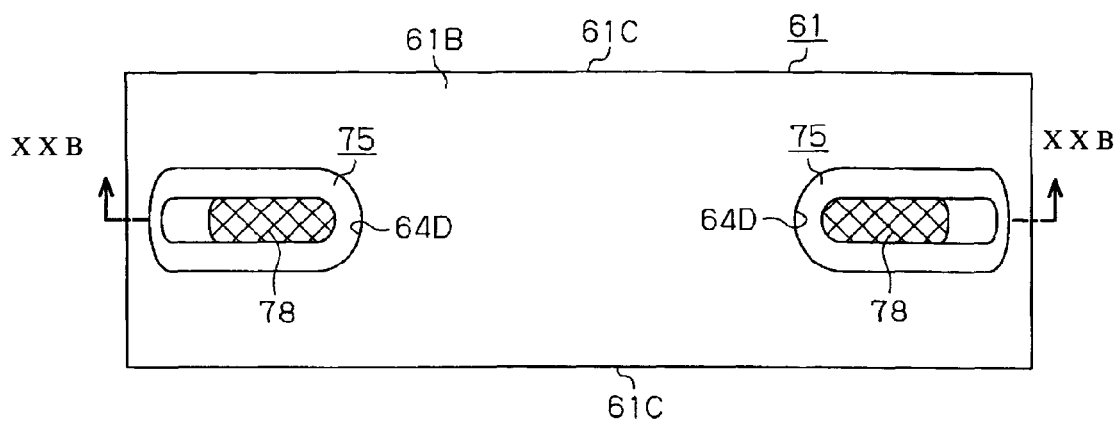
FIG. 20A is a plan view showing the plan structure of the upper bearing of a crank bearing of the fourth exemplary embodiment, which is one example of a bearing of the invention.
Figure 20B:
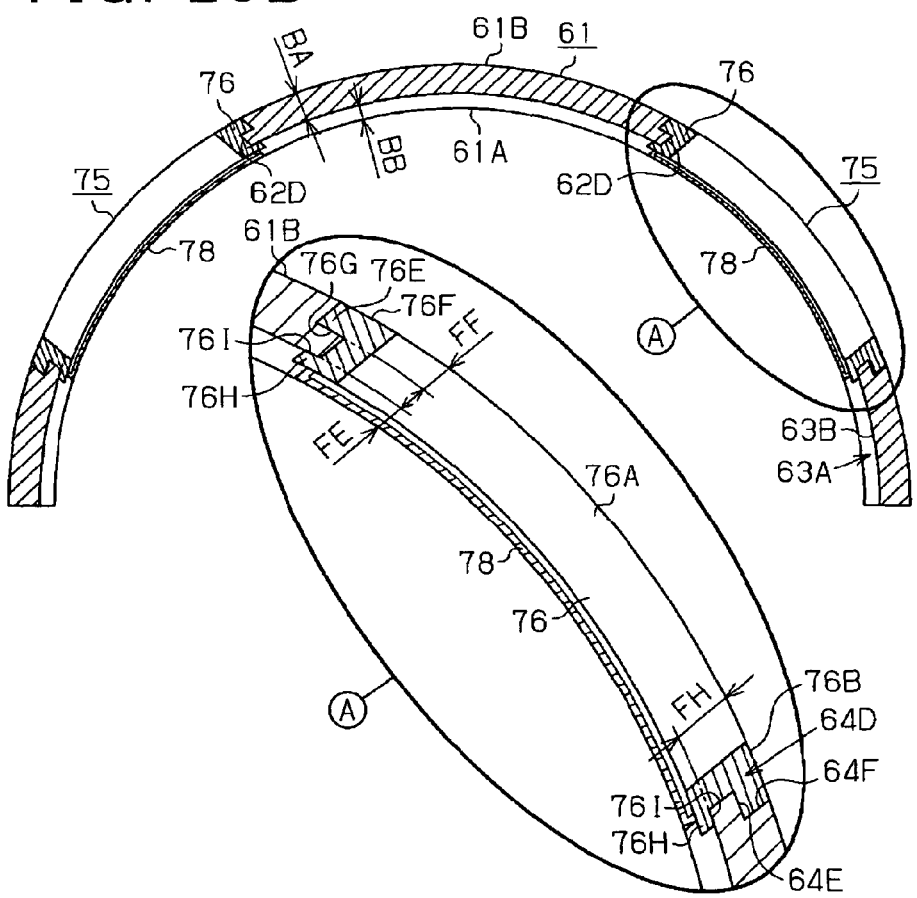
FIG. 20B is a cross-sectional view showing a cross section cutting through the upper bearing of the crank bearing of the fourth exemplary embodiment along the line XXB-XXB in FIG. 20A.

A fourth exemplary embodiment of the invention will be described with reference to FIG. 20. The crank bearing of the fourth exemplary embodiment can be obtained by modifying part of the crank bearing of the third exemplary embodiment. Namely, the structure of the crank bearing of the fourth exemplary embodiment is the same as that of the crank bearing of the third exemplary embodiment except the points that will be described below. Note that the parts and components that are the same as those in the third exemplary embodiment are denoted by the same reference numerals in each drawing.

A countersunk hole 64D into which the flange 76E of the bearing filter 75 is fitted is formed at the inlet side of each oil hole 62D of the upper bearing 61. The countersunk hole 64D is defined by a hole bottom face 64E on the radially inner side of the upper outer peripheral face 61B and a hole side face 64F that extends in the circumferential direction about the center of the countersunk hole 64D.

Next, a description will be made of how the dimensions of each part of the bearing filter 75 are determined and of how each bearing filter 75 is attached to the upper bearing 61. In the fourth exemplary embodiment, the distance from the filter-body top face 76B of the bearing filter 75 to the projection top face 76I will be denoted "filter upper portion height FH".

The dimensions of each part of the bearing filter 75 are as follows. The filter upper portion height FH is equal to the bearing thickness BA. The filter lower portion height FE is equal to the oil groove depth BB. The flange thickness FF is equal to the depth of the countersunk hole 64D. The filter lower portion height FE may be changed as needed within the range that the flanges 76E are placed in the respective countersunk holes 64D.

Each bearing filter 75 is attached to the upper bearing 61 as follows. The net 78 is first inserted into the oil hole 62D from the outer side of the upper bearing 61, and then the filter body 76 is press-fitted inward in the radial direction until the flange bottom face 76G and the projection top face 76I contact the hole bottom face 64E and the oil-groove bottom face 63B, respectively, so that the bearing filter 75 is fixed to the upper bearing 61.

In the above-described structure of the upper bearing 61, the whole part of each bearing filter 75 is located on the radially inner side of the upper outer peripheral face 61B. That is, no portion of the filter-body upper portion 76A of each filter body 76 protrudes outward in the radial direction from the upper outer peripheral face 61B.

Advantageous Effects of Exemplary Embodiment

According to the crank bearing of the fourth exemplary embodiment described above in detail, the following advantageous effect can be obtained as well as the advantageous effects (1) to (5) in the first exemplary embodiment and the advantageous effects (11) to (19) in the third exemplary embodiment.

(20) According to the crank bearing 6 of the fourth exemplary embodiment, because the upper bearing 61 and the bearing filters 75 are formed such that no portion of the filter-body upper portion 76A of each bearing filter 75 protrudes outward in the radial direction from the upper outer peripheral face 61B, the size of the crank bearing 6 can be reduced.

Fifth Exemplary Embodiment

A fifth exemplary embodiment of the invention will be described with reference to FIG. 21 to FIG. 27B. The crank bearing of the fifth exemplary embodiment can be obtained by modifying part of the crank bearing of the third exemplary embodiment. Namely, the structure of the crank bearing of the fifth exemplary embodiment is the same as that of the crank bearing of the third exemplary embodiment except the points that will be described below. Note that the parts and components that are the same as those in the third exemplary embodiment are denoted by the same reference numerals in each drawing.

Figure 21:
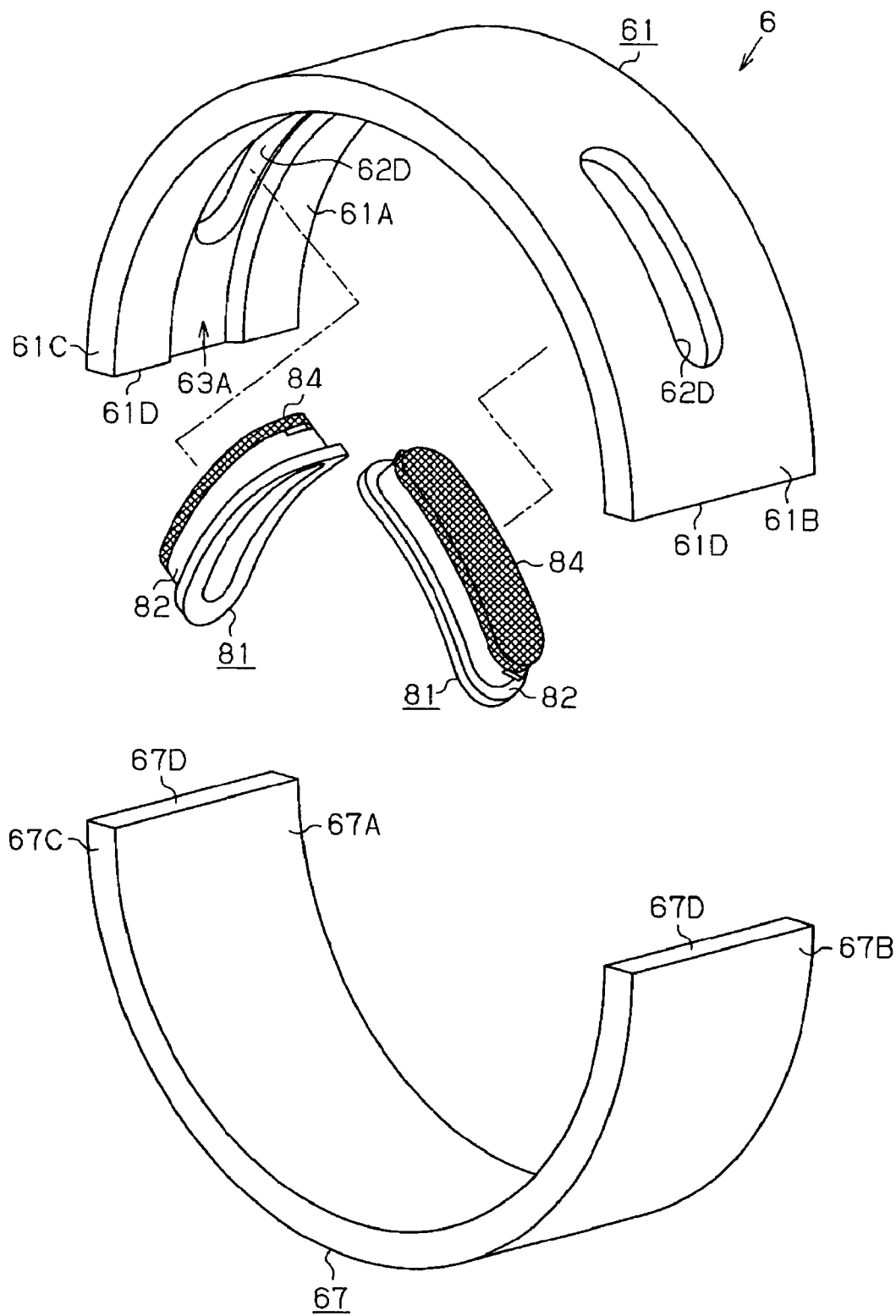
FIG. 21 is an exploded perspective view showing the perspective structure of a crank bearing of the fifth exemplary embodiment, which is one example of a bearing of the invention.
Figure 22A:
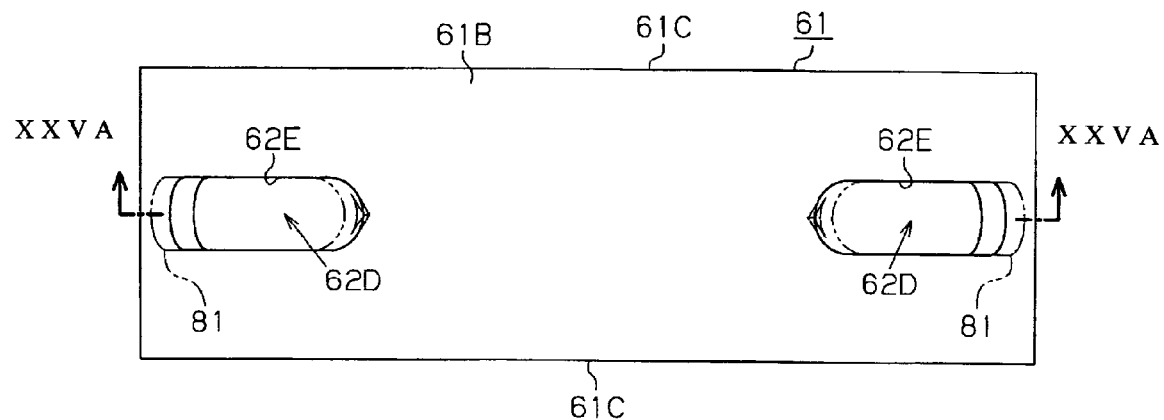
FIG. 22A is a plan view showing the planar structure of the upper bearing of the crank bearing of the fifth exemplary embodiment.
Figure 22B:
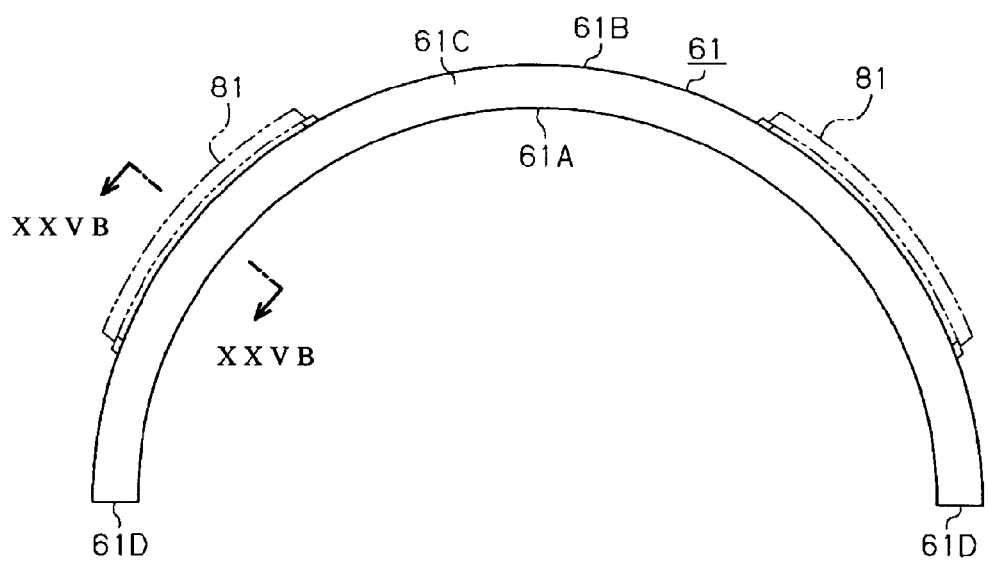
FIG. 22B is a front view showing the front structure of the upper bearing of the crank bearing of the fifth exemplary embodiment.
Figure 23A:
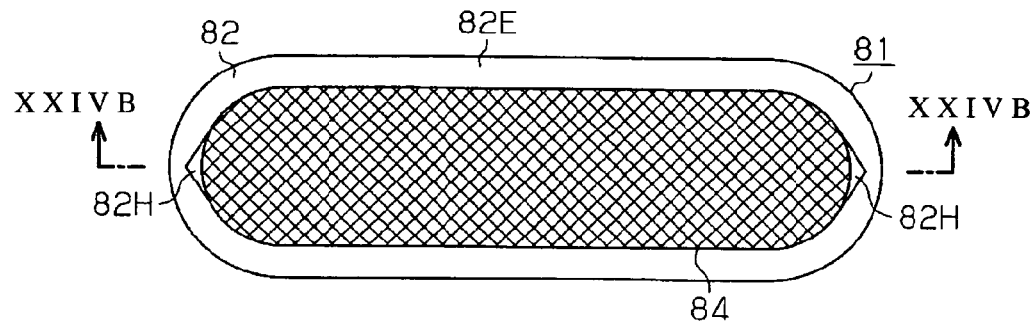
FIG. 23A is a plan view showing the planar structure of the bearing filter of the crank bearing of the fifth exemplary embodiment.
Figure 23B:
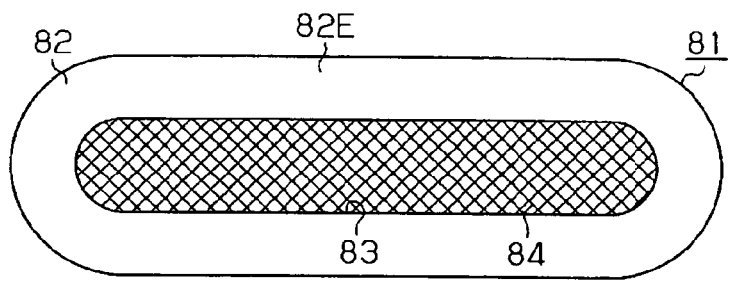
FIG. 23B is a bottom view showing the bottom structure of the bearing filter of the crank bearing of the fifth exemplary embodiment.
Figure 23C:
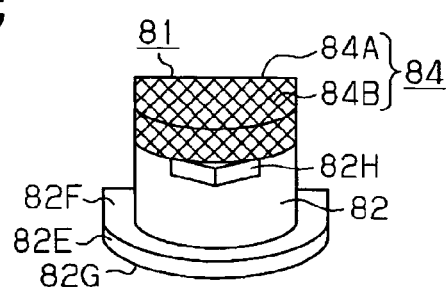
FIG. 23C is a side view showing the side structure of the bearing filter of the crank bearing of the fifth exemplary embodiment.
Figure 24A:
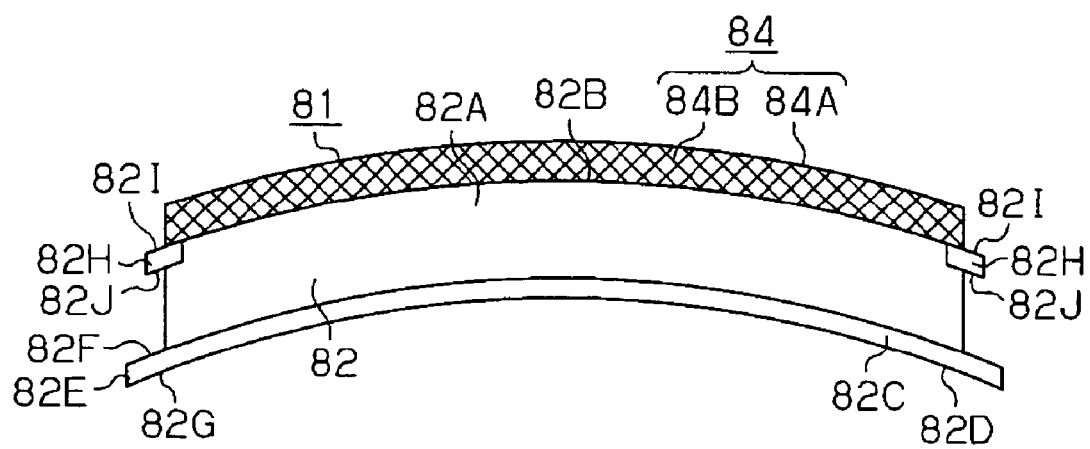
FIG. 24A is a front view showing the front structure of the bearing filter of the crank bearing of the fifth exemplary embodiment.
Figure 24B:
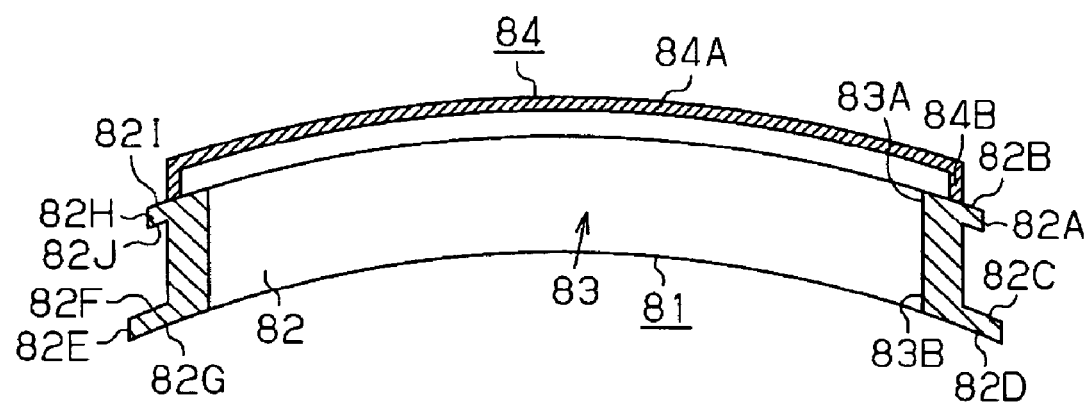
FIG. 24B is a cross-sectional view showing a cross section cutting through the bearing filter of the crank bearing of the fifth exemplary embodiment along the line XXIVB-XXIVB in FIG. 23A.

The structure of the crank bearing 6 of the fifth exemplary embodiment will be described with reference to FIG. 21 to FIG. 22B. Bearing filters 81 for filtering the engine oil 41 are fitted in the oil holes 62D of the upper bearing 61. Being fitted in the oil holes 62D, the bearing filters 81 are retained not to move relative to the upper bearing 61.

Next, the structure of the bearing filters 81 will be described with reference to FIG. 23A to FIG. 24B. Each bearing filter 81 is constituted of a filter body 82 shaped to match the outline of the oil hole 62D of the upper bearing 61 and a net 84 that is attached to the filter body 82 to filter the engine oil 41.

The filter body 82 is made of resin. A hole (oil hole 83) is formed in the filter body 82 to distribute the engine oil 41 from one end (filter-body upper portion 82A) to the other end (filter-body lower portion 82C) of the filter body 82. A flange 82E is formed on the outer peripheral side of the filter-body lower portion 82C. Projections 82H are formed on the outer peripheral side of the filter-body upper portion 82A. The net 84 is attached to the inner peripheral side of the filter-body upper portion 82A.

The oil hole 83 has an oil hole inlet 83A that opens toward the outer side of the crank bearing 6 when the bearing filters 81 is attached to the crank bearing 6 and an oil hole outlet 83B that opens toward the inner side of the crank bearing 6 when the bearing filters 81 is attached to the crank bearing 6. That is, the oil hole 83 is a through hole penetrating the filter body 82 from the top face (filter-body top face 82B) to the bottom face (filter-body bottom face 82D) of the filter body 82. The filter-body top face 82B curves to match the outline of the upper outer peripheral face 61B. The filter-body bottom face 82D curves to match the outline of the oil-groove bottom face 63B.

The flange 82E is provided at each filter body 82 to retain the bearing filter 81 so as not to move inward in the radial direction relative to the upper bearing 61. The top face of the flange 82E (flange top face 82F) curves to match the outline of the oil-groove bottom face 63B. The bottom face of the flange 82E (flange bottom face 82G) is formed as part of the filter-body bottom face 82D.

The projections 82H are provided at each filter body 78 to retain the bearing filter 81 so as not to move outward in the radial direction relative to the upper bearing 61. The projections 82H are provided on the outer peripheral side of the filter body 82 at the positions opposite each other across the center of the oil hole 83. The projections 82H are placed in the bearing oil groove 24C (refer to FIG. 26) when the upper bearing 61 is attached to the partition-wall-side bearing portion 24A. The top face of each projection 82H (projection top face 82I) is formed as part of the filter-body top face 82B. The bottom face of each projection 82H (projection bottom face 82J) curves to match the outline of the upper outer peripheral face 61B.

The net 84 is attached to the filter body 82 such that the engine oil 41 flowing through the filter body 82 can be entirely filtered. The net 84 has a peripheral wall portion 84A that curves to match the outline of the upper outer peripheral face 61B and a side wall portion 84B connecting the filter body 82 and the peripheral wall portion 84A. The peripheral wall portion 84A and the side wall portion 84B face the partition-wall-side bearing portion 24A across a space when the bearing filter 81 is attached to the upper bearing 61. The mesh size of the net 84 is smaller than the diameters of foreign particles that flow through the oil filter 44 and enter the engine oil passage 26 (refer to FIG. 10) in the cylinder block 2 together with the engine oil 41. That is, the mesh size of the net 78 is small enough to trap even extremely small foreign particles contained in the engine oil 41.

Next, a description will be made, with reference to FIG. 25A and FIG. 25B, of how the dimensions of each part of the bearing filter 81 are determined and how the bearing filter 81 is attached to the upper bearing 61. In the fifth exemplary embodiment, the dimensions of each part of the bearing filter 81 are designated as follows.

(A) The distance from the peripheral wall portion 84A of the net 84 to the projection bottom face 82J is denoted "filter upper portion height FI".

(B) The distance from the projection bottom face 82J of the bearing filter 81 to the projection top face 82F is denoted "filter lower portion height FJ".

(C) The thickness of the flange 82E of the bearing filter 81, i.e., the distance from the projection top face 82F to the flange bottom face 82G is denoted "flange thickness FK".

(D) The thickness of each projection 82H of the bearing filter 81, i.e., the distance from the projection top face 82I to the projection bottom face 82J is denoted "projection thickness FL".

The dimensions of each part of the bearing filter 81 are as follows. The filter upper portion height FI is smaller than the depth of the bearing oil groove 24C. The filter lower portion height FJ is equal to the bearing thickness BA. The flange thickness FK is as small as possible within the range not exceeding the oil groove depth BB but providing the flange 82E with a sufficient rigidity. The projection thickness FL is as small as possible within the range that provides the projection 82H with a sufficient rigidity. Note that the filter upper portion height FI and the projection thickness FL may be changed as needed within the range that provides a space between the peripheral wall portion 84A of the net 84 and the partition-wall-side bearing portion 24A. Also, the flange thickness FK may be changed as needed within the range not exceeding the oil groove depth BB but providing the flange 82E with a sufficient rigidity.

Each bearing filter 81 is attached to the upper bearing 61 as follows. That is, the net 84 is first inserted into the oil hole 62D from the inner side of the upper bearing 61, and then the filter body 82 is press-fitted outward in the radial direction of the upper bearing 61 until the projection top face 82F and the projection bottom face 82J contact the oil-groove bottom face 63B and the upper outer peripheral face 61B, respectively, so that the bearing filter 81 is fixed to the upper bearing 61.

The oil hole inlet 83A (the oil hole inlet 62E) of the upper bearing 61 is covered by the net 84. Thus, each bearing filter 81 is attached such that the engine oil 41 in the bearing oil groove 24C entirely passes through the net 84 before flowing into between the bearing inner peripheral face 6A and the journal outer peripheral face 51F via the oil hole 62D. Also, the filter-body lower portion 82C of each filter body 82 is located close to the oil-groove bottom face 63B. A space is provided between the net 84 and the partition-wall-side bearing portion 24A.

Figure 16A:
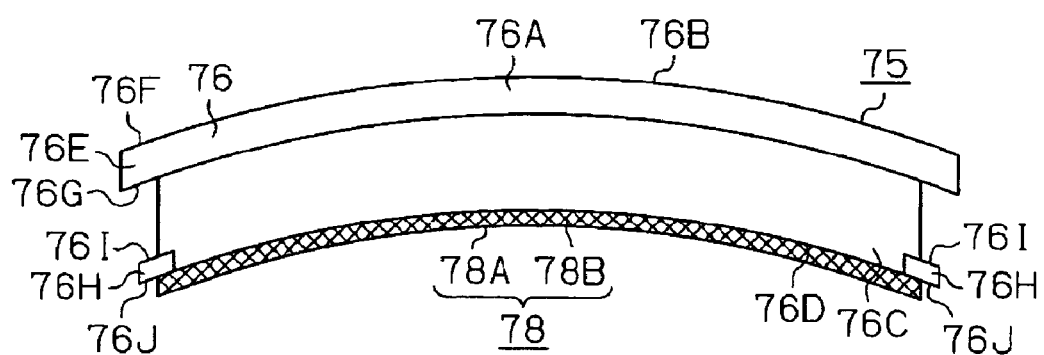
FIG. 16A is a front view showing the front structure of the bearing filter of the crank bearing of the third exemplary embodiment.
Figure 16B:
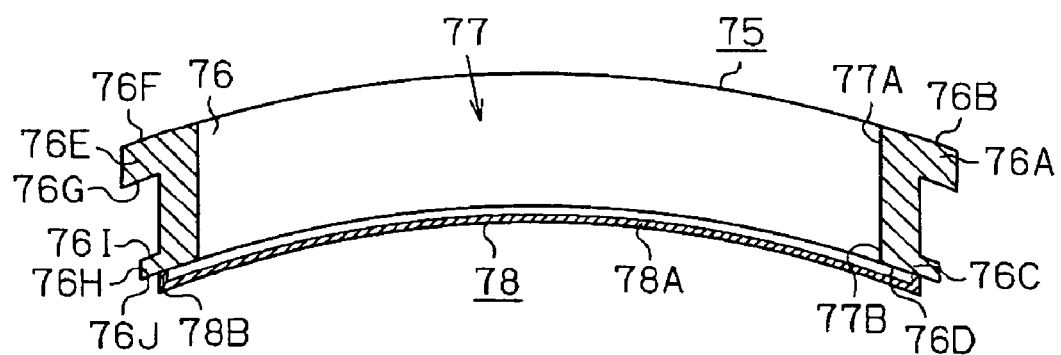
FIG. 16B is a cross-sectional view cutting through the bearing filter of the crank bearing of the third exemplary embodiment along the line XVIIB-XVIIB in FIG. 15A.
Figure 26:
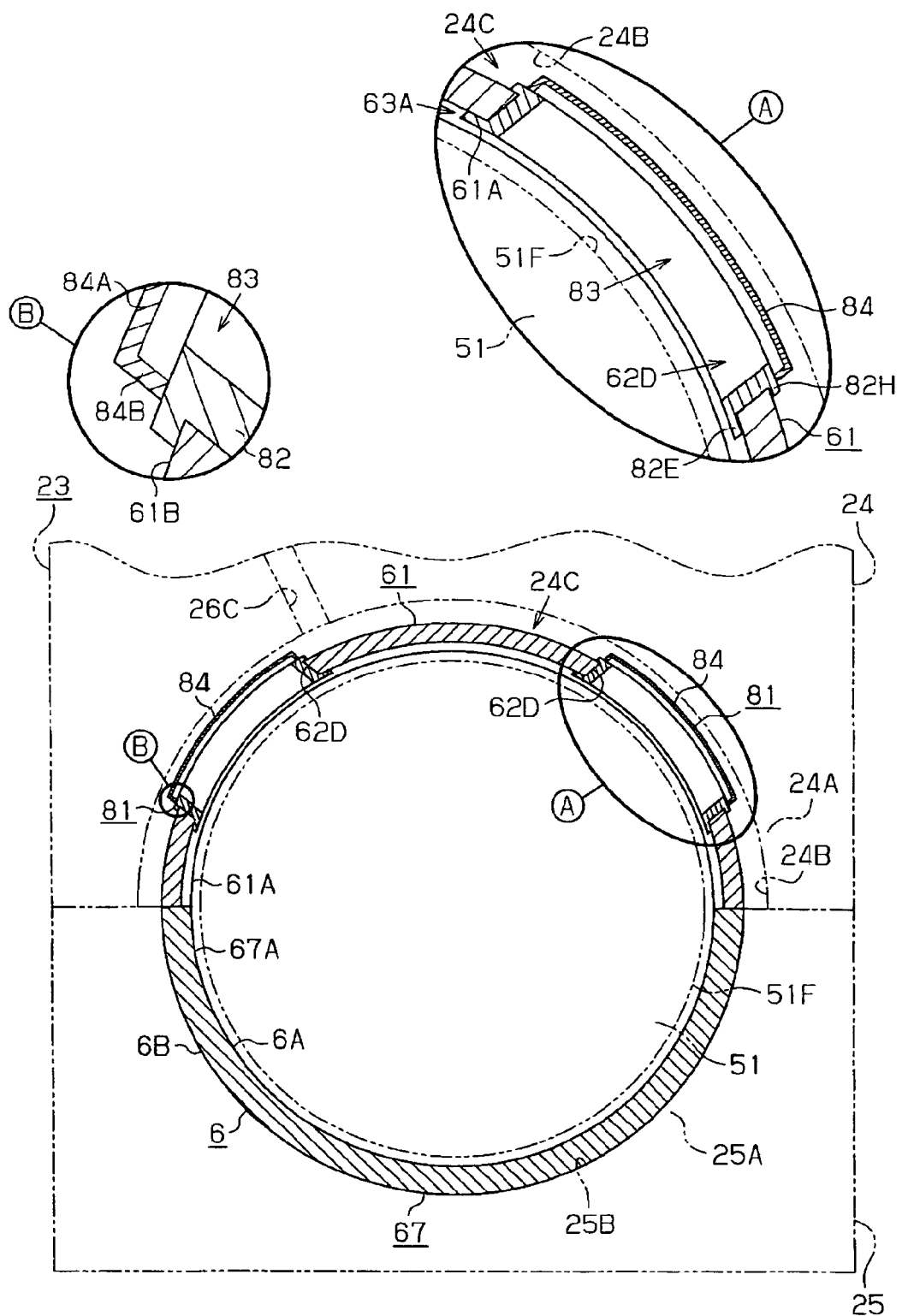
FIG. 26 is a cross-sectional view cutting through the crankshaft and its peripheral elements incorporated in the engine of the fifth exemplary embodiment along the radial direction of the crankshaft.

The structure for supporting the crank journal 51 will be described with reference to FIG. 26. FIG. 16 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C of the partition-wall-side bearing portion 24A and the oil holes 62D of the upper bearing 61 (the oil holes 83 of the bearing filters 81) communicate with each other. That is, the upper bearing 61 is fixed such that the engine oil 41 that has flown out from the third oil passage 26C enters the oil holes 83 of the bearing filters 81 via the bearing oil groove 24C. Also, the net 84 of each bearing filter 81 is placed in the bearing oil groove 24C.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C into the inside of the filter body 82 (the upper bearing 61) via the net 84 of each bearing filter 81. Then, the engine oil 41 flows from each bearing filter 81 into between the bearing inner peripheral face 6A and the journal outer peripheral face 51F via the inner peripheral groove 63A.

Figure 27A:
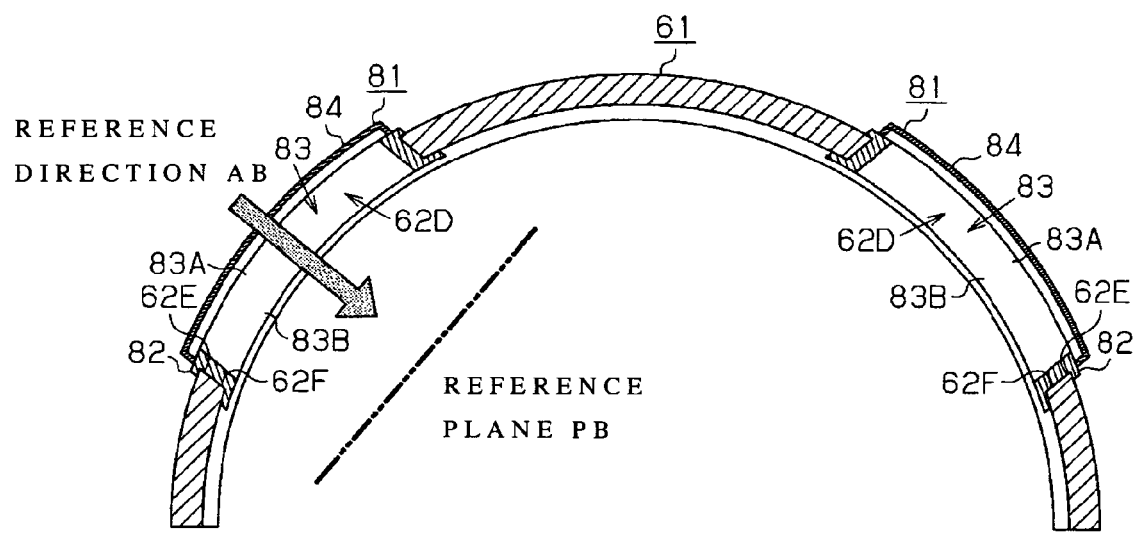
FIG. 27A is a cross-sectional view showing a cross section cutting through the upper bearing of the crank bearing of the fifth exemplary embodiment along the line XXVA-XXVA in FIG. 22A.
Figure 27B:
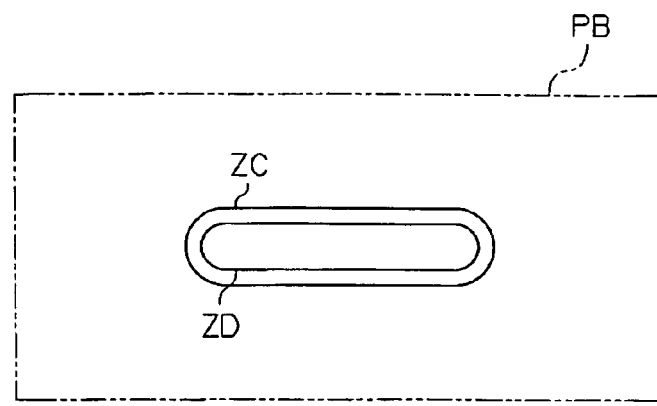
FIG. 27B is a projected view showing the oil hole inlet of the upper bearing and the oil hole inlet of the bearing filter of the fifth exemplary embodiment.

Next, a description will be made, with reference to FIG. 27A and FIG. 27B, of how the area of the net 84 is determined. The surface area of the net 84 is denoted "reference area SN2". The area of the portion of each bearing filter 81 of the crank bearing 6 through which the engine oil 41 passes is denoted "effective area SX2". The flow direction of the engine oil 41 passing through the oil hole inlet 62E is denoted "reference direction AB". The plane perpendicular to the reference direction AB is denoted "reference plane PB". The figure obtained by projecting the oil hole inlet 62E onto the reference plane PB in the reference direction AB is denoted "inlet figure ZC". The area of the inlet figure ZC is denoted "passage area SC" of the oil hole inlet 62E. The figure obtained by projecting the oil hole inlet 83A onto the reference plane PB in the reference direction AB is denoted "inlet figure ZD", and the area of the inlet figure ZD is denoted "passage area SD" of the oil hole inlet 83A.

According to the crank bearing 6, the reference area SN2 of the net 84 is larger than the passage area SC of the oil hole inlet 62E and the passage area SD of the oil hole inlet 83A. Further, the reference area SN2 and the effective area SX2 are equal to each other. That is, by providing a space between the net 84 and the upper bearing 61, the effective area SX2 is made equal to the reference area SN2.

Advantageous Effects of Exemplary Embodiment

According to the crank bearing of the fifth exemplary embodiment described above in detail, the advantageous effects (1) to (5) in the first exemplary embodiment and the advantageous effects (11) to (19) in the third exemplary embodiment are obtained.

The fifth exemplary embodiment may be modified as described below.

According to the fifth exemplary embodiment, the two projections 82H are provided at each bearing filter 81. However, any number of projections 82H may be provided as long as the bearing filter 81 can be appropriately retained not to move outward in the radial direction relative to the upper bearing 61.

Of the fifth exemplary embodiment, the passage area SC of the oil hole inlet 62E may alternatively be defined as follows. Where a cross section of the oil hole inlet 62E perpendicular to the flow direction of the engine oil 41 is a reference cross section, the passage area SC is defined as an area in which the oil hole inlet 62E overlaps with the reference cross section.

According to the fifth exemplary embodiment, the passage area SD of the oil hole inlet 83A may alternatively be defined as follows. Where a cross section of the oil hole inlet 83A perpendicular to the flow direction of the engine oil 41 is a reference cross section, the passage area SD is defined as an area in which the oil hole inlet 83A overlaps with the reference cross section.

Sixth Exemplary Embodiment

A sixth exemplary embodiment of the invention will be described with reference to FIG. 28 to FIG. 33. The crank bearing of the sixth exemplary embodiment can be obtained by modifying part of the crank bearing of the third exemplary embodiment. Namely, the structure of the crank bearing of the sixth exemplary embodiment is the same as that of the crank bearing of the third exemplary embodiment except the points that will be described below. Note that the parts and components that are the same as those in the third exemplary embodiment are denoted by the same reference numerals in each drawing.

Figure 28:
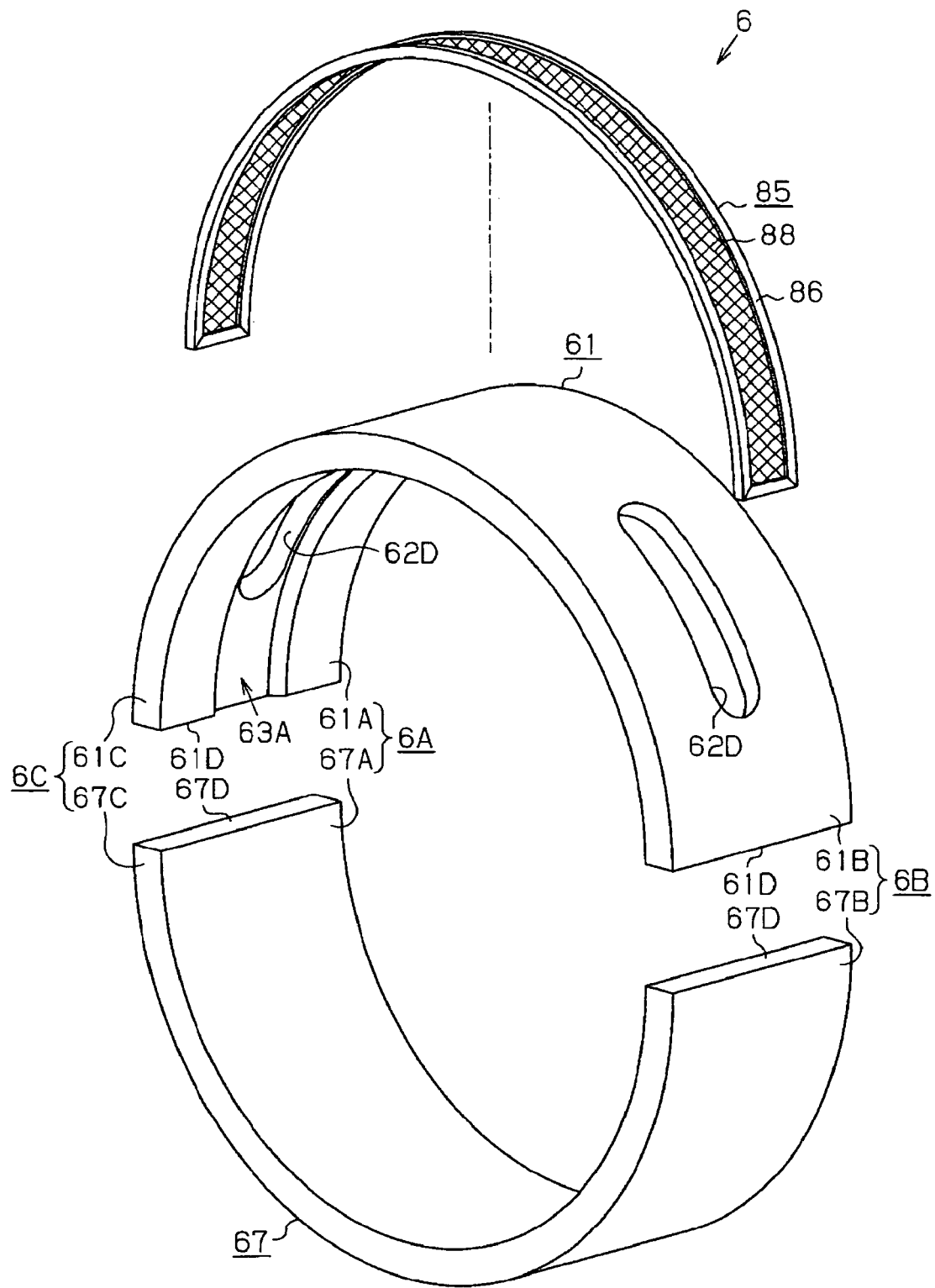
FIG. 28 is an exploded perspective view showing the perspective structure of a crank bearing of the sixth exemplary embodiment, which is one example of a bearing of the invention.
Figure 29A:
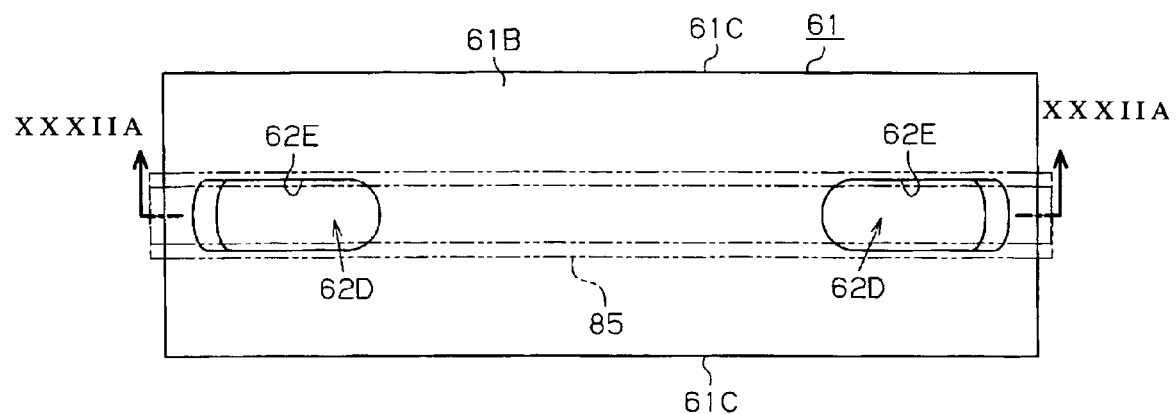
FIG. 29A is a plan view showing the planar structure of the upper bearing of the crank bearing of the sixth exemplary embodiment.
Figure 29B:
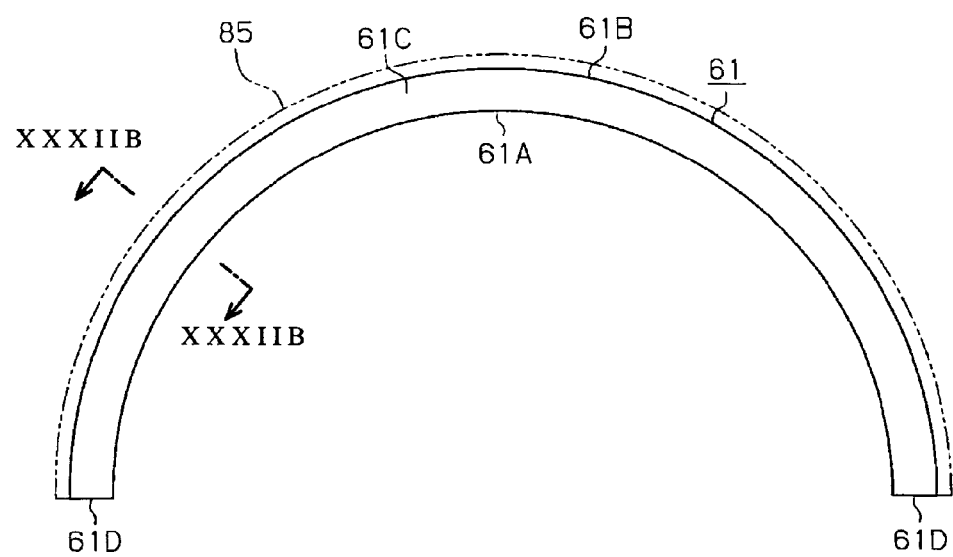
FIG. 29B is a front view showing the front structure of the upper bearing of the crank bearing of the sixth exemplary embodiment.
Figure 31A:
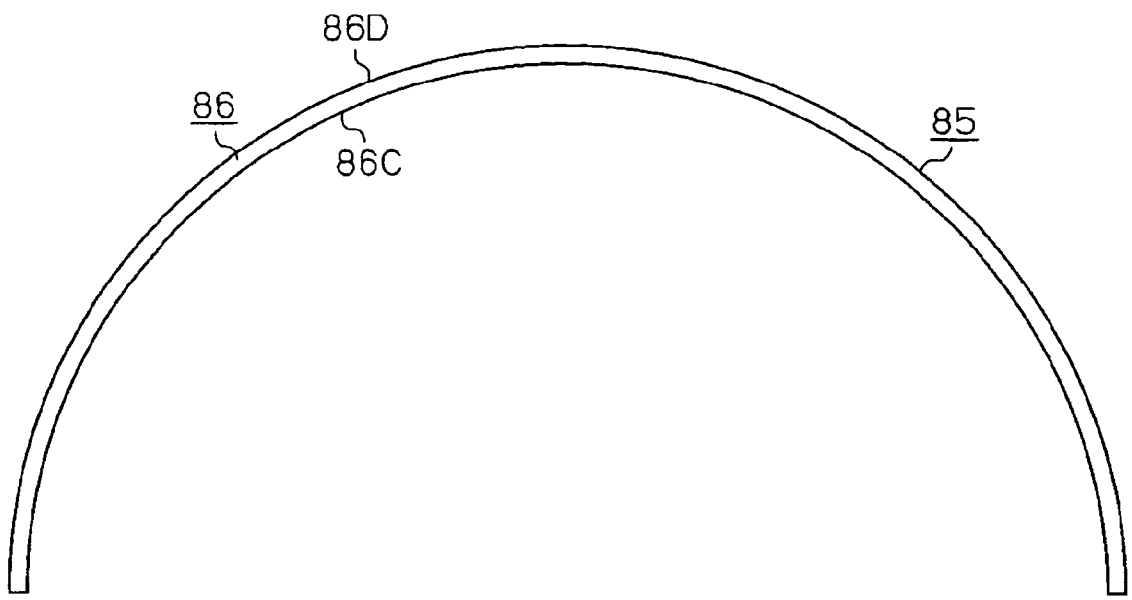
FIG. 31A is a front view showing the front structure of the bearing filter of the crank bearing of the sixth exemplary embodiment
Figure 31B:
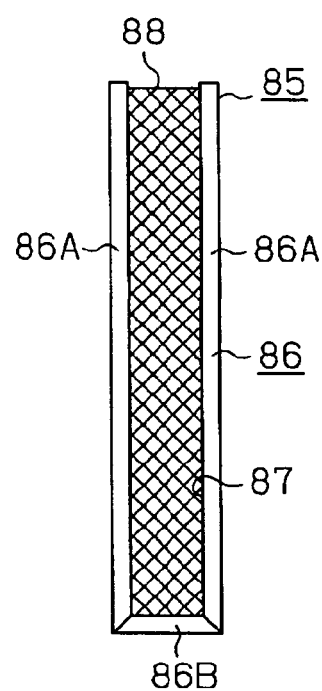
FIG. 31B is a side view showing the side structure of the bearing filter of the crank bearing of the sixth exemplary embodiment.
Figure 33:
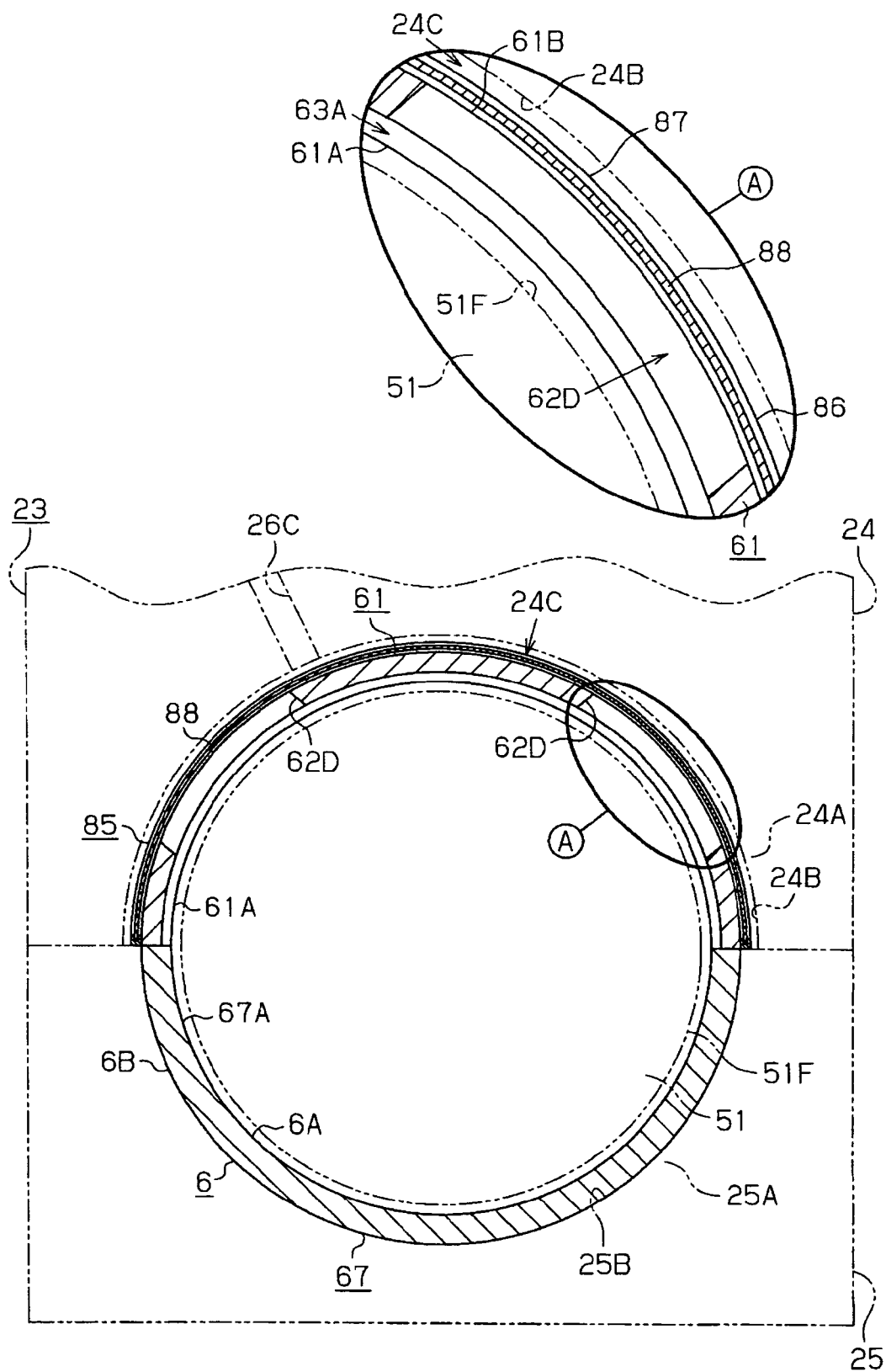
FIG. 33 is a cross-sectional view cutting through the crankshaft and its peripheral elements incorporated in the engine of the sixth exemplary embodiment along the radial direction of the crankshaft.

The structure of the crank bearing 6 of the sixth exemplary embodiment will be described with reference to FIG. 28 to FIG. 29B. A bearing filter 85 for filtering the engine oil 41 is attached on the outer peripheral face of the upper bearing 61. The bearing filter 85 is fixed on the upper bearing 61 by welding.

Next, the structure of the bearing filter 85 will be described with reference to FIG. 30A to FIG. 31B. The bearing filter 85 is constituted of a filter body 86 via which the bearing filter 85 is attached to the upper bearing 61 and a net 86 that is attached to the filter body 86 to filter the engine oil 41.

The filter body 86 is made of iron-based material. The filter body 86 has a pair of first wall portions 86A that extend in the circumferential direction of the upper bearing 61 and a pair of second wall portions 86B that extend in the axial direction of the upper bearing 61. An oil passage 87 through which the engine oil 41 flows is formed in the filter body 86. The inner peripheral face of the filter body 86 (filter-body inner peripheral face 86C) curves to match the outline of the upper outer peripheral face 61B of the upper bearing 61. The outer peripheral face of the filter body 86 (filter-body outer peripheral face 86D) curves to match the outline of the filter-body inner peripheral face 86C.

The net 88 is attached to the filter body 86 such that the engine oil 41 flowing through the filter body 86 can be entirely filtered. The mesh size of the net 88 is smaller than the diameters of foreign particles that flow through the oil filter 44 and enter the engine oil passage 26 (refer to FIG. 10) in the cylinder block 2 together with the engine oil 41. That is, the mesh size of the net 88 is small enough to trap even extremely small foreign particles contained in the engine oil 41.

Next, a description will be made, with reference to FIG. 32A and FIG. 32B, of how the bearing filter 85 is attached. The bearing filter 85 is attached to the upper bearing 61 as follows. The bearing filter 85 is first put on the upper bearing 61 such that the filter-body inner peripheral face 86C of the filter body 86 contacts the upper outer peripheral face 61B of the upper bearing 61, and the bearing filter 85 is then fixed to the outer peripheral side of the upper bearing 61 by welding of the first wall portions 86A and the second wall portions 86B of the bearing body 86.

In the above-described structure of the upper bearing 61, the oil hole inlets 62E are covered by the net 88. Namely, the bearing filter 85 is attached such that the engine oil 41 that has flown out from the partition-wall-side bearing portion 24A entirely passes through the net 88 before flowing into between the bearing inner peripheral face 6A and the journal outer peripheral face 51F via the oil holes 62D.

The structure for supporting the crank journal 51 will be described with reference to FIG. 18. FIG. 18 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C of the partition-wall-side bearing portion 24A and the oil holes 62D of the upper bearing 61 (the oil passage 87 of the bearing filter 85) communicate with each other. That is, the upper bearing 61 is fixed such that the engine oil 41 that has flown out from the third oil passage 26C enters each oil hole 62D via the bearing oil groove 24C and the net 88. A space is provided between the partition-wall-side bearing portion 24A and the net 88.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C into each oil hole 62D of the upper bearing 61 via the net 88 of the bearing filter 85. Then, the engine oil 41 flows from the inside of the upper bearing 61 into between the bearing inner peripheral face 6A and the journal outer peripheral face 51F via the inner peripheral groove 63A.

Advantageous Effects of Exemplary Embodiment

According to the crank bearing of the sixth exemplary embodiment described above in detail, the following advantageous effect can be obtained as well as the advantageous effects (1) to (5) in the first exemplary embodiment and the advantageous effect (11) in the third exemplary embodiment.

(21) According to the crank bearing 6 of the sixth exemplary embodiment, the bearing filter 85 is provided on the outer peripheral side of the upper bearing 61. Thus, even if the bearing filter 85 has come off from the upper bearing 61, the bearing filter 85, due to the presence of the upper bearing 61, does not move from the outer side to the inner side of the crank bearing 6. As such, interferences between the bearing filter 85 and the crank journal 51 are reliably prevented.

Seventh Exemplary Embodiment

A seventh exemplary embodiment of the invention will be described with reference to FIG. 34 to FIG. 37. The crank bearing of the seventh exemplary embodiment can be obtained by modifying part of the crank bearing of the sixth exemplary embodiment. Namely, the structure of the crank bearing of the seventh exemplary embodiment is the same as that of the crank bearing of the sixth exemplary embodiment except the points that will be described below. Note that the parts and components that are the same as those in the sixth exemplary embodiment are denoted by the same reference numerals in each drawing.

Figure 34:
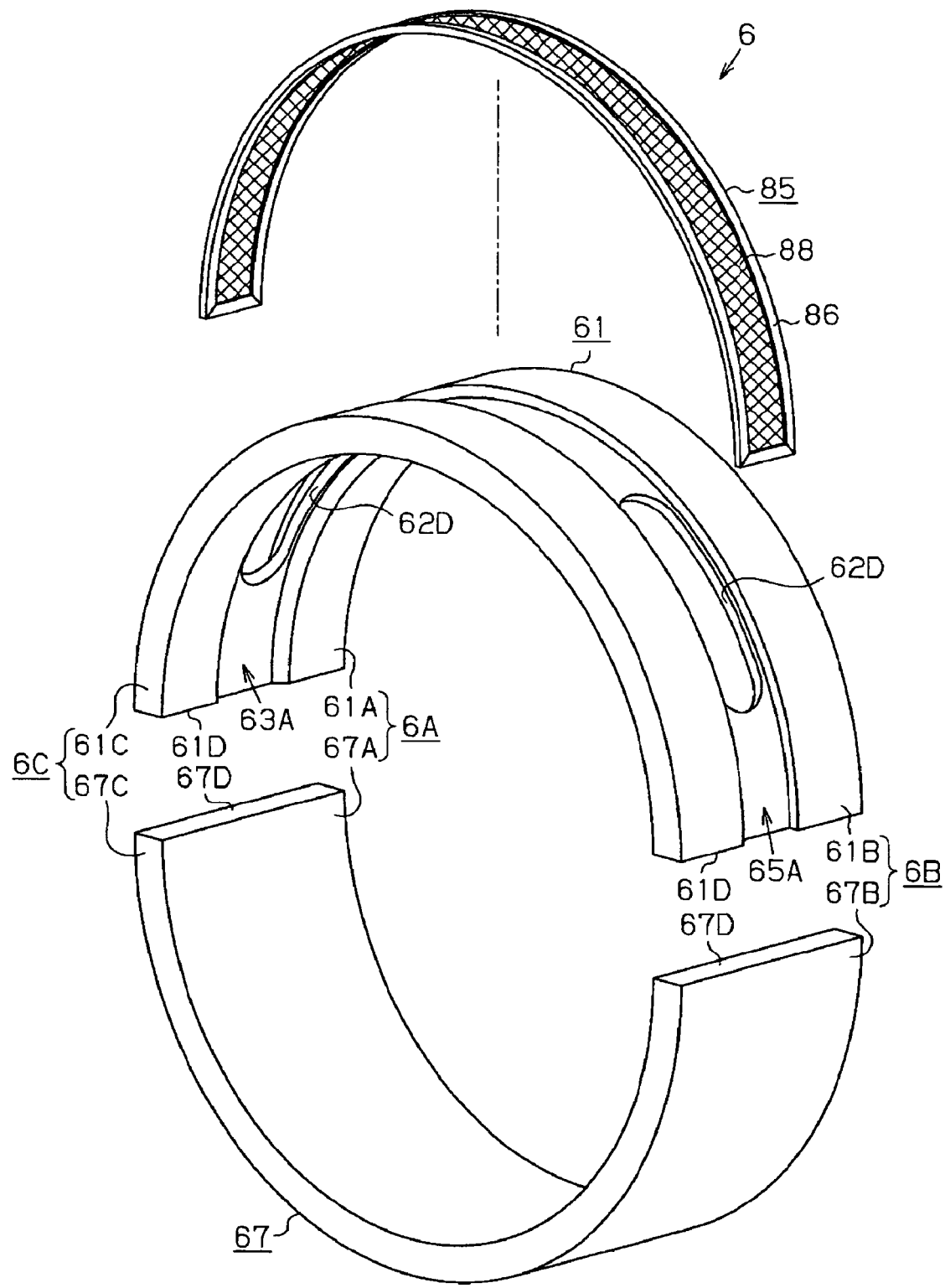
FIG. 34 is an exploded perspective view showing the perspective structure of a crank bearing of the seventh exemplary embodiment, which is one example of a bearing of the invention.
Figure 35A:
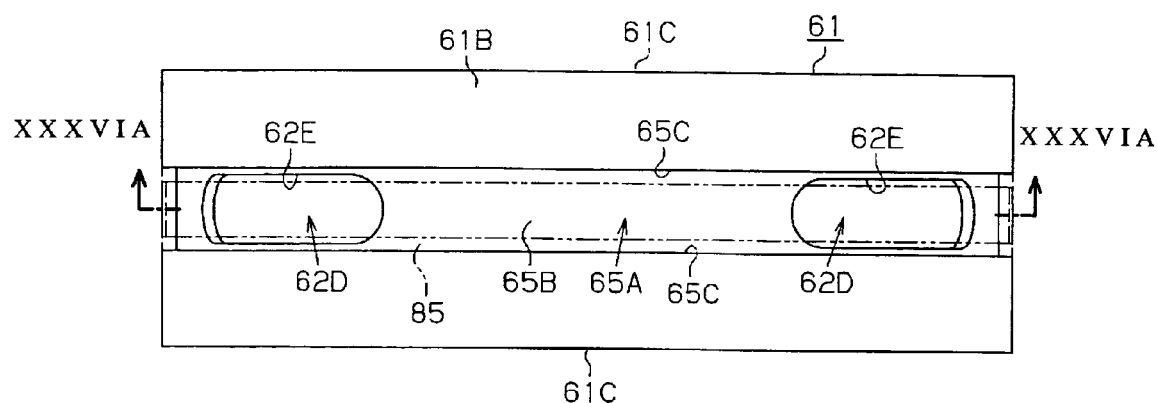
FIG. 35A is a plan view showing the planar structure of the upper bearing of the crank bearing of the seventh exemplary embodiment.
Figure 35B:
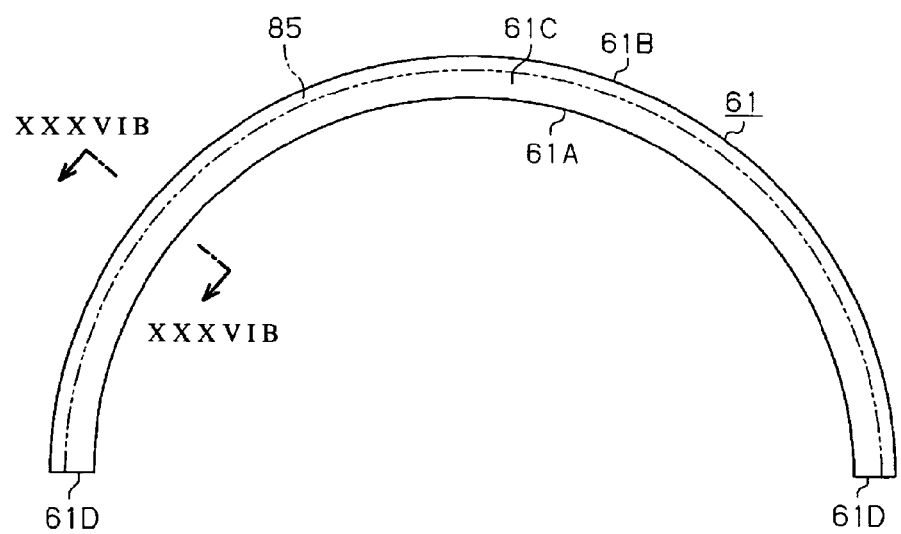
FIG. 35B is a front view showing the front structure of the upper bearing of the crank bearing of the seventh exemplary embodiment.

The structure of the crank bearing 6 of the seventh exemplary embodiment will be described with reference to FIG. 34 to FIG. 35B. An outer peripheral oil groove 65A is formed in the outer peripheral face of the upper bearing 61 so that the engine oil 41 flows into each oil hole 62D through the outer peripheral oil groove 65A. A bearing filter 85 for filtering the engine oil 41 is attached to the outer peripheral oil groove 65A. The structure of the bearing filter 85 of the seventh exemplary embodiment is substantially the same as that of the bearing filter 85 of the sixth exemplary embodiment. The filter body 86 is shaped to match the outline of the outer peripheral oil groove 65A.

The outer peripheral oil groove 65A extends in the circumferential direction from the upper end face 61D of the upper bearing 61 at one end to the upper end face 61D at the other end. The outer peripheral oil groove 65A is defined by the respective faces of the upper bearing 61 on the outer peripheral side, i.e., a pair of oil groove side faces 65C opposite each other across a space and an oil groove bottom face 65B connecting the oil groove side faces 65C. The oil groove bottom face 65B curves to match the outline of the upper outer peripheral face 61B. The oil groove side faces 65C are flat and parallel to each other. Each oil hole 62D is a through hole penetrating the upper bearing 61 from the oil groove bottom face 65B to the upper inner peripheral face 61A.

Next, a description will be made, with reference to FIG. 36, of how the bearing filter 85 is attached. The bearing filter 85 is attached to the upper bearing 61 as follows. The bearing filter 85 is first put on the upper bearing 61 such that the filter-body inner peripheral face 86C of the filter body 86 contacts the oil groove bottom face 65B of the upper bearing 61, and the bearing filter 85 is then fixed to the outer peripheral side of the upper bearing 61 by welding of the first wall portions 86A and the second wall portions 86B of the filter body 86.

In the above-described structure of the upper bearing 61, the oil hole inlets 62E are covered by the net 88. Namely, the bearing filter 85 is attached such that the engine oil 41 that has flown out from the partition-wall-side bearing portion 24A entirely passes through the net 88 before flowing into between the bearing inner peripheral face 6A and the journal outer peripheral face 51F via the oil holes 62D. Further, the bearing filter 85 is formed and attached such that no portion of the bearing filter 85 protrudes outward in the radial direction from the upper outer peripheral face 61B.

Figure 37:
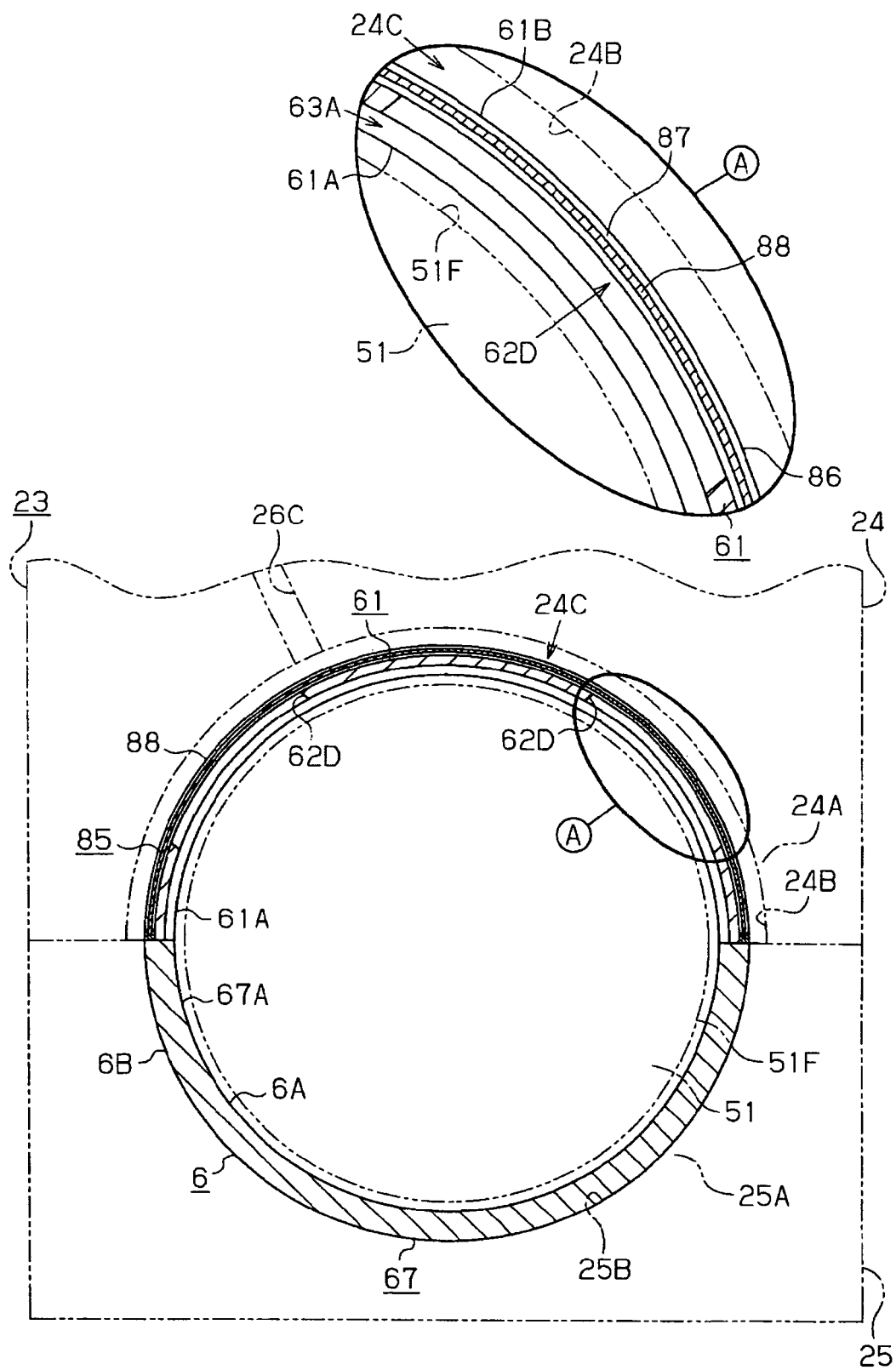
FIG. 37 is a cross-sectional view cutting through the crankshaft and its peripheral elements incorporated in the engine of the seventh exemplary embodiment along the radial direction of the crankshaft.

The structure for supporting the crank journal 51 will be described with reference to FIG. 37. FIG. 37 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C of the partition-wall-side bearing portion 24A and the outer peripheral oil groove 65A of the upper bearing 61 communicate with each other. That is, the upper bearing 61 is fixed such that the engine oil 41 that has flown out from the third oil passage 26C enters each oil hole 62D via the bearing oil groove 24C and the net 88. A space is provided between the partition-wall-side bearing portion 24A and the net 88.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C into each oil hole 62D of the upper bearing 61 via the net 88 of the bearing filter 85. Then, the engine oil 41 flows from the inside of the upper bearing 61 into between the bearing inner peripheral face 6A and the journal outer peripheral face 51F via the inner peripheral groove 63A.

Advantageous Effects of Exemplary Embodiment

According to the crank bearing of the seventh exemplary embodiment described above in detail, the following advantageous effect can be obtained as well as the advantageous effects (1) to (5) in the first exemplary embodiment, the advantageous effect (11) in the third exemplary embodiment, and the advantageous effect (21) in the sixth exemplary embodiment.

(22) According to the crank bearing 6 of the seventh exemplary embodiment, because the outer peripheral oil groove 65A is formed in the upper bearing 61 and the bearing filter 85 is arranged in the outer peripheral oil groove 65A, the size of the crank bearing 6 can be reduced.

Eighth Exemplary Embodiment

An eighth exemplary embodiment of the invention will be described with reference to FIG. 38 to FIG. 42B. The crank bearing of the eighth exemplary embodiment can be obtained by modifying part of the crank bearing of the seventh exemplary embodiment. Namely, the structure of the crank bearing of the eighth exemplary embodiment is substantially the same as that of the crank bearing of the seventh exemplary embodiment except the points that will be described below. Note that the parts and components that are the same as those in the seventh exemplary embodiment are denoted by the same reference numerals in each drawing.

Figure 38:
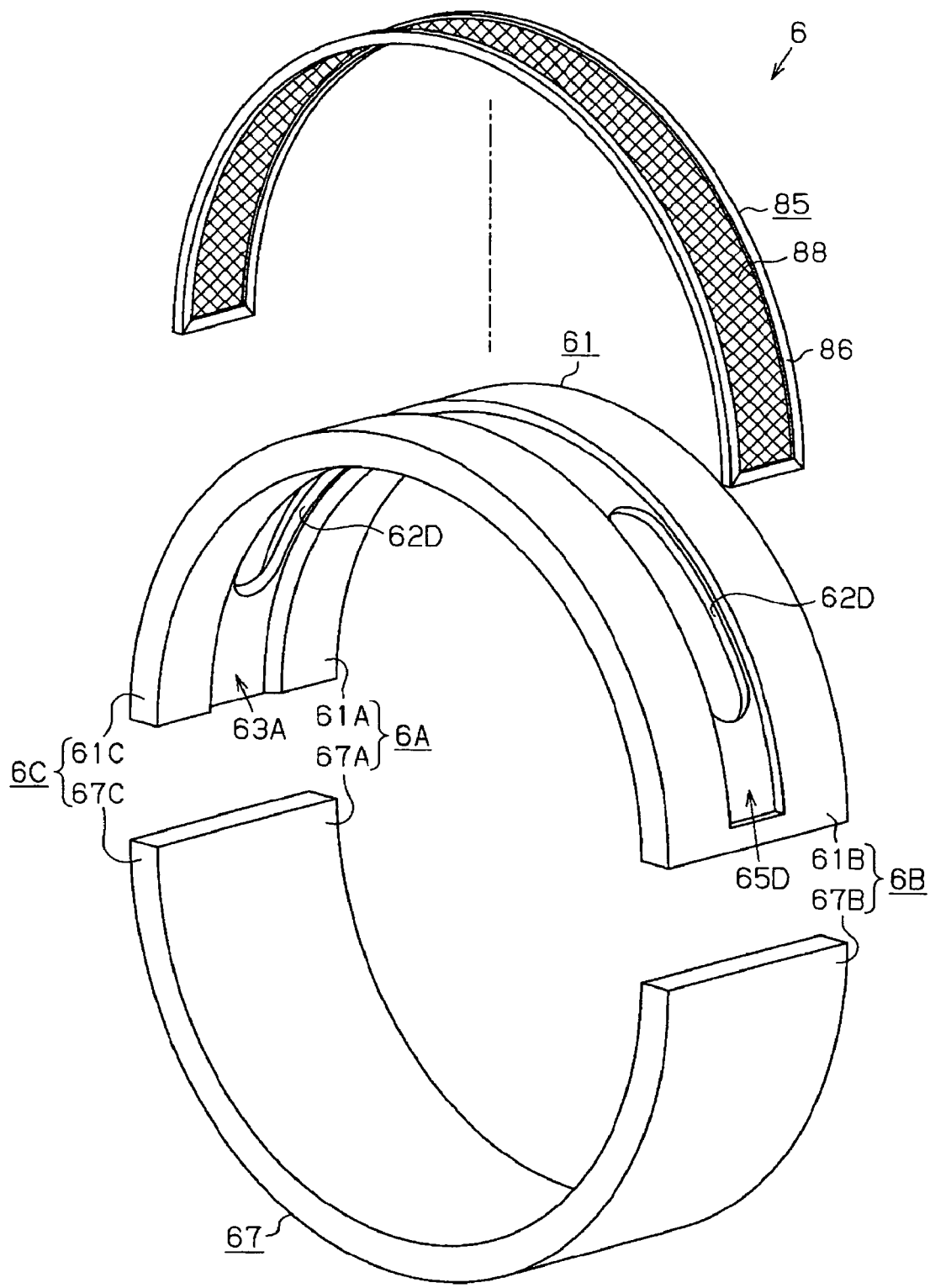
FIG. 38 is an exploded perspective view showing the perspective structure of a crank bearing of the eighth exemplary embodiment, which is one example of a bearing of the invention.
Figure 39A:
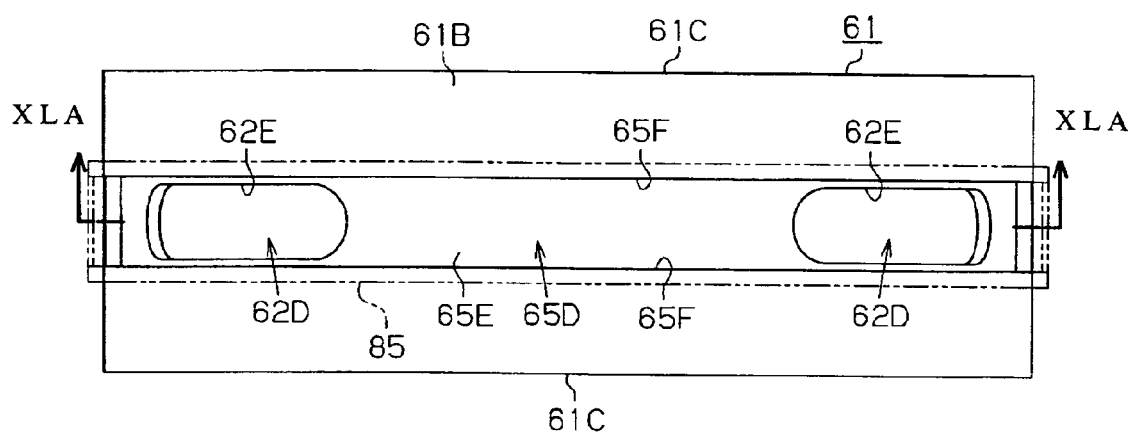
FIG. 39A is a plan view showing the planar structure of the upper bearing of the crank bearing of the eighth exemplary embodiment.
Figure 39B:
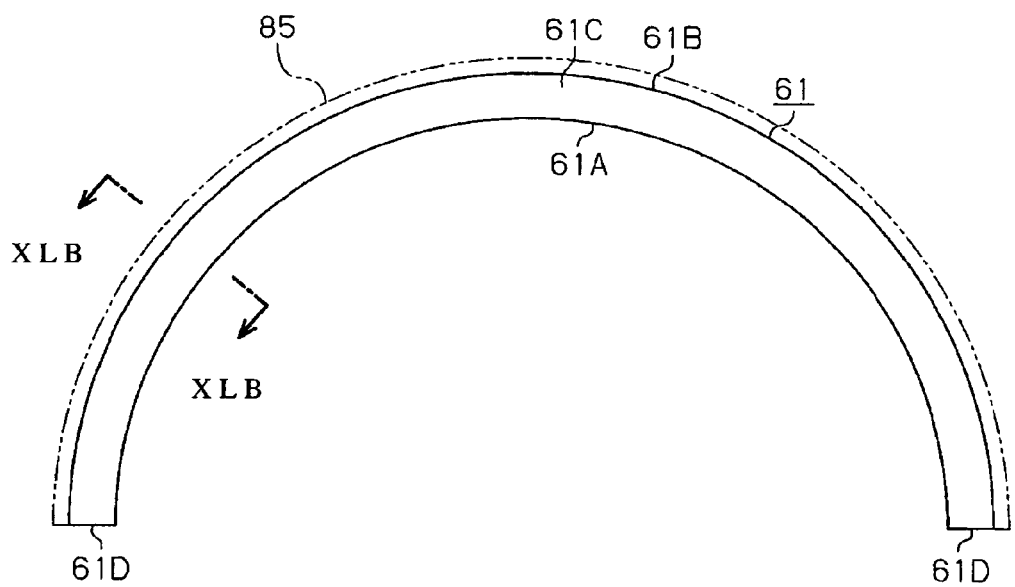
FIG. 39B is a front view showing the front structure of the upper bearing of the crank bearing of the eighth exemplary embodiment.

The structure of the crank bearing 6 of the eighth exemplary embodiment will be described with reference to FIG. 38 to FIG. 39B. An outer peripheral oil groove 65D is formed in the outer peripheral face 61B of the upper bearing 61 such that the engine oil 41 flows into each oil hole 62D through the outer peripheral oil groove 65D. The bearing filter 85 for filtering the engine oil 41 is attached to the upper outer peripheral face 61B. The structure of the bearing filter 85 of the eighth exemplary embodiment is substantially the same as that of the bearing filter 85 of the sixth exemplary embodiment. The bearing filter 85 is sized to straddle the outer peripheral oil groove 65D when attached on the upper outer peripheral face 61B of the upper bearing 61.

The outer peripheral oil groove 65D extends in the circumferential direction from near the upper end face 61D of the upper bearing 61 at one end to near the upper end face 61D at the other end. The outer peripheral oil groove 65D is defined by the respective faces of the upper bearing 61 on the outer peripheral side, i.e., a pair of oil groove side faces 65F opposite each other across a space and an oil groove bottom face 65E connecting the oil groove side faces 65F. The oil groove bottom face 65E curves to match the outline of the upper outer peripheral face 61B. The oil groove side faces 65F are flat and parallel to each other. Each oil hole 62D is a through hole penetrating the upper bearing 61 from the oil groove bottom face 65E to the upper inner peripheral face 61A.

Next, a description will be made, with reference to FIG. 40A and FIG. 40B, of how the bearing filter 85 is attached.

The bearing filter 85 is attached to the upper bearing 61 as follows. The bearing filter 85 is first put on the upper bearing 61 such that the filter-body inner peripheral face 86C of the filter body 86 contacts the upper outer peripheral face 61B, and the bearing filter 85 is then fixed to the outer peripheral side of the upper bearing 61 by welding of the first wall portions 86A and the second wall portions 86B of the filter body 86.

In the above-described structure of the upper bearing 61, the outer peripheral oil groove 65D is covered by the net 88. Namely, the bearing filter 85 is attached such that the engine oil 41 that has flown out from the partition-wall-side bearing portion 24A entirely passes through the net 88 before flowing into between the bearing inner peripheral face 6A and the journal outer peripheral face 51F via the oil holes 62D. A space is provided between the net 88 and each oil hole inlet 62E.

Figure 41:
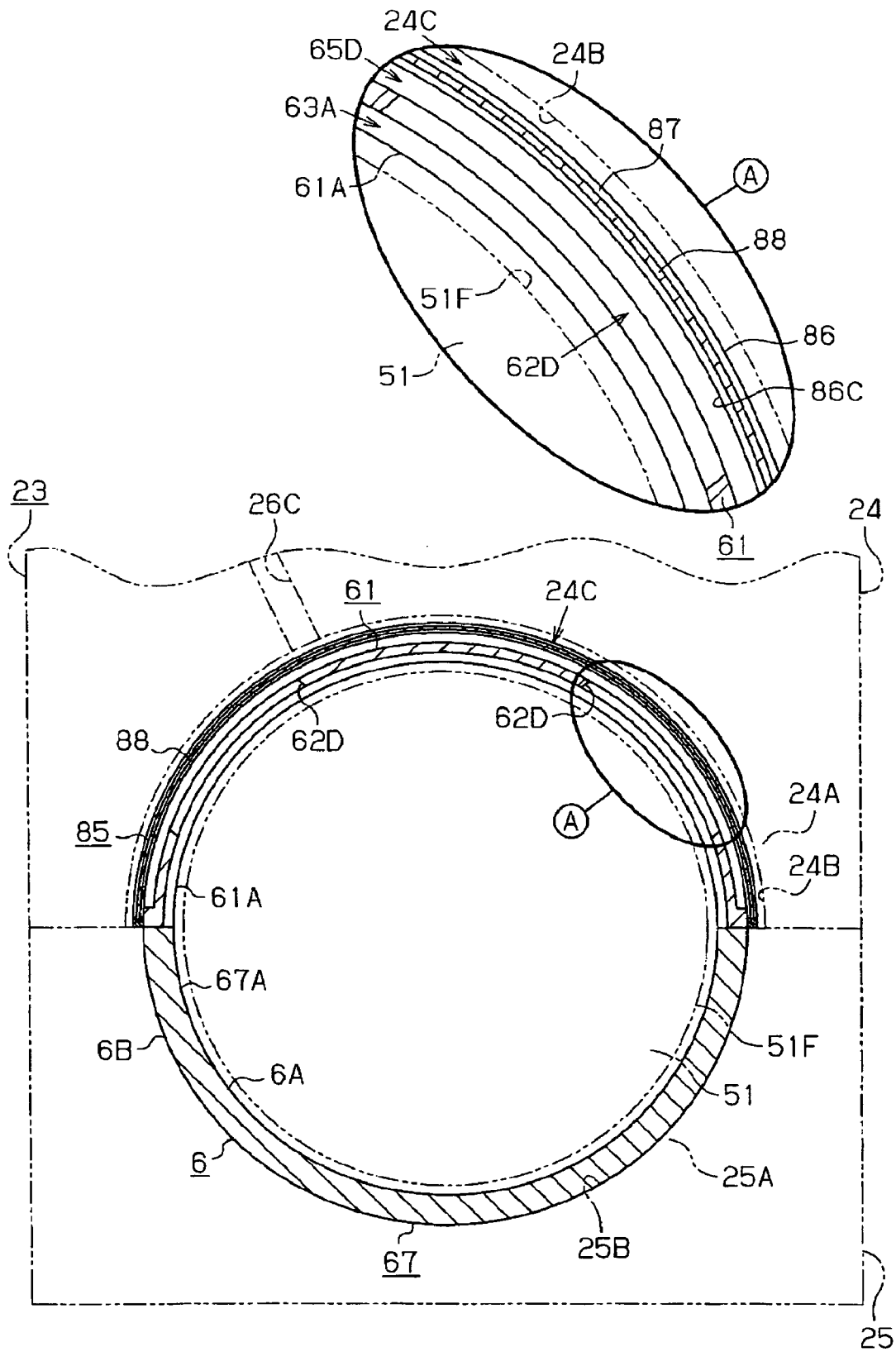
FIG. 41 is a cross-sectional view cutting through the crankshaft and its peripheral elements incorporated in the engine of the eighth exemplary embodiment along the radial direction of the crankshaft.

The structure for supporting the crank journal 51 will be described with reference to FIG. 41. FIG. 41 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C of the partition-wall-side bearing portion 24A and the outer peripheral oil groove 65A of the upper bearing 61 communicate with each other. That is, the upper bearing 61 is fixed such that the engine oil 41 that has flown out from the third oil passage 26C enters each oil hole 62D via the bearing oil groove 24C and the net 88. A space is provided between the partition-wall-side bearing portion 24A and the net 88.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C into the outer peripheral oil groove 65D of the upper bearing 61 via the net 88 of the bearing filter 85. Then, the engine oil 41 flows from the outer peripheral oil groove 65D to the inside of the upper bearing 61 via the inlet of each oil hole 62D. Then, the engine oil 41 flows from the inside of the upper bearing 61 into between the bearing inner peripheral face 6A and the journal outer peripheral face 51F via the inner peripheral groove 63A.

Figure 42A:
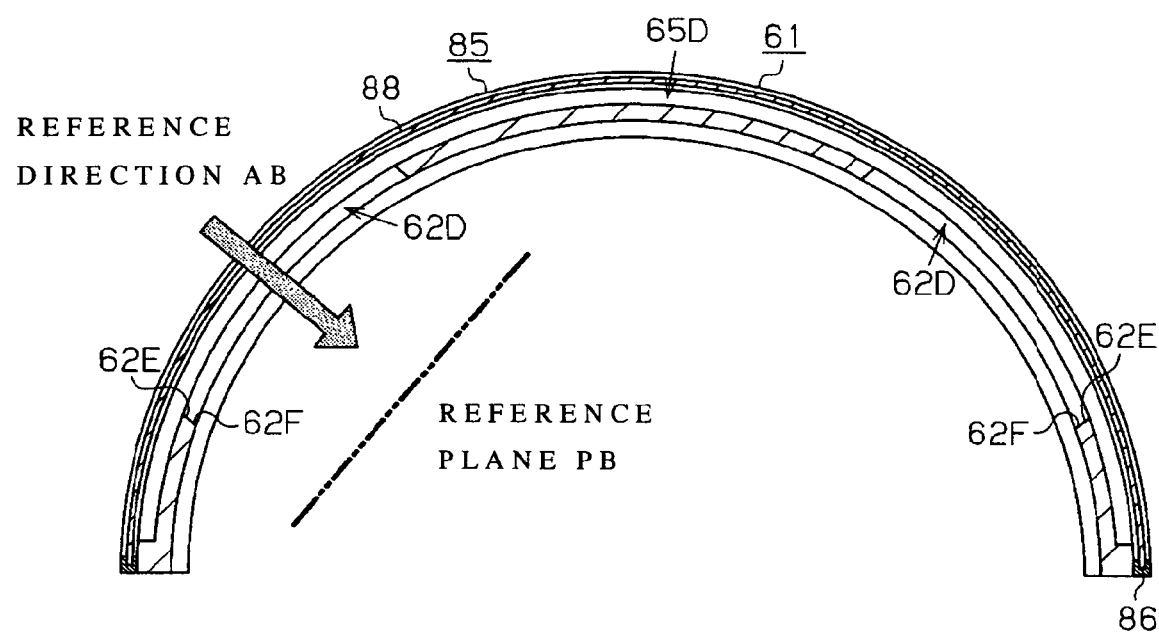
FIG. 42A is another cross-sectional view showing the cross section cutting through the upper bearing of the crank bearing of the eighth exemplary embodiment along the line XLA-XLA in FIG. 39A.
Figure 42B:
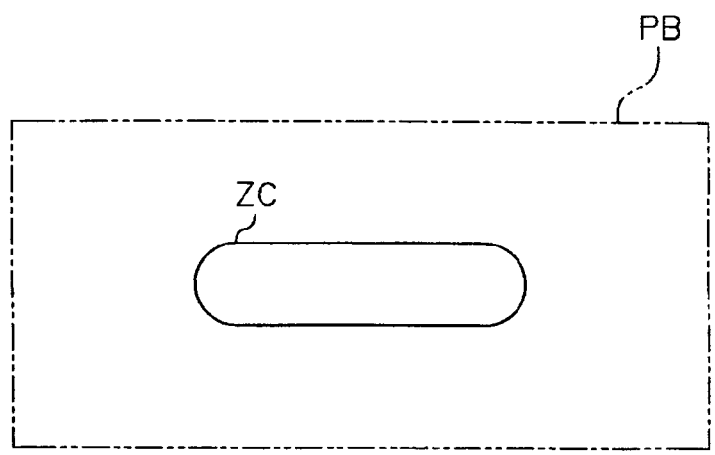
FIG. 42B is a projected view showing the oil hole inlet of the upper bearing of the crank bearing of the eighth exemplary embodiment.

Next, a description will be made, with reference to FIG. 42A and FIG. 42B, of how the area of the net 88 is determined. The surface area of the net 88 is denoted "reference area SN3". The area of the portion of the bearing filter 85 of the crank bearing 6 through which the engine oil 41 passes is denoted "effective area SX3".

In the structure of the crank bearing 6, the reference area SN3 of the net 88 is larger than the passage area SC. The reference area SN3 and the effective area SX3 are equal to each other. That is, by providing a space between the net 88 and the upper bearing 61, the effective area SX3 is made equal to the reference area SN3.

Advantageous Effects of Exemplary Embodiment

According to the crank bearing of the eighth exemplary embodiment described above in detail, the following advantageous effect can be obtained as well as the advantageous effects (1) to (5) in the first exemplary embodiment, the advantageous effects (11), (18), and (19) in the third exemplary embodiment, and the advantageous effect (21) in the sixth exemplary embodiment.

(23) According to the crank bearing 6 of the eighth exemplary embodiment, a space is provided between the net 88 and the upper bearing 61 by forming the outer peripheral oil groove 65D at the upper bearing 61. Therefore, the size of the bearing filter 85 can be reduced as compared to when the bearing filter is formed such that a space is created between the net 88 and the upper bearing 61 without forming the outer peripheral oil groove 65D. Also, in the eighth exemplary embodiment, the maximum amount of foreign particles that can be trapped at the bearing filter 85 is relatively large due to the space between the net 88 and the upper bearing 61, and this reduces the possibility of clogging of the bearing filter 85 more reliably and reduces the size of the crank bearing 6.

Ninth Exemplary Embodiment

A ninth exemplary embodiment of the invention will be described with reference to FIG. 43 to FIG. 48. The crank bearing of the ninth exemplary embodiment can be obtained by modifying part of the crank bearing of the sixth exemplary embodiment. Namely, the structure of the crank bearing of the ninth exemplary embodiment is substantially the same as that of the crank bearing of the sixth exemplary embodiment except the points that will be described below. Note that the parts and components that are the same as those in the sixth exemplary embodiment are denoted by the same reference numerals in each drawing.

Figure 43:
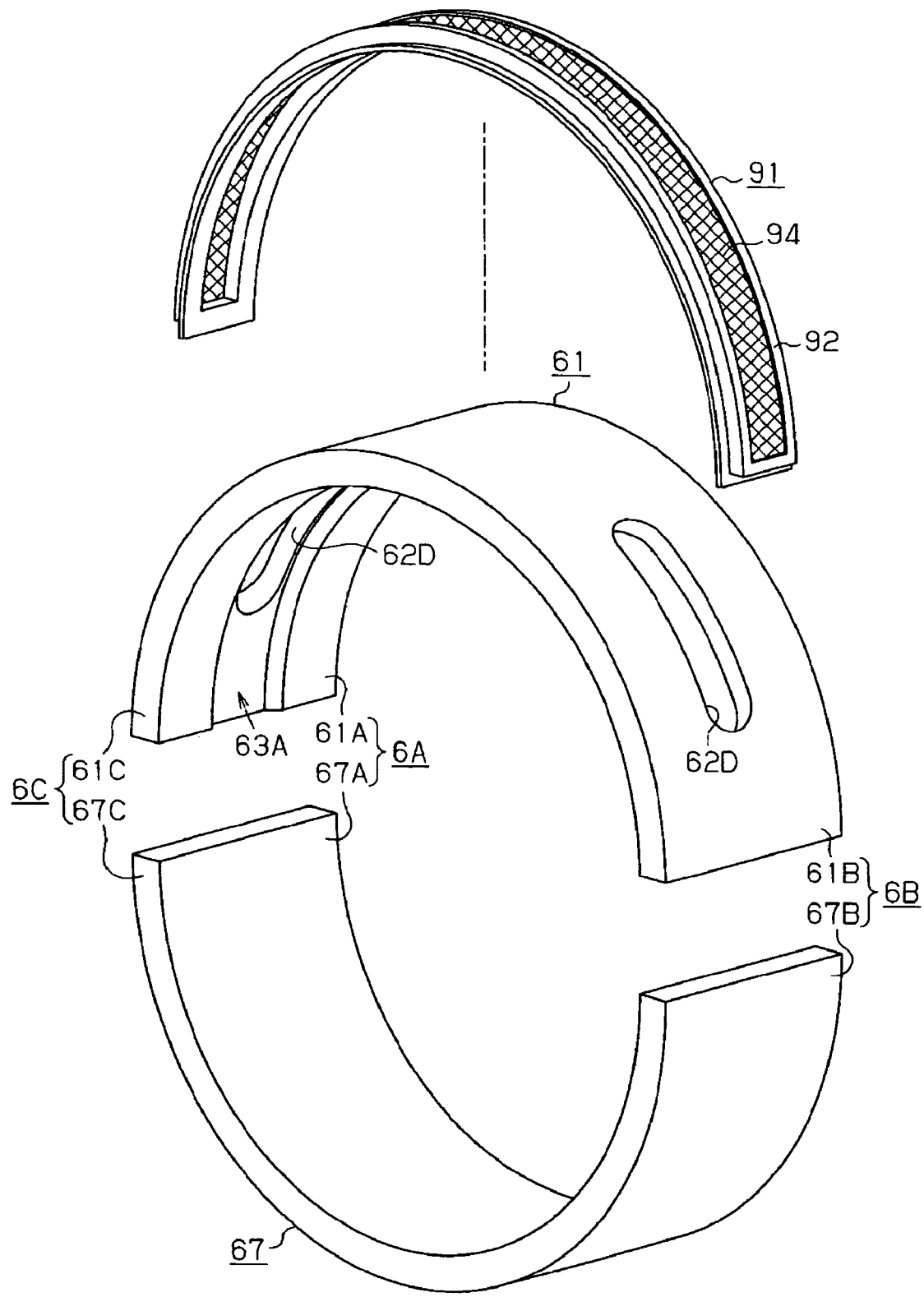
FIG. 43 is an exploded perspective view showing the perspective structure of a crank bearing of the ninth exemplary embodiment, which is one example of a bearing of the invention.
Figure 46A:
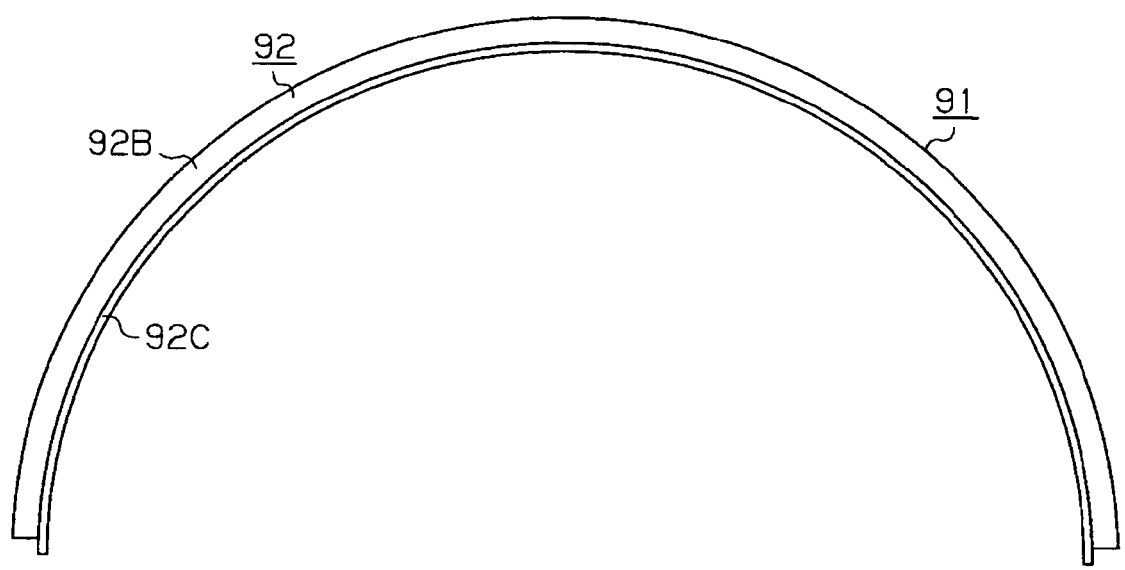
FIG. 46A is a front view showing the front structure of the bearing filter of the crank bearing of the ninth exemplary embodiment.
Figure 46B:
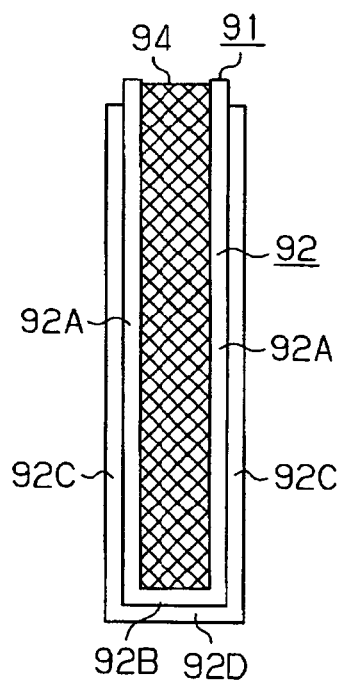
FIG. 46B is a side view showing the side structure of the bearing filter of the crank bearing of the ninth exemplary embodiment.

The structure of the crank bearing 6 of the ninth exemplary embodiment will be described with reference to FIG. 43 to FIG. 44B. A bearing filter 91 for filtering the engine oil 41 is attached on the outer peripheral face 61B. The bearing filter 91 is fixed on the upper bearing 61 by welding.

Next, the structure of the bearing filter 91 will be described with reference to FIG. 45A to FIG. 46B. The bearing filter 91 is constituted of a filter body 92 via which the bearing filter 91 is attached to the upper outer peripheral face 61B of the upper bearing 61 and a net 94 that is attached to the filter body 92 to filter the engine oil 41.

The filter body 92 is made of resin. The filter body 92 has a peripheral wall portion 92A along which the engine oil 41 flows and a side wall portion 92B that provides a space between the peripheral wall portion 92A and the upper bearing 61. An oil passage 93 through which the engine oil 41 flows is defined by the peripheral wall portion 92A and the side wall portion 92B. On the outer sides of the side wall portion 92B are provided portions via which the filter body 92 is attached on the upper outer peripheral face 61B of the upper bearing 61, i.e., a pair of first wall portions 92C extending the circumferential direction of the upper bearing 61 and a pair of second wall portions 92D extending in the axial direction of the upper bearing 61.

A net 94 is attached to the filter body 92 such that the engine oil 41 flowing through the filter body 92 can be entirely filtered. The mesh size of the net 94 is smaller than the diameters of foreign particles that flow through the oil filter 44 and enter the engine oil passage 26 (refer to FIG. 10) in the cylinder block 2 together with the engine oil 41. That is, the mesh size of the net 94 is small enough to trap even extremely small foreign particles contained in the engine oil 41.

Figure 47A:
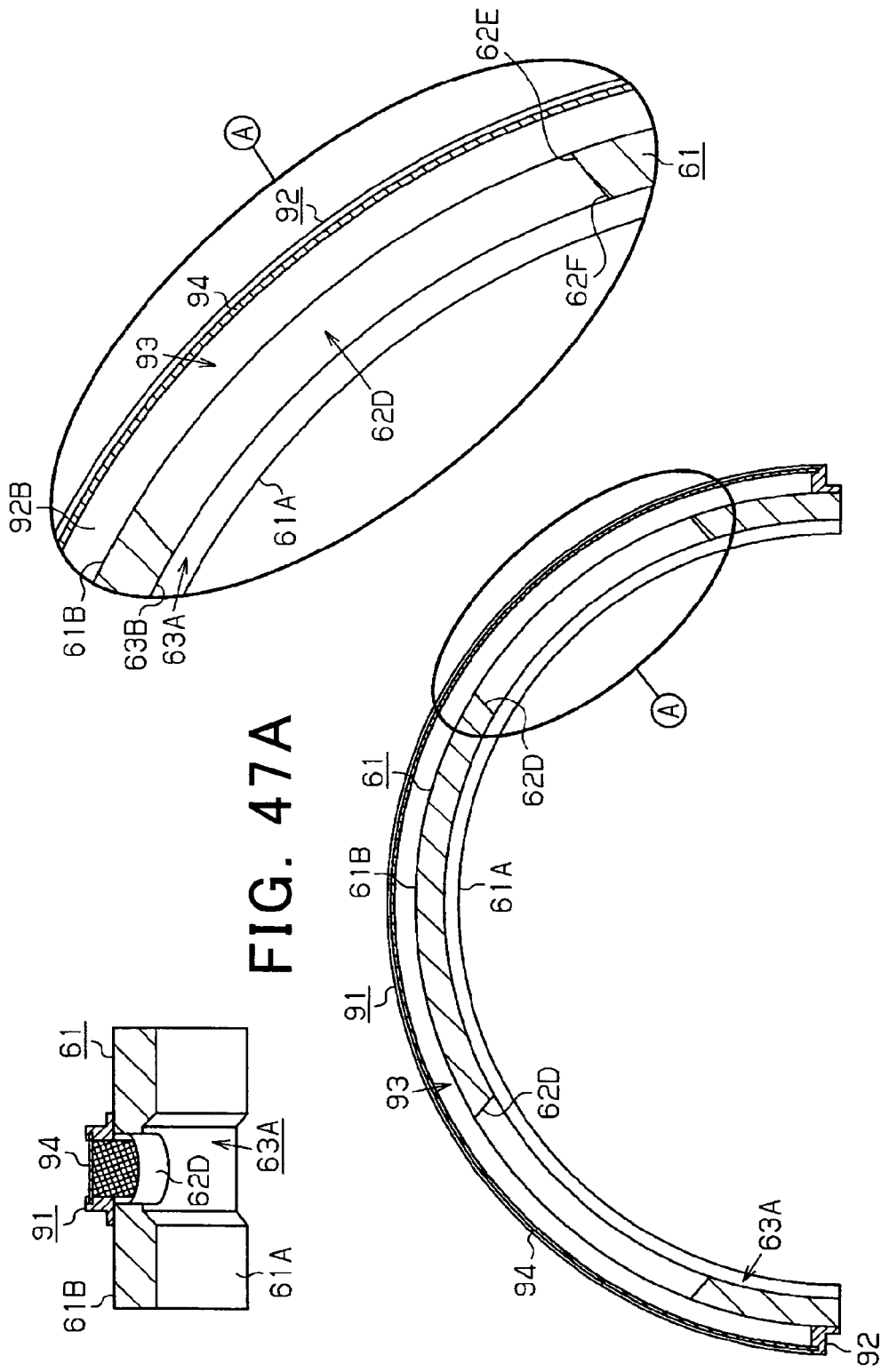
FIG. 47A is a cross-sectional view showing a cross section cutting through the upper bearing of the crank bearing of the ninth exemplary embodiment along the line XLVIIA-XLVIIA in FIG. 44A.
Figure 47B:
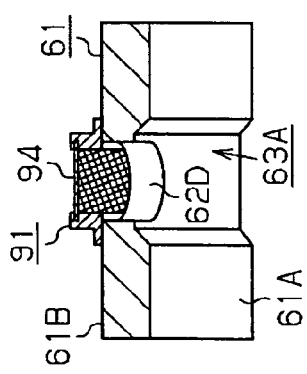
FIG. 47B is a cross-sectional view showing a cross section cutting through the upper bearing of the crank bearing of the ninth exemplary embodiment along the line XLVIIB-XLVIIB in FIG. 44B.

Next, a description will be made, with reference to FIG. 47A and FIG. 47B, of how the bearing filter 91 is attached. The bearing filter 91 is attached to the upper bearing 61 as follows. The bearing filter 91 is first put on the upper bearing 61 such that the first wall portions 92C and the second wall portions 92D of the filter body 92 contact the upper outer peripheral face 61B of the upper bearing 61, and the bearing filter 91 is then fixed to the outer peripheral side of the upper bearing 61 by welding of the first wall portions 92C and the second wall portions 92D.

In the above-described structure of the upper bearing 61, each oil hole inlet 62E is covered by the net 94. Namely, the bearing filter 91 is attached such that the engine oil 41 that has flown out from the partition-wall-side bearing portion 24A entirely passes through the net 94 before flowing into between the bearing inner peripheral face 6A and the journal outer peripheral face 51F via the oil holes 62D. A space is provided between the net 94 and the upper bearing 61.

Figure 48:
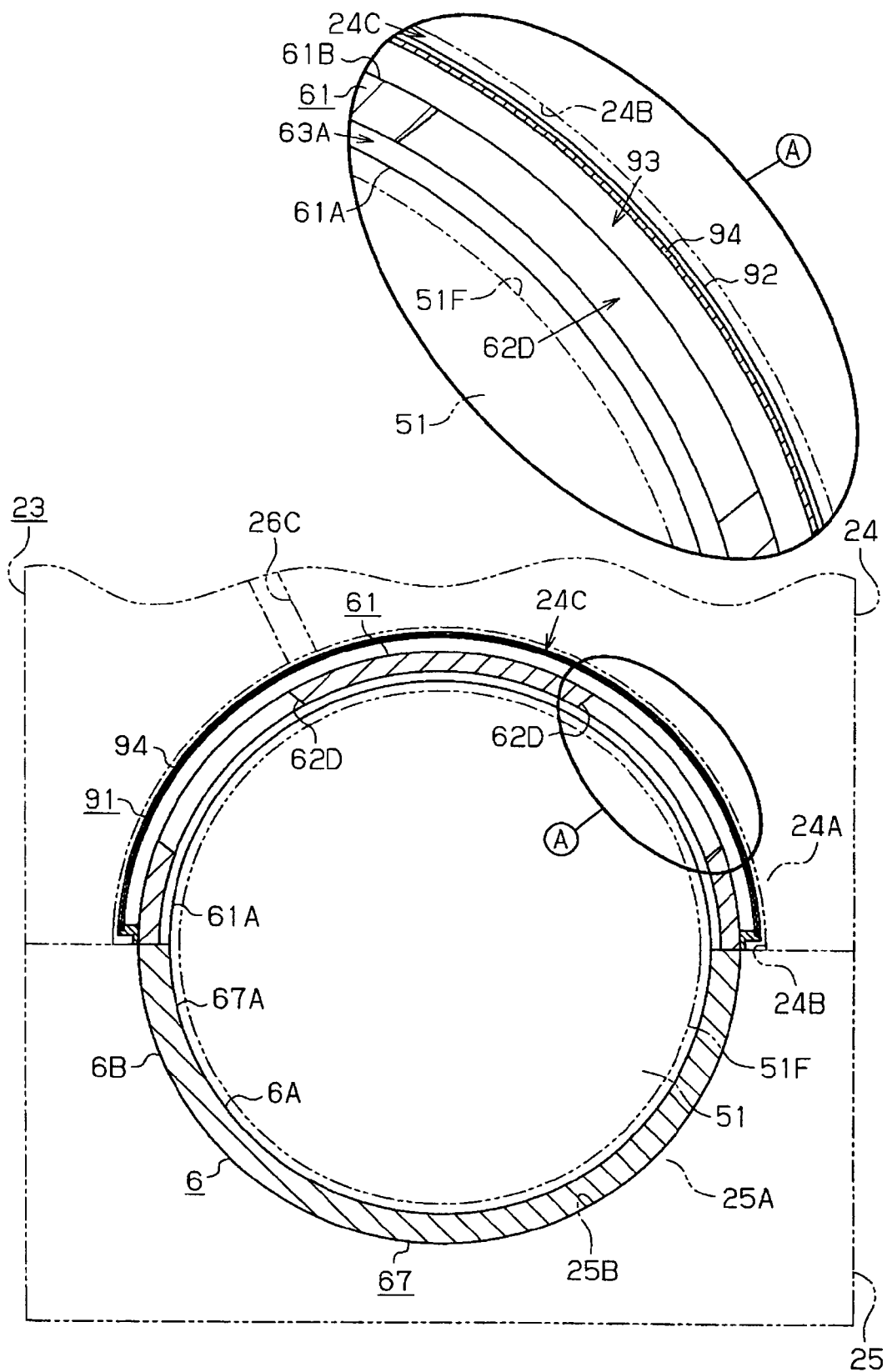
FIG. 48 is a cross-sectional view cutting through the crankshaft and its peripheral elements incorporated in the engine of the ninth exemplary embodiment along the radial direction of the crankshaft.

The structure for supporting the crank journal 51 will be described with reference to FIG. 48. FIG. 48 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C of the partition-wall-side bearing portion 24A and each oil hole 62D of the upper bearing 61 (the oil passage 93 of the bearing filter 91) communicate with each other. That is, the upper bearing 61 is fixed such that the engine oil 41 that has flown out from the third oil passage 26C enters each oil hole 62D via the net 94. A space is provided between the partition-wall-side bearing portion 24A and the net 94.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C to the inside of the upper bearing 61 via the net 94 of the bearing filter 91 and the inlet of each oil hole 62D. Then, the engine oil 41 flows from the inside of the upper bearing 61 into between the bearing inner peripheral face 6A and the journal outer peripheral face 51F via the inner peripheral groove 63A.

Next, a description will be made of how the area of the net 94 is determined. The surface area of the net 94 is denoted "reference area SN4". The area of the portion of the bearing filter 91 of the crank bearing 6 through which the engine oil 41 passes is denoted "effective area SX4".

In the structure of the crank bearing 6, the reference area SN4 of the net 94 is larger than the passage area SC of the oil hole inlet 62E. The reference area SN4 and the effective area SX4 are equal to each other. That is, by providing a space between the net 94 and the upper bearing 61, the effective area SX4 is made equal to the reference area SN4.

Advantageous Effects of Exemplary Embodiments

According to the crank bearing of the ninth exemplary embodiment described above in detail, the following advantageous effect can be obtained as well as the advantageous effects (1) to (5) in the first exemplary embodiment, the advantageous effects (11), (18), and (19) in the third exemplary embodiment, and the advantageous effect (21) in the sixth exemplary embodiment.

(24) According to the crank bearing 6 of the ninth exemplary embodiment, a space is provided between the upper bearing 61 and the net 94 by forming the side wall portion 92B at the filter body 92, and this is how the effective area SX4 is made equal to the reference area SN4 without providing the outer peripheral oil groove 65A in the upper bearing 61. Thus, according to the ninth exemplary embodiment, the maximum amount of foreign particles that can be trapped at the bearing filter 85 can be increased while suppressing the reduction of the rigidity of the upper bearing 61.

Tenth Exemplary Embodiment

A tenth exemplary embodiment of the invention will be described with reference to FIG. 49 to FIG. 52. The crank bearing of the tenth exemplary embodiment can be obtained by modifying part of the crank bearing of the third exemplary embodiment. Namely, the structure of the crank bearing of the tenth exemplary embodiment is substantially the same as that of the crank bearing of the third exemplary embodiment except the points that will be described below. Note that the parts and components that are the same as those in the third exemplary embodiment are denoted by the same reference numerals in each drawing.

Figure 49:
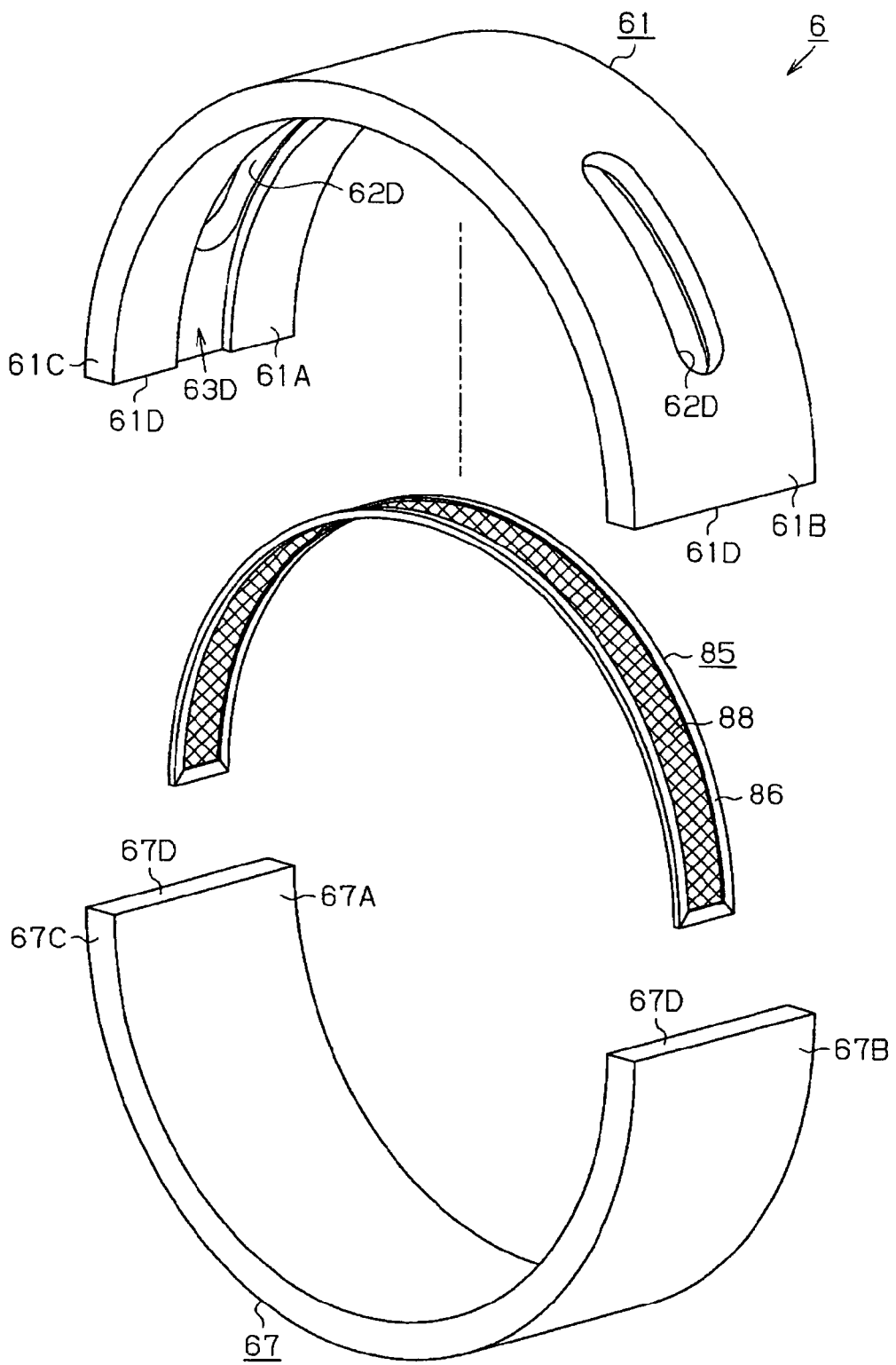
FIG. 49 is an exploded perspective view showing the perspective structure of a crank bearing of the tenth exemplary embodiment, which is one example of a bearing of the invention.
Figure 50A:
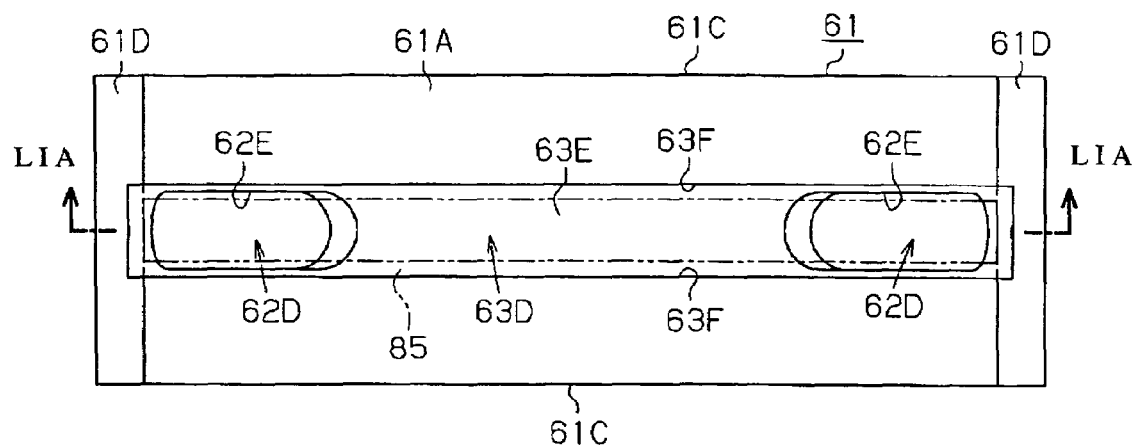
FIG. 50A is a bottom view showing the bottom structure of the upper bearing of the crank bearing of the tenth exemplary embodiment.
Figure 50B:
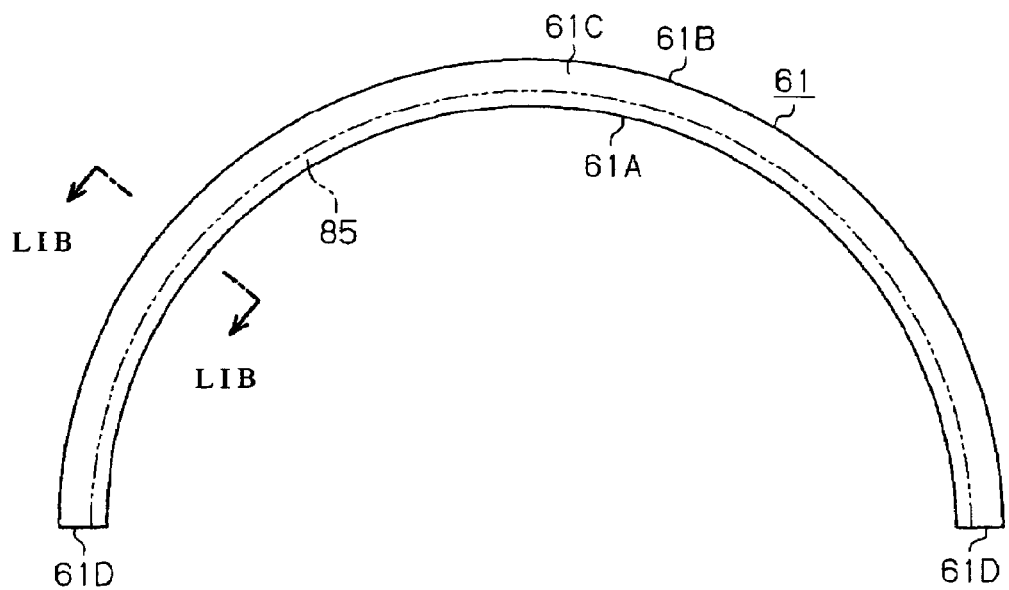
FIG. 50B is a front view showing the front structure of the upper bearing of the crank bearing of the tenth exemplary embodiment.

The structure of the crank bearing 6 of the tenth exemplary embodiment will be described with reference to FIG. 49 to FIG. 50B. An inner peripheral oil groove 63D for distributing the engine oil 41 to the crank journal 51 is formed in the inner peripheral face 61A of the upper bearing 61. The bearing filter 85 for filtering the engine oil 41 is attached to the inner peripheral oil groove 63D. The bearing filter 85 is fixed to the upper bearing 61 by welding. The structure of the bearing filter 85 of the tenth exemplary embodiment is substantially the same as that of the bearing filter 85 of the sixth exemplary embodiment. The filter body 86 is shaped to match the outline of the inner peripheral oil groove 63D.

The inner peripheral oil groove 63D extends in the circumferential direction from the upper end face 61D of the upper bearing 61 at one end to the upper end face 61D at the other end. The inner peripheral oil groove 63D is defined by the respective faces of the upper bearing 61 on the inner peripheral side, i.e., a pair of oil groove side faces 63F opposite each other across a space and an oil groove bottom face 63E connecting the oil groove side faces 63F. The oil groove bottom face 63E curves to match the outline of the upper inner peripheral face 61A. The oil groove side faces 63F are flat and parallel to each other. Each oil hole 62D is a through hole penetrating the upper bearing 61 from the upper outer peripheral face 61B to the oil groove bottom face 63E.

Next, a description will be made, with reference to FIG. 51, of how the bearing filter 85 is attached. The bearing filter 85 is attached to the upper bearing 61 as follows. The bearing filter 85 is first put in the inner peripheral oil groove 63D such that the filter-body outer peripheral face 86D of the filter body 86 contacts the oil groove bottom face 63E of the upper bearing 61, and the bearing filter 85 is then fixed to the inner peripheral side of the upper bearing 61 by welding of the first wall portions 86A and the second wall portions 86B of the filter body 86.

In the above-described structure of the upper bearing 61, each oil hole outlet 62F is covered by the net 88. Namely, the bearing filter 85 is attached such that the engine oil 41 that has flown out from the partition-wall-side bearing portion 24A entirely passes through the net 88 before flowing into between the bearing inner peripheral face 6A and the journal outer peripheral face 51F via the inner peripheral oil groove 63D. Further, the bearing filter 85 is formed and attached such that no portion of the bearing filter 85 protrudes inward in the radial direction from the upper inner peripheral face 61A.

Figure 52:
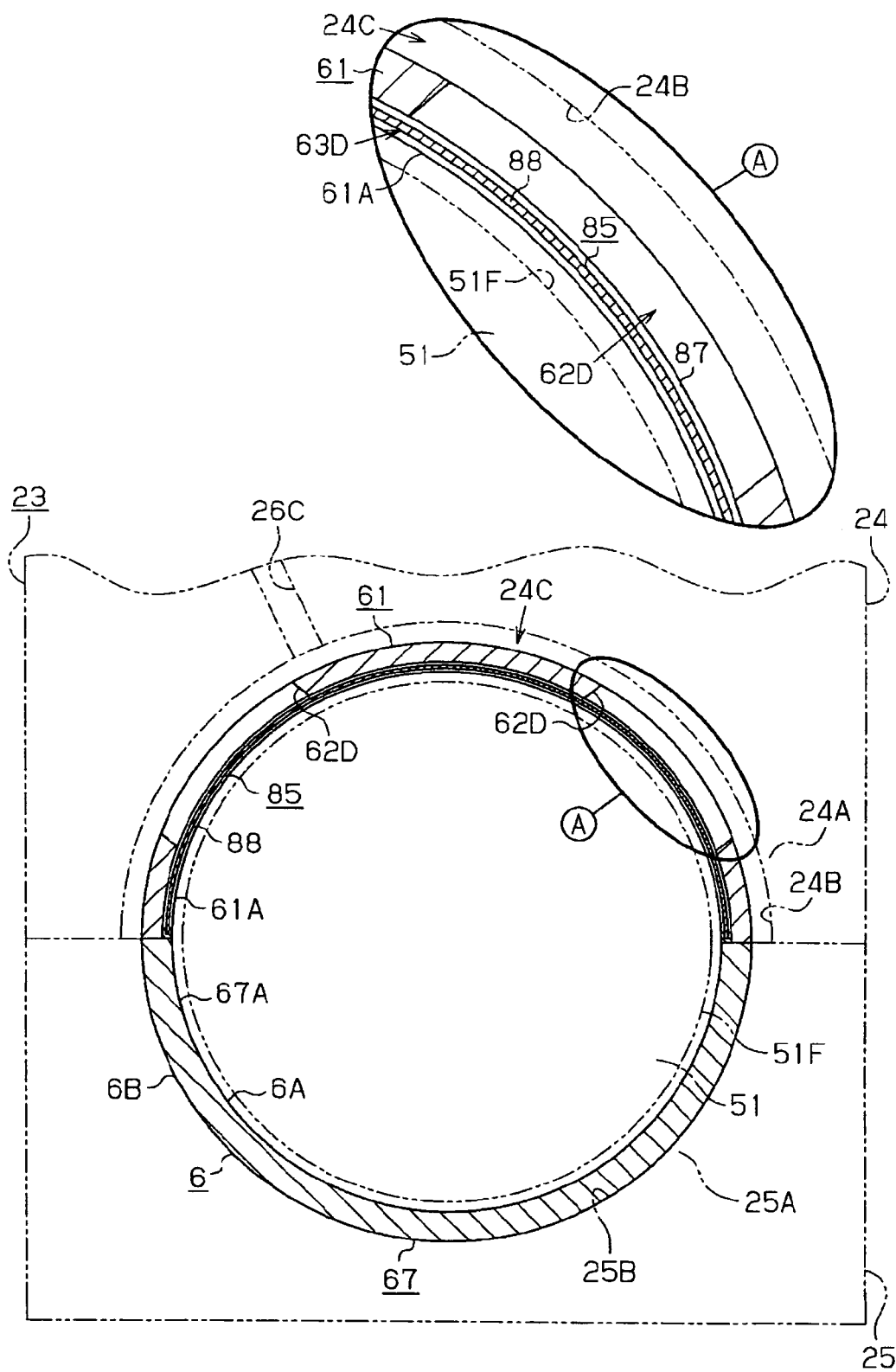
FIG. 52 is a cross-sectional view cutting through the crankshaft and its peripheral elements incorporated in the engine of the tenth exemplary embodiment along the radial direction of the crankshaft.

The structure for supporting the crank journal 51 will be described with reference to FIG. 52. FIG. 51 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the bearing oil groove 24C of the partition-wall-side bearing portion 24A and each oil hole 62D of the upper bearing 61 communicate with each other. That is, the upper bearing 61 is fixed such that the engine oil 41 that has flown out from the third oil passage 26C enters each oil hole 62D via the bearing oil groove 24C.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C to the inside of the upper bearing 61 via the opening of each oil hole 62D of the upper bearing 61. Then, the engine oil 41 flows from the inside of the upper bearing 61 into between the bearing inner peripheral face 6A and the journal outer peripheral face 51F via the net 88 of the bearing filter 85 and the inner peripheral oil groove 63D.

Advantageous Effects of Exemplary Embodiment

According to the crank bearing of the tenth exemplary embodiment described above in detail, the following advantageous effect can be obtained as well as the advantageous effects (1) to (5) in the first exemplary embodiment and the advantageous effects (11) and (12) in the third exemplary embodiment.

(25) According to the crank bearing 6 of the tenth exemplary embodiment, the upper bearing 61 and the bearing filter 85 are formed such that no portion of the bearing filter 85 protrudes inward in the radial direction from the bearing inner peripheral face 6A. Therefore, interferences between the bearing filter 85 and the crank journal 51 can be prevented.

Eleventh Exemplary Embodiment

An eleventh exemplary embodiment of the invention will be described with reference to FIG. 53 to FIG. 59B. The crank bearing of the eleventh exemplary embodiment can be obtained by modifying part of the crank bearing of the tenth exemplary embodiment. Namely, the structure of the crank bearing of the eleventh exemplary embodiment is substantially the same as that of the crank bearing of the tenth exemplary embodiment except the points that will be described below. Note that the parts and components that are the same as those in the tenth exemplary embodiment are denoted by the same reference numerals in each drawing.

Figure 53:
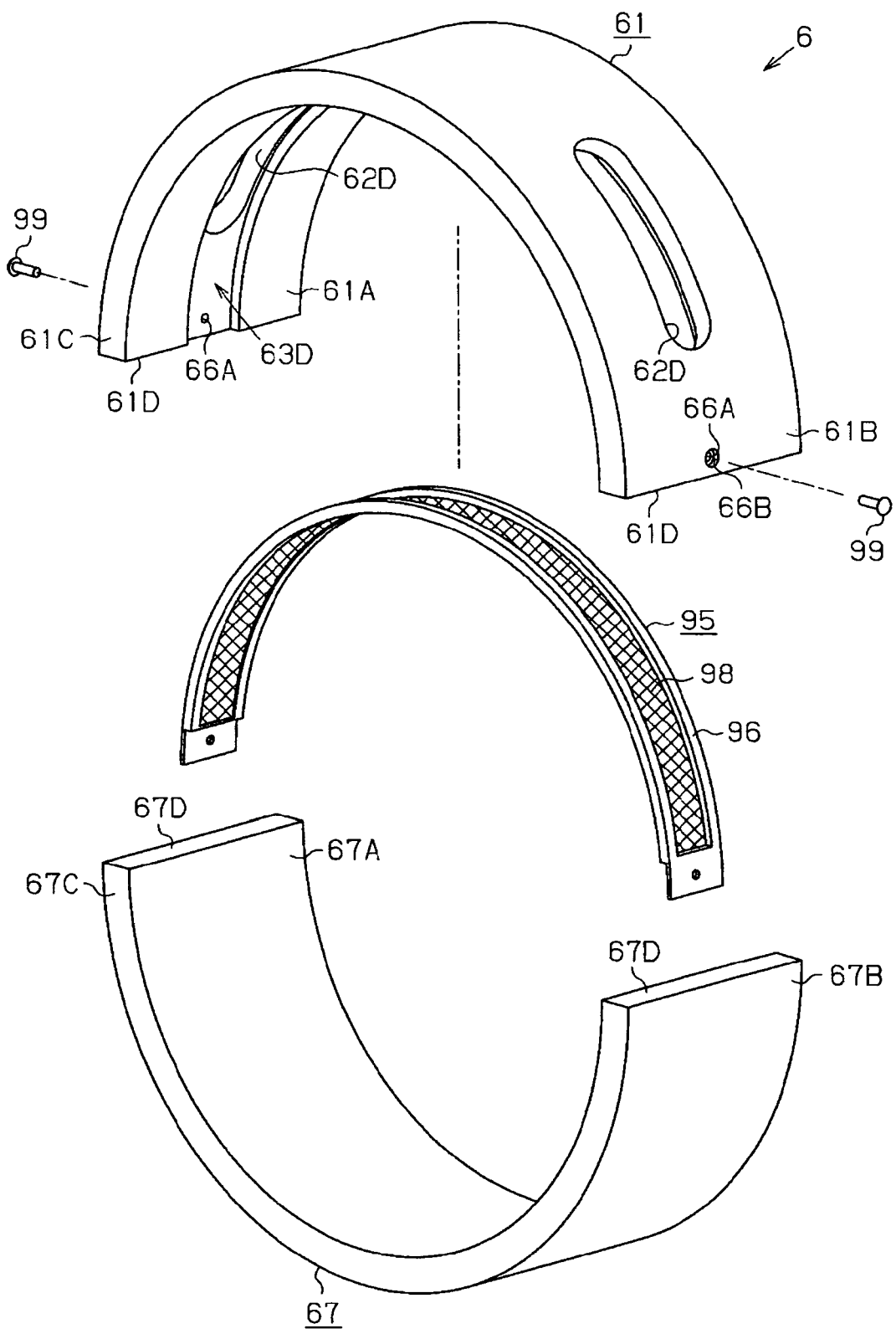
FIG. 53 is an exploded perspective view showing the perspective structure of a crank bearing of the eleventh exemplary embodiment, which is one example of a bearing of the invention.
Figure 56A:
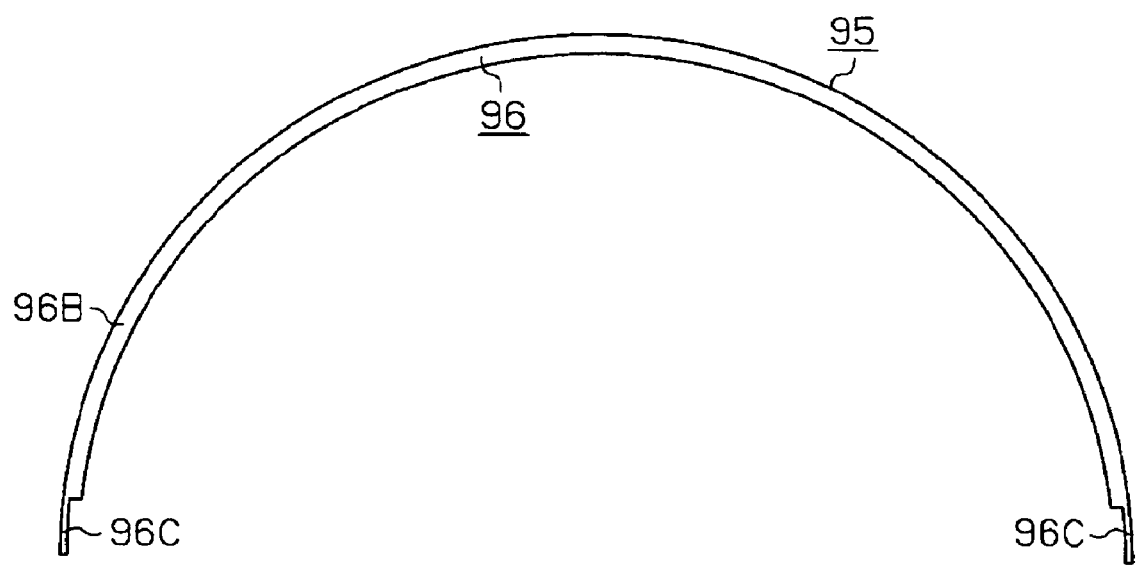
FIG. 56A is a front view showing the front structure of the bearing filter of the crank bearing of the eleventh exemplary embodiment.
Figure 56B:
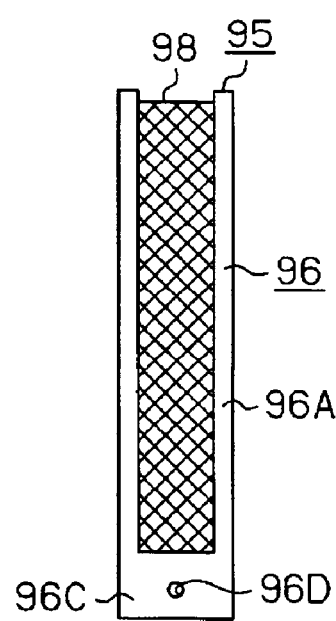
FIG. 56B is a side view showing the side structure of the bearing filter of the crank bearing of the eleventh exemplary embodiment.

The structure of the crank bearing 6 of the eleventh exemplary embodiment will be described with reference to FIG. 53 to FIG. 54B. A bearing filter 95 for filtering the engine oil 41 is attached to the inner peripheral oil groove 63D. Holes (insert holes 66A) into which rivets 99 are inserted are formed near both ends of the upper bearing 61. Countersunk holes 66B for accommodating the heads of the rivets 99 are formed at the outer peripheral sides of the respective insert holes 66A. The bearing filter 95 is fixed to the inner peripheral side of the upper bearing 61 by the rivets 99. Note that the bearing filter 95 may be fixed to the upper bearing 61 by fixing means other than the rivets 99 (e.g., grommets).

Next, the structure of the bearing filter 95 will be described with reference to FIG. 55A to FIG. 56B. The bearing filter 95 is constituted of a filter body 96 via which the bearing filter 95 is attached to the upper bearing 61 and a net 98 that is attached to the filter body 96 to filter the engine oil 41.

The filter body 96 is made of resin. The filter body 96 has a peripheral wall portion 96A along which the engine oil 41 flows and a side wall portion 96B that provides a space between the peripheral wall portion 96A and the upper bearing 61. An oil passage 97 through which the engine oil 41 flows is defined by the peripheral wall portion 96A and the side wall portion 96B in the filter body 96. On the outer sides of the side wall portion 96B are provided a pair of fixing portions 96C via which the filter body 96 is attached to the upper bearing 61. Holes (insert holes 96D) into which rivets 99 are inserted are formed at the respective fixing portions 96C.

The net 98 is attached to the filter body 96 such that the engine oil 41 flowing through the filter body 96 can be entirely filtered. The mesh size of the net 98 is smaller than the diameters of foreign particles that flow through the oil filter 44 and enter the engine oil passage 26 (refer to FIG. 10) in the cylinder block 2 together with the engine oil 41. That is, the mesh size of the net 98 is small enough to trap even extremely small foreign particles contained in the engine oil 41.

Figures 57A, 57B:
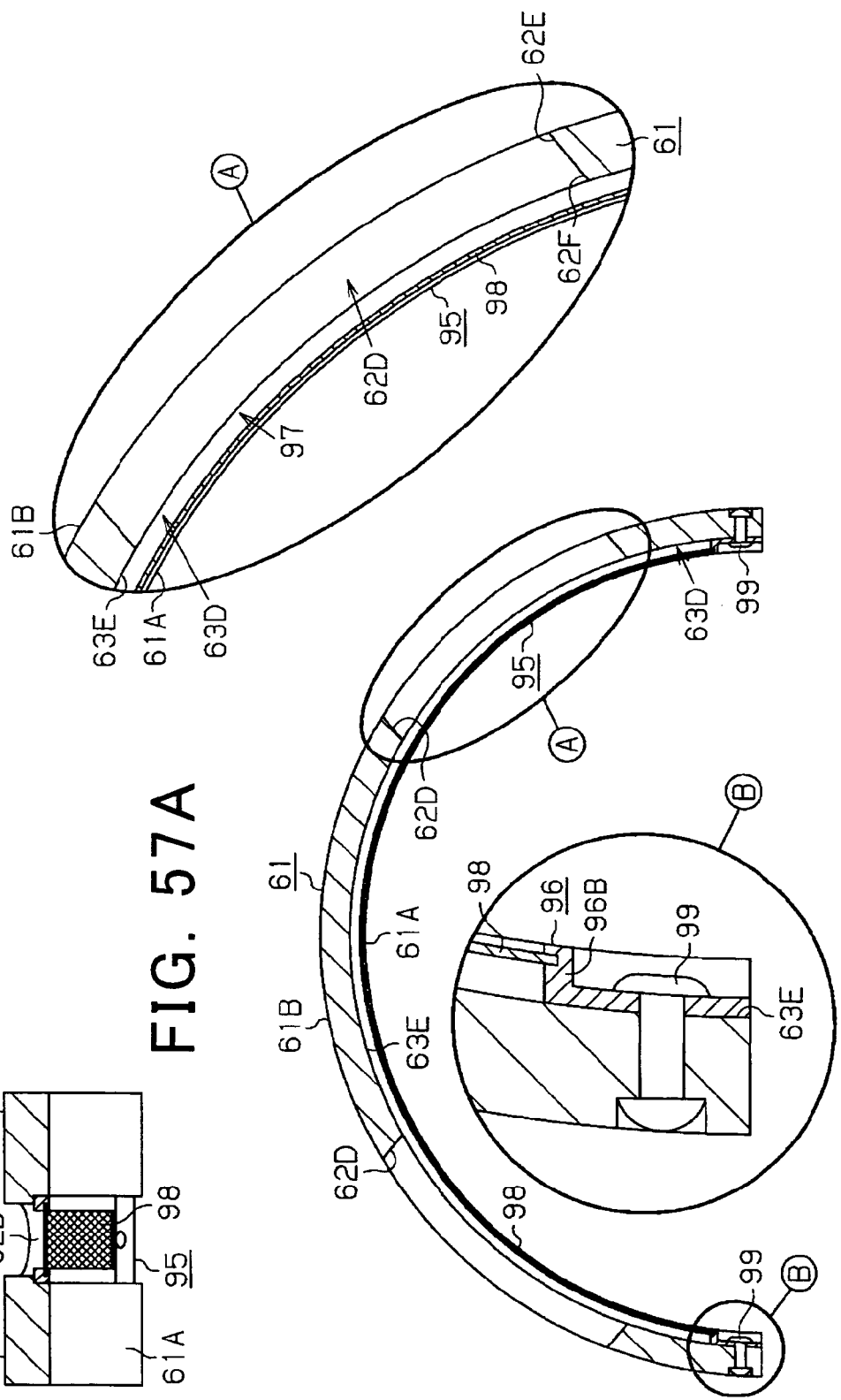
FIG. 57A is a cross-sectional view showing a cross section cutting through the upper bearing of the crank bearing of the eleventh exemplary embodiment along the line LVIIA-LVIIA in FIG. 54A.
FIG. 57B is a cross-sectional view showing a cross section cutting through the upper bearing of the crank bearing of the eleventh exemplary embodiment along the line LVIIB-LVIIB in FIG. 54B.

Next, a description will be made, with reference to FIG. 57A and FIG. 57B, of how the bearing filter 95 is attached. The bearing filter 95 is attached to the upper bearing 61 as follows. The bearing filter 95 is first put on the upper bearing 61 such that the fixing portions 96C of the filter body 96 contact the upper inner peripheral face 61A of the upper bearing 61, and the bearing filter 95 is then fixed to the inner peripheral side of the upper bearing 61 by inserting the rivets 99 into the insert holes 96D and the insert holes 66A.

In the above-described structure of the upper bearing 61, each oil hole outlet 62C is covered by the net 98. Namely, the bearing filter 95 is attached such that the engine oil 41 that has flown out from the partition-wall-side bearing portion 24A entirely passes through the net 98 before flowing into between the bearing inner peripheral face 6A and the journal outer peripheral face 51F via the inner peripheral groove 63A. The bearing filter 95 is formed and attached such that no portion of the bearing filter 95 protrudes inward in the radial direction from the upper inner peripheral face 61A. A space is provided between the net 98 and each oil hole outlet 62C.

Figure 58:
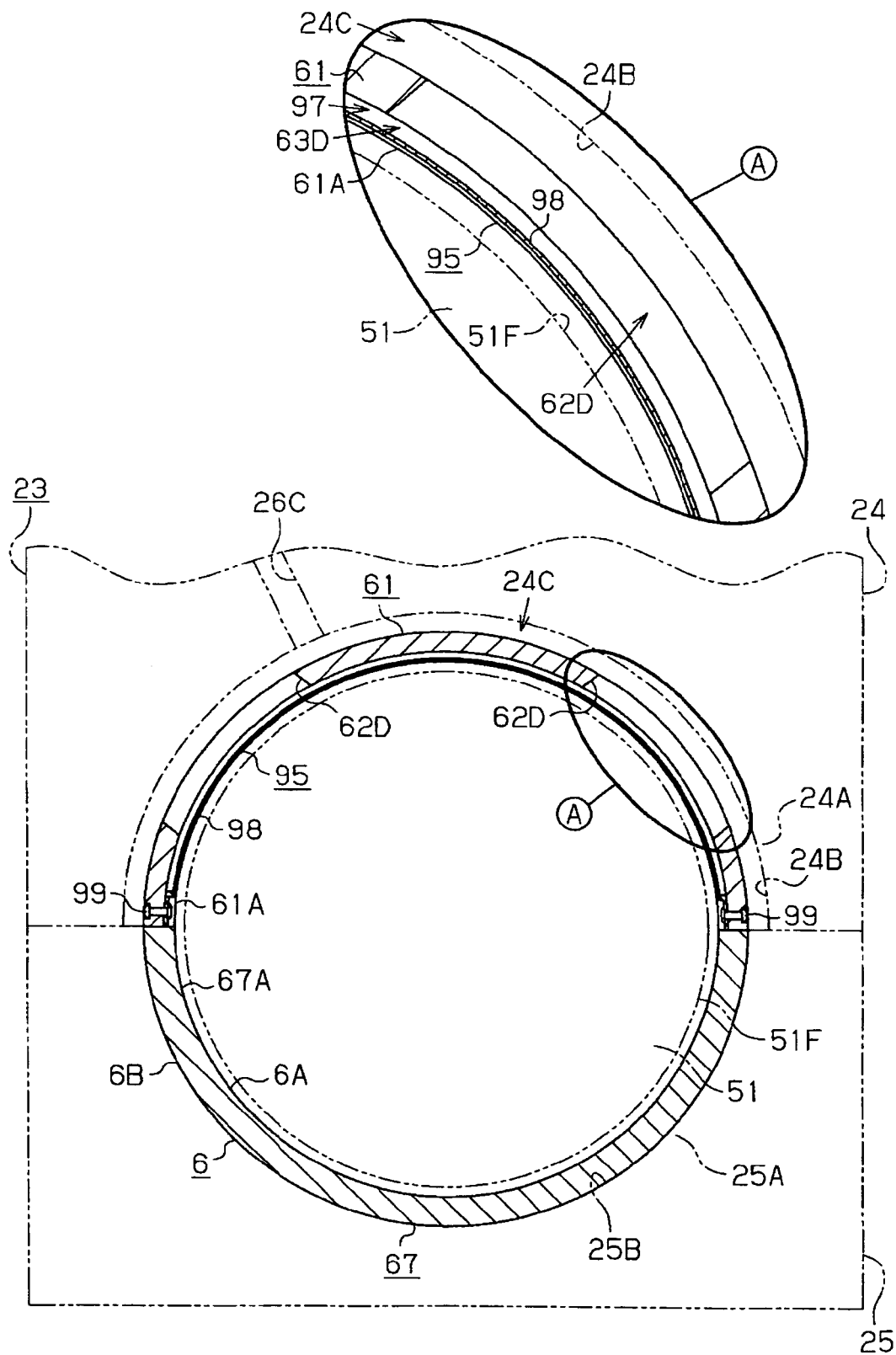
FIG. 58 is a cross-sectional view cutting through the crankshaft and its peripheral elements incorporated in the engine of the eleventh exemplary embodiment along the radial direction of the crankshaft.

The structure for supporting the crank journal 51 will be described with reference to FIG. 58. FIG. 58 is a cross-sectional view showing the portion of the engine 1 around the crank journal 51 in the state where the engine oil 41 is being supplied to the crankshaft 5.

In the engine 1, the upper bearing 61 is fixed to the partition-wall-side bearing portion 24A such that the third oil passage 26C of the cylinder block 2 and each oil hole 62D of the upper bearing 61 communicate with each other. That is, the upper bearing 61 is fixed such that the engine oil 41 that has flown out from the third oil passage 26C enters each oil hole 62D.

The engine oil 41 in the cylinder block 2 is distributed to each part of the crankshaft 5 as follows. The engine oil 41 first flows from the third oil passage 26C to the inside of the upper bearing 61 via the opening of the partition-wall-side bearing portion 24A and the inlet of each oil hole 62D. Then, the engine oil 41 flows from the inside of the upper bearing 61 into between the bearing inner peripheral face 6A and the journal outer peripheral face 51F via the inner peripheral groove 63A and the net 98 of the bearing filter 95.

Figure 59A:
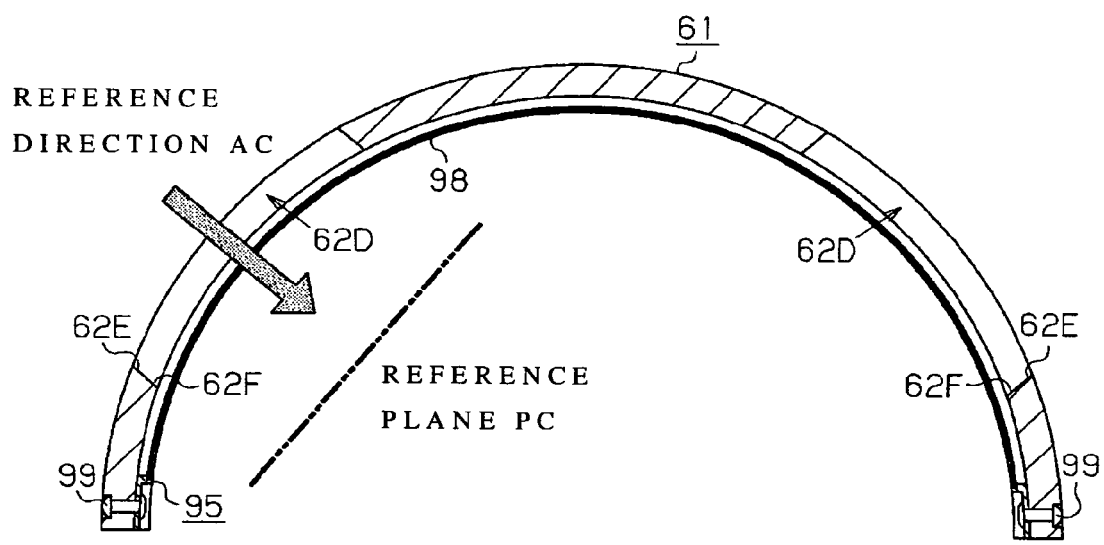
FIG. 59A is another cross-sectional view showing the cross section cutting through the upper bearing of the crank bearing of the eleventh exemplary embodiment along the line LVIIA-LVIIA in FIG. 54A.
Figure 59B:
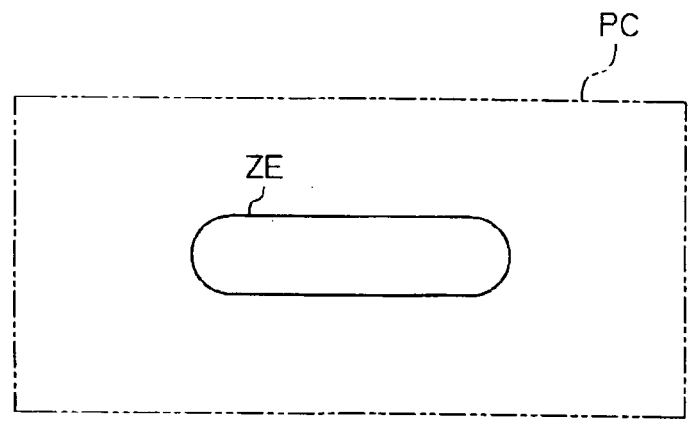
FIG. 59B is a projected view showing the oil hole outlet of the upper bearing of the crank bearing of the eleventh exemplary embodiment.

Next, a description will be made, with reference to FIG. 59A and FIG. 59B, of how the area of the net 98 is determined. The surface area of the net 98 is denoted "reference area SN5". The area of the portion of the bearing filter 95 of the crank bearing 6 through which the engine oil 41 passes is denoted "effective area SX5". The flow direction of the engine oil 41 passing through the oil hole outlet 62C is denoted "reference direction AC". The plane perpendicular to the reference direction AC is denoted "reference plane PC". The figure obtained by projecting the oil hole outlet 62C onto the reference plane PC in the reference direction AC is denoted "outlet figure ZE". The area of the outlet figure ZE is denoted "passage area SE" of the oil hole outlet 62C.

In the structure of the crank bearing 6, the reference area SN5 of the net 98 is larger than the passage area SE of the oil hole outlet 62C. The reference area SN5 and the effective area SX5 are equal to each other. That is, by providing a space between the net 98 and the upper bearing 61, the effective area SX5 is made equal to the reference area SN5.

Advantageous Effects of Exemplary Embodiments

According to the crank bearing of the eleventh exemplary embodiment described above in detail, the advantageous effects (1) to (5) in the first exemplary embodiment, the advantageous effects (11), (12), (18), and (19) in the third exemplary embodiment, and the advantageous effect (25) in the tenth exemplary embodiment can be obtained.

Twelfth Exemplary Embodiment

A twelfth exemplary embodiment of the invention will be described with reference to FIG. 60 to FIG. 63. The crank bearing of the twelfth exemplary embodiment can be obtained by modifying part of the crank bearing of the seventh exemplary embodiment. Namely, the structure of the crank bearing of the twelfth exemplary embodiment is the same as that of the crank bearing of the seventh exemplary embodiment except the points that will be described below. Note that the parts and components that are the same as those in the seventh exemplary embodiment are denoted by the same reference numerals in each drawing.

Figure 60:
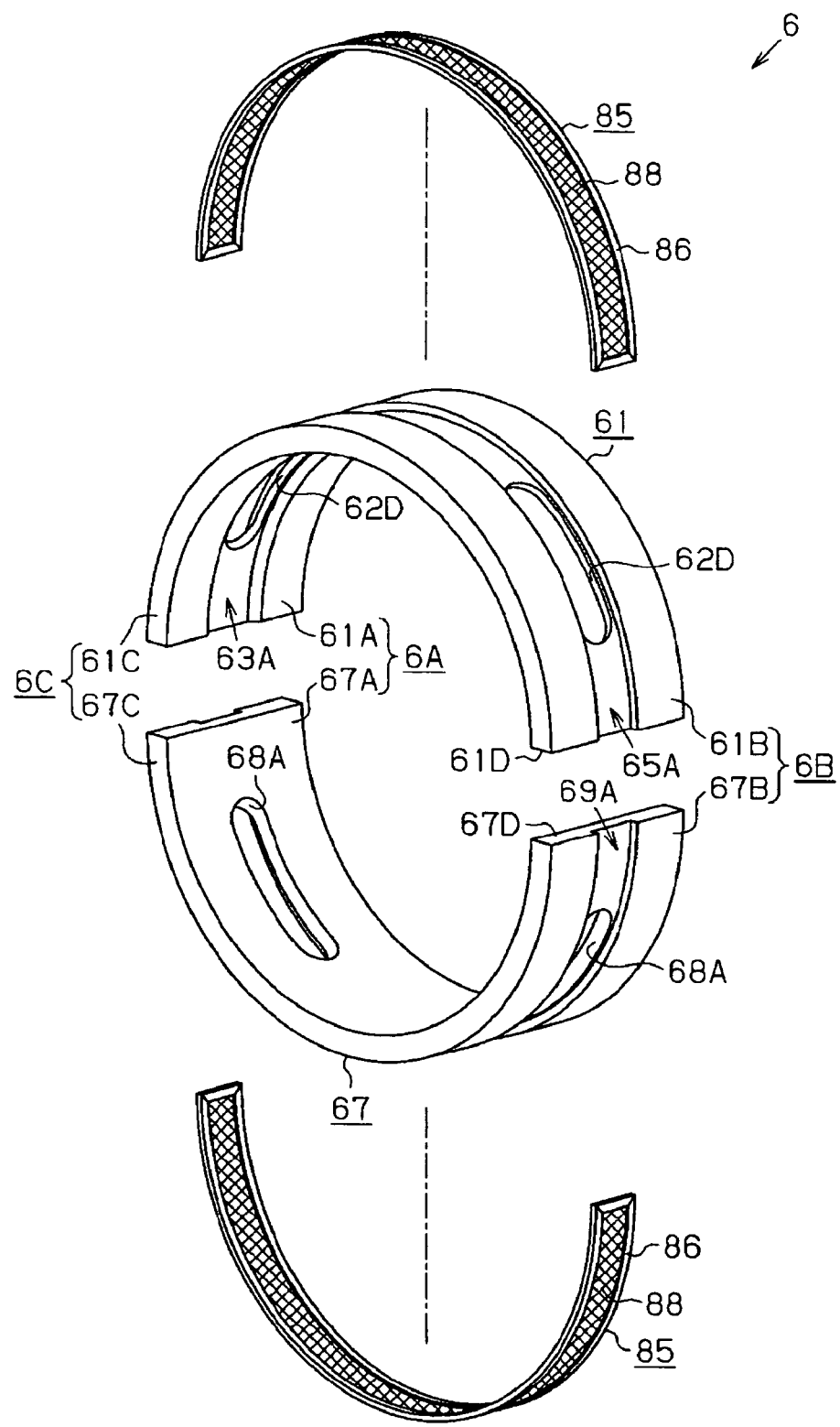
FIG. 60 is an exploded perspective view showing the perspective structure of a crank bearing of the twelfth exemplary embodiment, which is one example of a bearing of the invention.
Figure 61A:
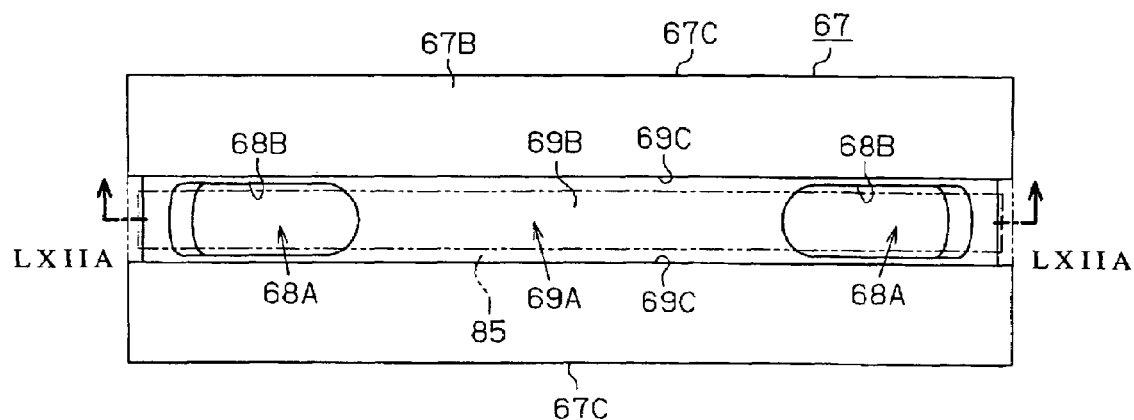
FIG. 61A is a plan view showing the planar structure of the lower bearing of the crank bearing of the twelfth exemplary embodiment.
Figure 61B:
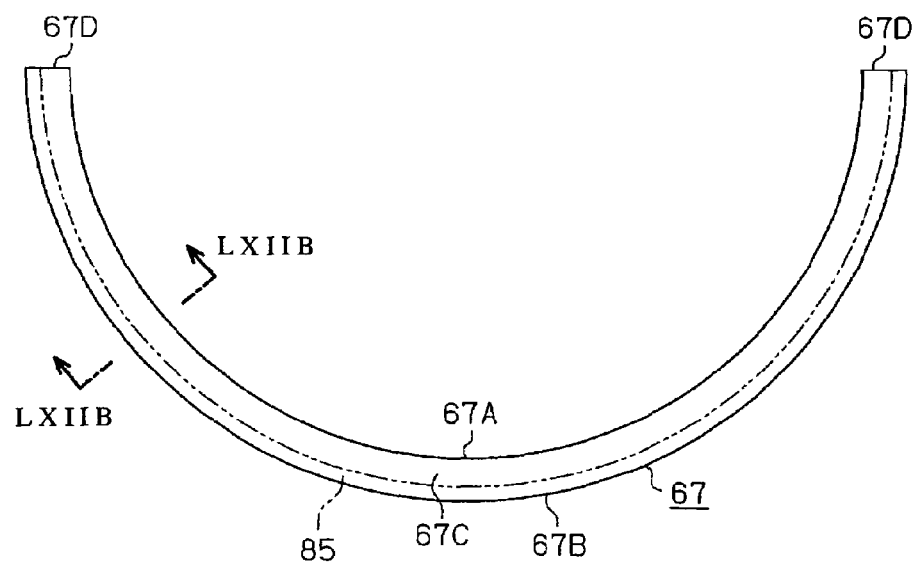
FIG. 61B is a front view showing the front structure of the lower bearing of the crank bearing of the twelfth exemplary embodiment.

The structure of the crank bearing 6 of the twelfth exemplary embodiment will be described with reference to FIG. 60 to FIG. 61B. The lower bearing 67 has two oil holes 68A for distributing the engine oil 41 from the outer side to the inner side of the crank bearing 6 and an outer peripheral oil groove 69A for distributing the engine oil 41 to each oil hole 68A. The bearing filter 85 for filtering the engine oil 41 is attached to the outer peripheral oil groove 69A. The bearing filter 85 is fixed to the outer peripheral side of the lower bearing 67 by welding. The structure of the bearing filter 85 of the twelfth exemplary embodiment is substantially the same as that of the bearing filter 85 of the sixth exemplary embodiment. The filter body 86 is shaped to match the outline of the outer peripheral oil groove 69A.

The outer peripheral oil groove 69A extends in the circumferential direction from the lower end face 67D of the lower bearing 67 at one end to the lower end face 67D at the other end. The outer peripheral oil groove 69A is defined by the respective faces of the upper bearing 61 on the outer peripheral side, i.e., a pair of oil groove side faces 69C opposite each other across a space and an oil groove bottom face 69B connecting the oil groove side faces 69C. The oil groove bottom face 69B curves to match the outline of the lower outer peripheral face 67B. The oil groove side faces 69C are flat and parallel to each other.

Each oil hole 68A is oblong extending in the circumferential direction of the upper bearing 61. Each oil hole 68A has an oil hole inlet 68B that opens toward the outer side of the lower bearing 67 and an oil hole outlet 68C that opens toward the inner side of the lower bearing 67. That is, each oil hole 68A is a through hole penetrating the lower bearing 67 from the oil groove bottom face 69B to the lower inner peripheral face 67A. Note that the upper bearing 61 and the lower bearing 67 correspond to "first bearing body" and "second bearing body", respectively.

Next, a description will be made, with reference to FIG. 62A and FIG. 62B, of how the bearing filter 85 is attached. The bearing filter 85 is attached to the lower bearing 67 as follows. The bearing filter 85 is first put on the lower bearing 67 such that the filter-body inner peripheral face 86C of the filter body 86 contacts the oil groove bottom face 69B of the lower bearing 67, and the bearing filter 85 is then fixed to the outer peripheral side of the lower bearing 67 by welding of the first wall portions 86A and the second wall portions 86B of the filter body 86.

In the above-described structure of the lower bearing 67, each oil hole inlet 68B is covered by the net 88. Namely, the engine oil 41 that has flown out from the partition-wall-side bearing portion 24A entirely passes through the net 88 before flowing into between the bearing inner peripheral face 6A and the journal outer peripheral face 51F via the outer peripheral oil groove 69A and the oil holes 68A. Further, the bearing filter 85 is formed and attached such that no portion of the bearing filter 85 protrudes outward in the radial direction from the lower outer peripheral face 67B.

Figure 63:
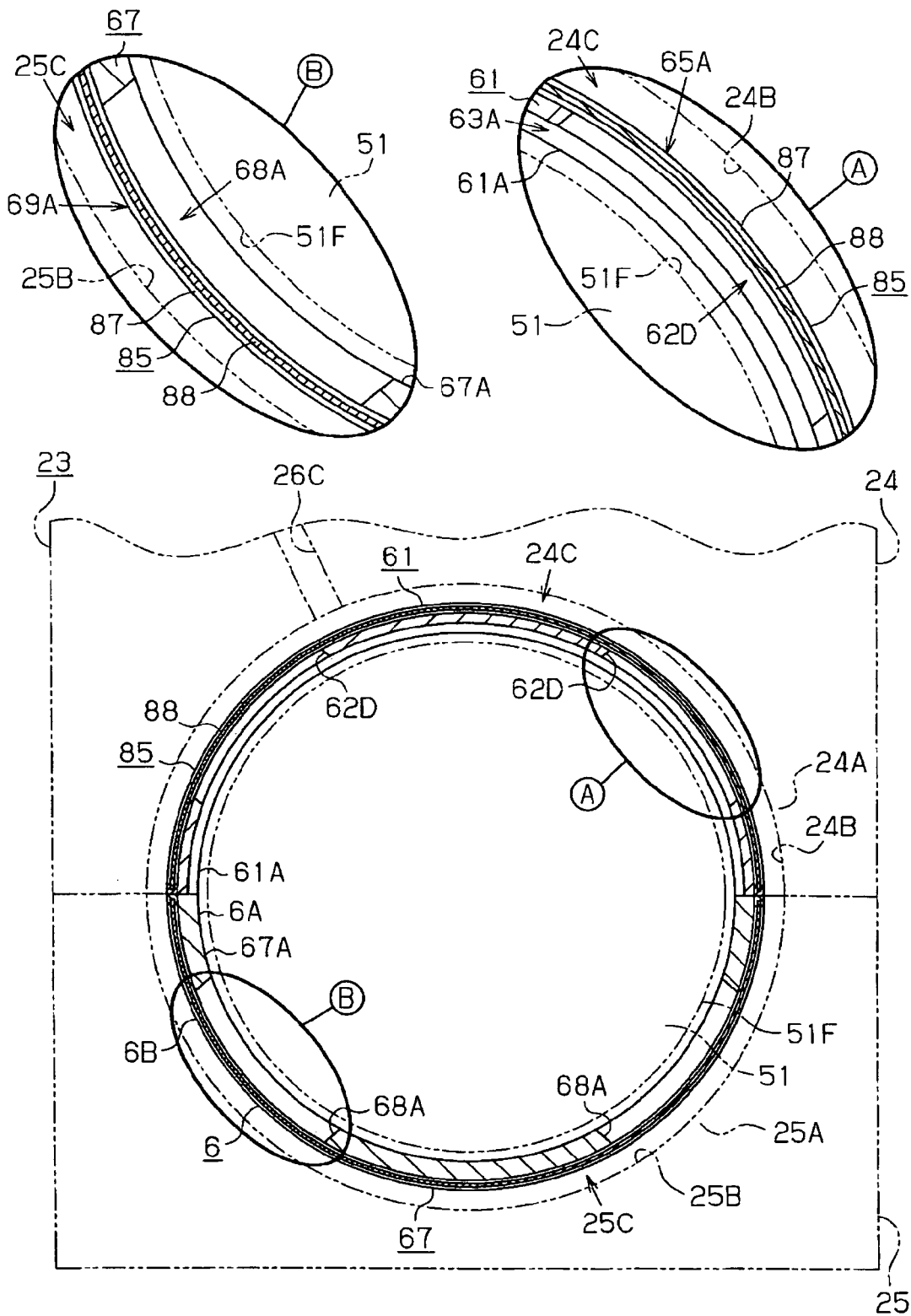
FIG. 63 is a cross-sectional view cutting through the crankshaft and its peripheral elements incorporated in the engine of the twelfth exemplary embodiment along the radial direction of the crankshaft.

The structure for supporting the crank journal 51 will be described with reference to FIG. 63. FIG. 63 is a cross-sectional view showing the portion of the engine 1 around the crank journal 51 in the state where the engine oil 41 is being supplied to the crankshaft 5.

In the engine 1, the crank cap 25 is fixed to the partition-wall-side bearing portion 24A such that the bearing oil groove 24C of the partition-wall-side bearing portion 24A and a bearing oil groove 25C of the crank cap 25 communicate with each other. That is, the crank bearing portion 23 is structured such that the engine oil 41 that has flown out from the third oil passage 26C flows into the bearing oil groove 25C via the bearing oil groove 24C. The bearing oil groove 25C is formed as an oil groove for distributing the engine oil 41 from the bearing oil groove 24C to each oil hole 68A of the lower bearing 67.

The lower bearing 67 is fixed to the cap-side bearing portion 25A such that the bearing oil groove 25C of the crank cap 25 and the outer peripheral oil groove 69A of the lower bearing 67 communicate with each other. That is, the lower bearing 67 is fixed such that the engine oil 41 that has flown out from the third oil passage 26C flows into each oil hole 68A via the bearing oil groove 24C, the bearing oil groove 25C, and the net 88 of the lower bearing 67. A space is provided between the cap-side bearing portion 25A and the net 88.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C into each oil hole 62D via the outer peripheral oil groove 65A and the net 88 of the upper bearing 61. Then, the engine oil 41 flows from each oil hole 62D into between the bearing inner peripheral face 6A and the journal outer peripheral face 51F via the inner peripheral groove 63A.

On the other hand, the engine oil 41 flows from the third oil passage 26C into the bearing oil groove 25C via the bearing oil groove 24C. Then, the engine oil 41 flows from the bearing oil groove 25C into each oil hole 68A via the outer peripheral oil groove 69A and the net 88 of the lower bearing 67. Then, the engine oil 41 flows from each oil hole 68A into between the bearing inner peripheral face 6A and the journal outer peripheral face 51F via the outlet of each oil hole 68A.

Advantageous Effects of Exemplary Embodiment

According to the crank bearing of the twelfth exemplary embodiment described above in detail, the following advantageous effects can be obtained as well as the advantageous effects (1) to (5) in the first exemplary embodiment, the advantageous effect (11) in the third exemplary embodiment, the advantageous effect (21) in the sixth exemplary embodiment, and the advantageous effect (22) in the seventh exemplary embodiment.

(26) According to the twelfth exemplary embodiment, the crank bearing 6 is structured and the bearing filter 85 is attached to the outer peripheral oil groove 69A of the lower bearing 67 such that the engine oil 41 that has flown out from the partition-wall-side bearing portion 24A flows into between the bearing inner peripheral face 6A and the journal outer peripheral face 51F via the lower bearing 67. Thus, the maximum amount of foreign particles that can be trapped at the crank bearing 6 is larger than when a filter for the crank bearing 6 is only provided in the upper bearing 61, and therefore the possibility of clogging of the filter (the bearing filters 85 of the upper bearing 61 and the lower bearing 67) is low.

(27) According to the crank bearing 6 of the twelfth exemplary embodiment, the oblong oil holes 68A are formed in the lower bearing 67 and the bearing filter 85 is attached so as to cover the oil holes 68A. Thus, the maximum amount of foreign particles that can be trapped at the crank bearing 6 is larger than when the oil holes of the lower bearing 67 are circular, and therefore the possibility of clogging of the net 88 is low.

(28) According to the crank bearing 6 of the twelfth exemplary embodiment, because the outer peripheral oil groove 69A is formed in the lower bearing 67 and the bearing filter 85 is arranged in the outer peripheral oil groove 69A, the size of the crank bearing 6 can be reduced accordingly.

Thirteenth Exemplary Embodiment

A thirteenth exemplary embodiment of the invention will be described with reference to FIG. 64 to FIG. 68B. The crank bearing of the thirteenth exemplary embodiment can be obtained by modifying part of the crank bearing of the eighth exemplary embodiment. Namely, the structure of the crank bearing of the thirteenth exemplary embodiment is substantially the same as that of the crank bearing of the eighth exemplary embodiment except the points that will be described below. Note that the parts and components that are the same as those in the eighth exemplary embodiment are denoted by the same reference numerals in each drawing.

Figure 64:
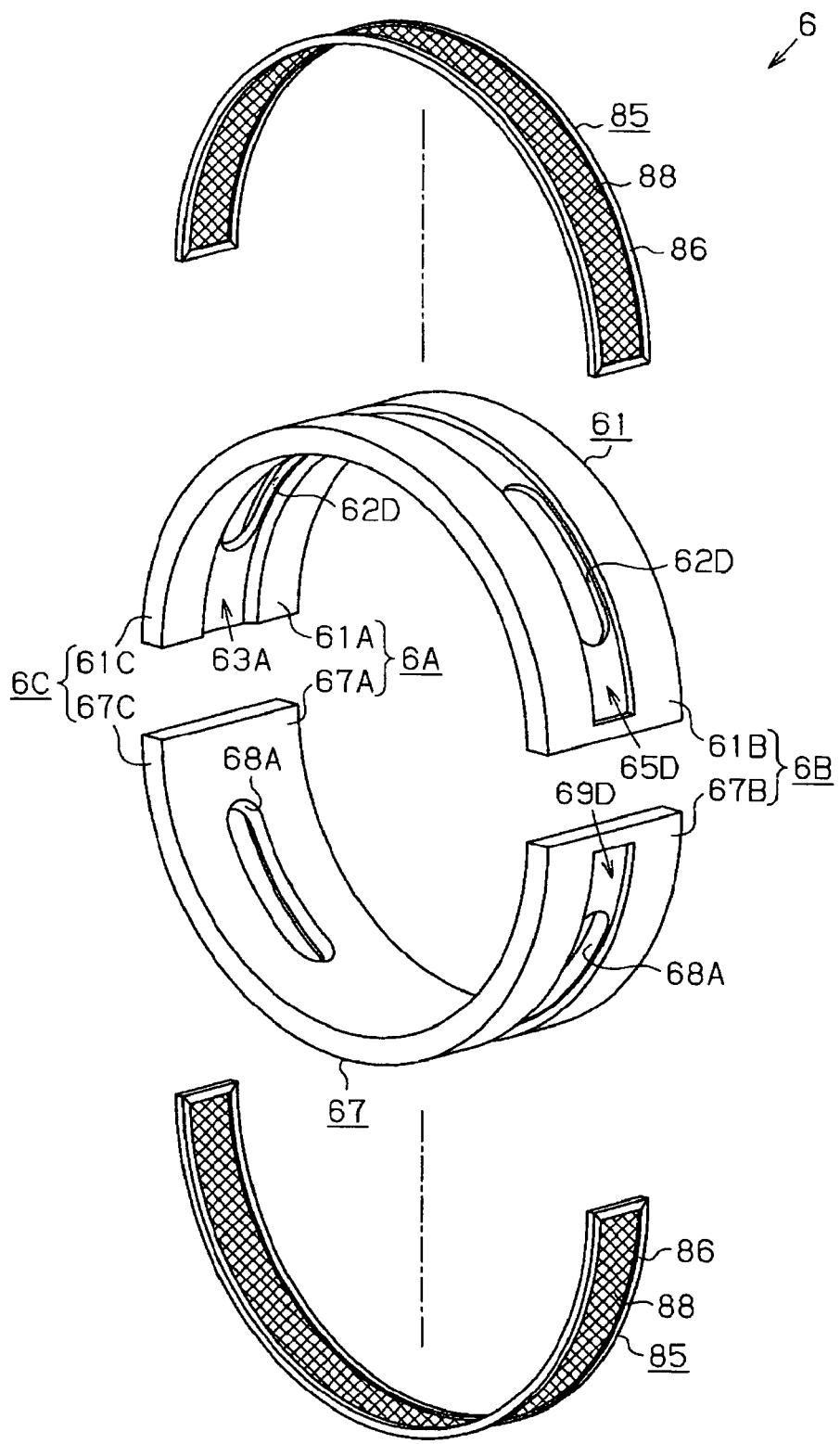
FIG. 64 is an exploded perspective view showing the perspective structures of the lower bearing and the bearing filter of a crank bearing of the thirteenth exemplary embodiment, which is one example of a bearing of the invention.
Figure 65A:
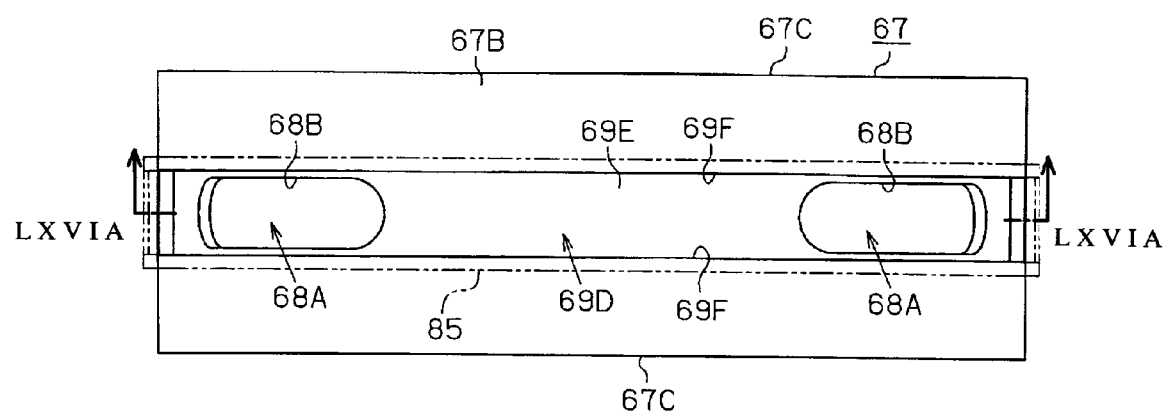
FIG. 65A is a plan view showing the planar structure of the lower bearing of the crank bearing of the thirteenth exemplary embodiment.
Figure 65B:
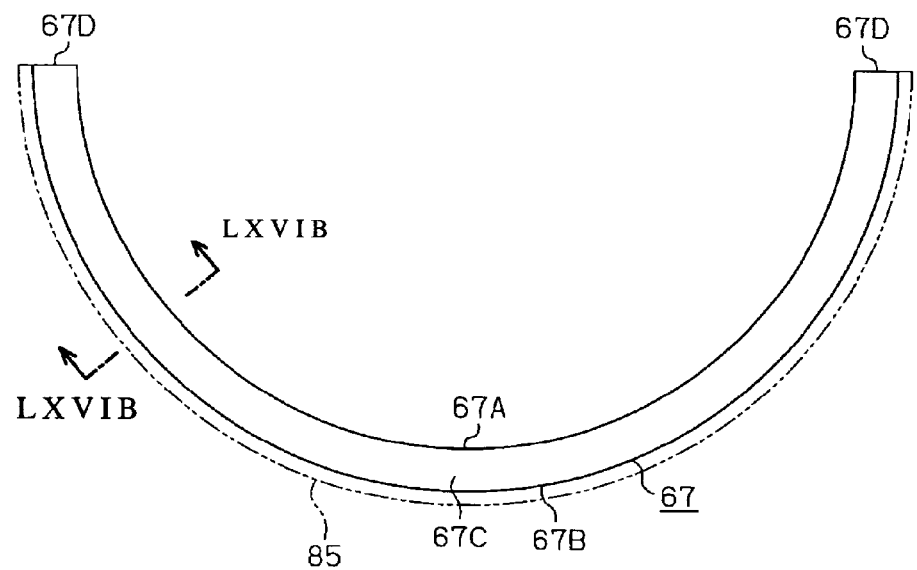
FIG. 65B is a front view showing the front structure of the lower bearing of the crank bearing of the thirteenth exemplary embodiment.

The structure of the crank bearing 6 of the thirteenth exemplary embodiment will be described with reference to FIG. 64 to FIG. 65B. The lower bearing 67 has two oil holes 68A for distributing the engine oil 41 from the outer side to the inner side of the crank bearing 6 and an outer peripheral oil groove 69D for distributing the engine oil 41 to each oil hole 68A. The bearing filter 85 for filtering the engine oil 41 is attached to the lower outer peripheral face 67B. The bearing filter 85 is fixed to the outer peripheral side of the lower bearing 67 by welding. The structure of the bearing filter 85 of the thirteenth exemplary embodiment is substantially the same as that of the bearing filter 85 in the eighth exemplary embodiment. The filter body 86 is sized to straddle the outer peripheral groove 69D of the lower bearing 67 when attached on the lower outer peripheral face 67B of the lower bearing 67.

The outer peripheral oil groove 69D extends in the circumferential direction from near the lower end face 67D of the upper bearing 61 at one end to near the lower end face 67D at the other end. The outer peripheral oil groove 69D is defined by the respective faces of the upper bearing 61 on the outer peripheral side, i.e., a pair of oil groove side faces 69F facing each other across a space and an oil groove bottom face 69E connecting the oil groove side faces 69F. The oil groove bottom face 69E curves to match the outline of the lower outer peripheral face 67B. The oil groove side faces 69F are flat and parallel to each other. Each oil hole 68A is a through hole penetrating the lower bearing 67 from the oil groove bottom face 69E to the lower inner peripheral face 67A.

Next, a description will be made, with reference to FIG. 66A and FIG. 66B, of how the bearing filter 85 is attached. The bearing filter 85 is attached to the lower bearing 67 as follows. The bearing filter 85 is first put on the lower bearing 67 such that the filter-body inner peripheral face 86C of the filter body 86 contacts the lower outer peripheral face 67B of the lower bearing 67, and the bearing filter 85 is then fixed to the outer peripheral side of the lower bearing 67 by welding of the first wall portions 86A and the second wall portions 86B of the filter body 86.

In the above-described structure of the lower bearing 67, the outer peripheral oil groove 69D is covered by the net 88. Namely, the bearing filter 85 is attached such that the engine oil 41 that has flown out from the partition-wall-side bearing portion 24A entirely passes through the net 88 before flowing into between the bearing inner peripheral face 6A and the journal outer peripheral face 51F via the outer peripheral oil groove 69D and the oil holes 68A. A space is provided between the net 88 and the oil hole inlet 68B.

Figure 67:
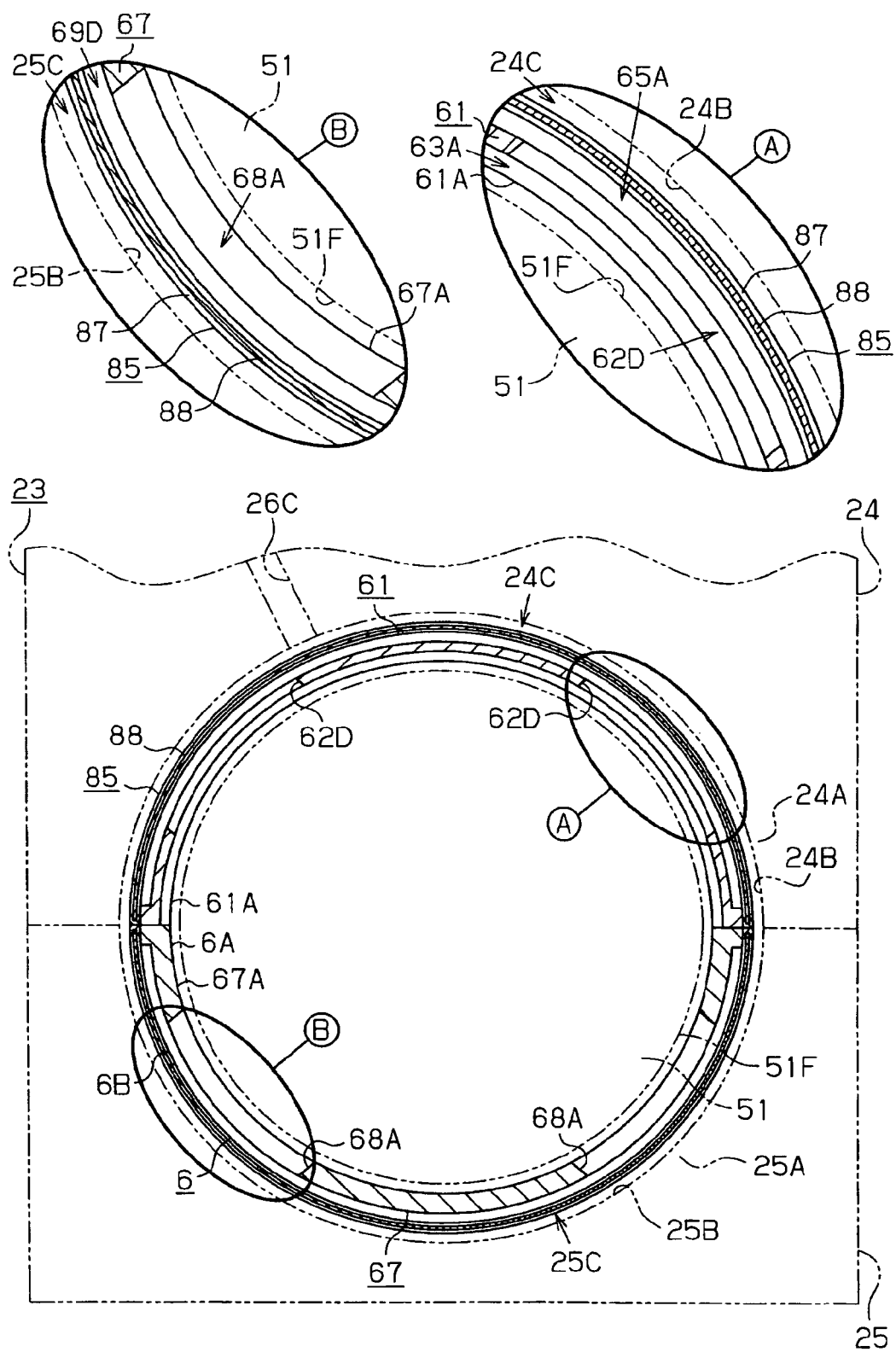
FIG. 67 is a cross-sectional view cutting through the crankshaft and its peripheral elements incorporated in the engine of the thirteenth exemplary embodiment along the radial direction of the crankshaft.

The structure for supporting the crank journal 51 will be described with reference to FIG. 67. FIG. 67 is a cross-sectional view showing the portion of the engine 1 around the crank journal 51 in the state where the engine oil 41 is being supplied to the crankshaft 5.

In the engine 1, the lower bearing 67 is fixed to the cap-side bearing portion 25A such that the bearing oil groove 25C of the crank cap 25 and the outer peripheral oil groove 69D of the lower bearing 67 communicate with each other and the bearing filter 85 is placed in the bearing oil groove 25C. That is, the lower bearing 67 is fixed such that the engine oil 41 that has flown out from the third oil passage 26C flows into each oil hole 68A via the bearing oil groove 24C, the bearing oil groove 25C, and the net 88 of the lower bearing 67. A space is provided between the cap-side bearing portion 25A and the net 88.

The engine oil 41 in the cylinder block 2 is distributed to each part of the crankshaft 5 as follows. The engine oil 41 first flows from the third oil passage 26C into the bearing oil groove 24C via the opening of the partition-wall-side bearing portion 24A. Then, the engine oil 41 flows from the bearing oil groove 24C into the outer peripheral oil groove 65D of the upper bearing 61 via the net 88 of the bearing filter 85. Then, the engine oil 41 flows from the outer peripheral oil groove 65D to the inside of the upper bearing 61 via the inlet of each oil hole 62D. Then, the engine oil 41 flows from the inside of the upper bearing 61 into between the bearing inner peripheral face 6A and the journal outer peripheral face 51F via the inner peripheral groove 63A.

On the other hand, the engine oil 41 flows from the third oil passage 26C into the bearing oil groove 25C via the bearing oil groove 24C. Then, the engine oil 41 flows from the bearing oil groove 25C into the outer peripheral oil groove 69D via the net 88 of the lower bearing 67. Then, the engine oil 41 flows from the outer peripheral oil groove 69D to the inside of the lower bearing 67 via the inlet of each oil hole 68A. Then, the engine oil 41 flows from the inside of the lower bearing 67 into between the bearing inner peripheral face 6A and the journal outer peripheral face 51F via the outlet of each oil hole 68A.

Figure 68A:
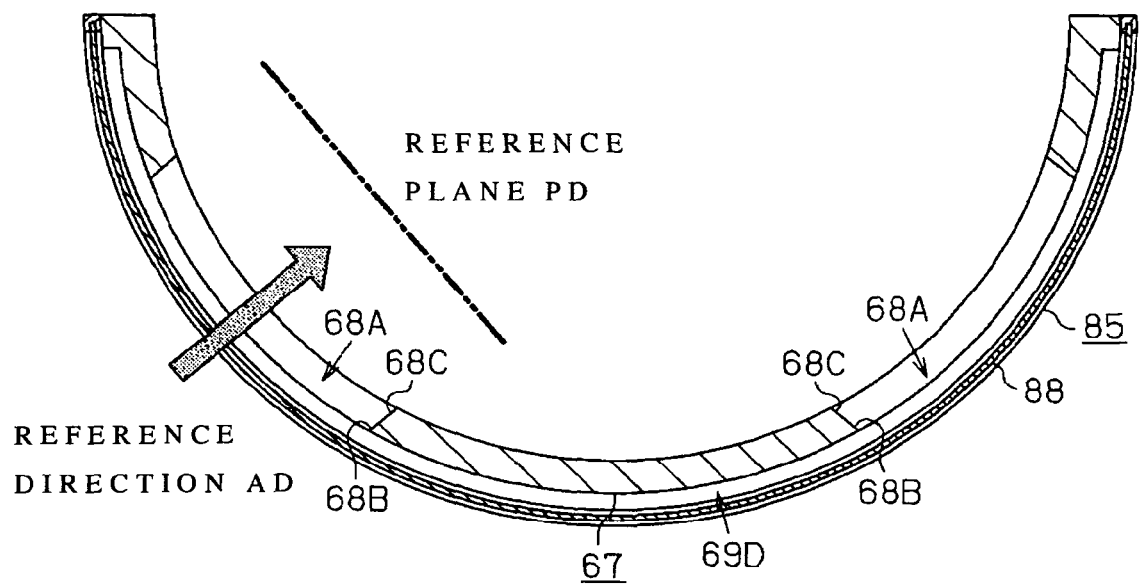
FIG. 68A is another cross-sectional view showing the cross section cutting through the lower bearing of the crank bearing of the thirteenth exemplary embodiment along the line LXVIA-LXVIA in FIG. 65A.
Figure 68B:
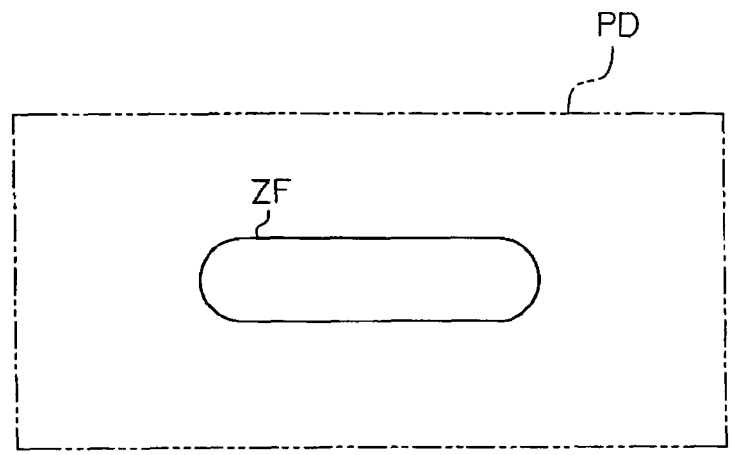
FIG. 68B is a projected view showing the oil hole inlet of the lower bearing of the crank bearing of the thirteenth exemplary embodiment.

Next, a description will be made, with reference to FIG. 68A and FIG. 68B, of how the area of the net 88 of the lower bearing 67 is determined. The surface area of the net 88 is denoted "reference area SN6". The area of the portion of the bearing filter 85 of the crank bearing 6 through which the engine oil 41 passes is denoted "effective area SX6". The flow direction of the engine oil 41 passing through the oil hole inlet 68B is denoted "reference direction AD". The plane perpendicular to the reference direction AD is denoted "reference plane PD". The figure obtained by projecting the oil hole inlet 68B onto the reference plane PD in the reference direction AD is denoted "inlet figure ZF". The area of the inlet figure ZF is denoted "passage area SF" of the oil hole inlet 68B.

In the structure of the crank bearing 6, the reference area SN6 of the net 88 is larger than the passage area SF of the oil hole inlet 68B. The reference area SN6 and the effective area SX6 are equal to each other. That is, by providing a space between the net 88 and the lower bearing 67, the effective area SX6 is made equal to the reference area SN6.

Advantageous Effects of Exemplary Embodiment

According to the crank bearing of the thirteenth exemplary embodiment described above in detail, the following advantageous effects can be obtained as well as the advantageous effects (1) to (5) in the first exemplary embodiment, the advantageous effects (11), (18), and (19) in the third exemplary embodiment, the advantageous effect (21) in the sixth exemplary embodiment, the advantageous effect (23) in the eighth exemplary embodiment, and the advantageous effects (26) and (27) in the twelfth exemplary embodiment.

(29) According to the crank bearing 6 of the thirteenth exemplary embodiment, the reference area SN6 of the net 88 is made larger than the passage area SA of the oil hole inlet 68B by arranging the net 88 of the lower bearing 67 outside of the oil holes 68A. Further, due to such structure, the reference area SN6 is larger than the passage area SF. Thus, the maximum amount of foreign particles that can be trapped at the filter of the crank bearing 6 is larger than it is when the net of the filter of the crank bearing 6 is located in each oil hole 68A, and thus the possibility of clogging of the net 88 is low.

(30) According to the crank bearing 6 of the thirteenth exemplary embodiment, the effective area SX6 is made equal to the reference area SN6 by providing a space between the net 88 of the bearing filter 85 and the lower bearing 67. Thus, the whole part of the net 88 can be used to trap foreign particles, and thus the possibility of clogging of the net 88 is low.

(31) According to the crank bearing 6 of the thirteenth exemplary embodiment, a space is provided between the net 88 and the lower bearing 67 by providing the outer peripheral oil groove 69D at the lower bearing 67. Thus, the size of the bearing filter 85 can be reduced as compared to when the bearing filter is shaped to provide a space between the net 88 and the lower bearing 67 without forming the outer peripheral oil groove 69D. Also, because the maximum amount of foreign particles that can be trapped at the bearing filter 85 is relatively large owing to the presence of the space between the net 88 and the lower bearing 67, the possibility of clogging of the bearing filter 85 can be reduced more reliably and the size of the crank bearing 6 can be reduced.

Other Exemplary Embodiments

Hereinafter, common forms of modification that can be applied to the foregoing exemplary embodiments will be described.

In the respective exemplary embodiments, the number of oil holes formed in the upper bearing 61 may be changed as needed. That is, regardless of the number of oil holes formed in the upper bearing 61, the bearing filter can be attached to the upper bearing 61 in various forms corresponding to or similar to those described in the respective exemplary embodiments.

In the twelfth and thirteenth exemplary embodiments, the number of oil holes formed in the lower bearing 67 may be changed as needed. That is, regardless of the number of oil holes formed in the lower bearing 67, the bearing filter can be attached to the lower bearing 67 in various forms corresponding to or similar to those described in the respective exemplary embodiments.

The structures that are employed in the tenth and eleventh exemplary embodiments to filter the engine oil 41 can also be applied to the lower bearing 67 in other exemplary embodiments. In this case, for example, an oil groove is formed in the inner peripheral face of the lower bearing 67 in a shape corresponding to the shape of the inner peripheral oil groove 63D of the upper bearing 61, and the bearing filter in the tenth or eleventh exemplary embodiment is attached to this oil groove of the lower bearing 67.

Each of the bearing filters of the first to eleventh exemplary embodiments may be arranged in the lower bearing 67. In this case, for example, oil holes for distributing the engine oil 41 from the outer side to the inner side of the lower bearing 67 (e.g., circular holes corresponding to the oil holes 62A or oblong holes corresponding to the oil holes 68A) are formed in the lower bearing 67, and an appropriate bearing filter is arranged to cover the inlets or outlets of these oil holes of the lower bearing 67. Further, oil passages for distributing the engine oil 41 that has flown out from the partition-wall-side bearing portion 24A to the oil holes of the lower bearing 67 are formed in one or more of the upper bearing 61, the lower bearing 67, the partition-wall-side bearing portion 24A, and the cap-side bearing portion 25A as needed.

While the inlets or outlets of the respective oil holes are covered by a single bearing filter in the sixth to eleventh exemplary embodiments described above, the inlets or outlets of the oil holes may be covered by separate bearing filters.

While a single bearing filter is attached to the upper bearing 61 such that only one of the inlet and outlet of each oil hole is covered by the bearing filter in the sixth to eleventh exemplary embodiments, two or more bearing filters may be attached to the upper bearing 61 such that the inlet and outlet of each oil hole are both covered by the bearing filters.

The methods for fixing the filter of the crank bearing 6 to the upper bearing 61 or to the lower bearing 67 is not limited to those described above in the respective exemplary embodiments, but they may be changed as needed.

In the respective exemplary embodiments described above, the mesh size of the net is smaller than the diameters of foreign particles that pass through the oil filter 44 and enter the engine oil passage 26 (refer to FIG. 10) together with the engine oil 41. The mesh size of each net, however, may be changed according to the size of foreign particles that need to be trapped before they enter between the bearing inner peripheral face 6A and the journal outer peripheral face 51F. For example, in the case where the crank bearing 6 is used in an engine that tolerates extremely small foreign particles to enter between the bearing inner peripheral face 6A and the journal outer peripheral face 51F, the mesh size of the net may be set such that that large foreign particles that are not allowed to enter between the bearing inner peripheral face 6A and the journal outer peripheral face 51F are trapped at the net but extremely small foreign particles can pass through it.

While the bearing filter is provided at least on the upper bearing 61 in the respective exemplary embodiments, the bearing filter may be provided only on the lower bearing 67. In this case, the oil holes that are formed in the upper bearing 61 to distribute the engine oil 41 from the outer side to the inner side of the upper bearing 61 are omitted. Instead, at least one oil hole is formed in the lower bearing 67 to distribute the engine oil 41 from the outer side to the inner side of the lower bearing 67, and a bearing filter is arranged to cover the inlet or outlet of the oil hole of the lower bearing 67. Further, an oil groove is formed in the inner peripheral face of the lower bearing 67 to distribute the engine oil 41 to the inside of the crank journal 51. Further, an oil groove for distributing the engine oil 41 from the outer side of the lower bearing 67 into the oil hole of the lower bearing 67 is formed in at least one of the upper bearing 61, the lower bearing 67, the partition-wall-side bearing portion 24A, and the cap-side bearing portion 25A.

The structures that are employed in the respective exemplary embodiments to filter the engine oil 41 and the structures that are employed in the respective exemplary embodiments to trap foreign particles before they enter between the bearing inner peripheral face 6A and the journal outer peripheral face 51F may be incorporated in various combinations.

In the respective exemplary embodiments, the invention has been embodied as the crank bearing of the engine 1. Applications of the invention are not limited to bearings for crankshafts. Namely, the invention may be applied to any bearing in various forms corresponding to or based on those described in the foregoing exemplary embodiments, provided that the bearing supports a shaft via lubrication oil that is externally supplied thereto.

The invention claimed is:

1. A plain bearing comprising:
a bearing body that supports a shaft via lubrication oil; and
at least one filter that is provided on the bearing body for filtering the lubrication oil, the filter having a fixing portion via which the filter is fixed to the bearing body, the fixing portion contacting an outer peripheral surface of the bearing body when the fixing portion is fixed to the bearing body.

2. The plain bearing according to claim 1, wherein the lubrication oil is filtered by the filter before flowing into between the inner peripheral face of the bearing body and the outer peripheral face of the shaft.

3. The plain bearing according to claim 1, wherein
the bearing body has at least one bearing-body oil passage that is formed to distribute the lubrication oil from the outer side of the bearing body to the inner side of the bearing body,
the filter has a filtering portion that filters the lubrication oil, and
the lubrication oil flows into between the inner peripheral face of the bearing body and the outer peripheral face of the shaft via the bearing-body oil passage and the filtering portion of the filter.

4. The plain bearing according to claim 3, wherein
the bearing body has at least one oil-passage outlet which is an outlet of the bearing-body oil passage and which opens toward the inner side of the bearing body, and the lubrication oil, after passing through the oil-passage outlet, flows into between the inner peripheral face of the bearing body and the outer peripheral face of the shaft via the filtering portion of the filter.

5. The plain bearing according to claim 4, wherein
the bearing body has an inner groove that opens toward the inner side of the bearing body, and
the lubrication oil, after passing through the oil-passage outlet, flows into between the inner peripheral face of the bearing body and the outer peripheral face of the shaft via the inner groove.

6. The plain bearing according to claim 5, wherein
the filter is arranged in the inner groove.

7. The plain bearing according to claim 5, wherein
faces of the bearing body that define the inner groove include a pair of side faces of the inner groove opposite each other across a space and a bottom face of the inner groove that connects the side faces, and
the filtering portion of the filter has side walls, each of which is opposite the corresponding side face of the inner groove and a peripheral wall opposite the bottom face of the inner groove.

8. The plain bearing according to claim 4, wherein
the bearing body is provided with a plurality of the oil-passage outlets, and
the lubrication oil, after passing through the plurality of oil-passage outlets, flows into between the inner peripheral face of the bearing body and the outer peripheral face of the shaft via the filtering portion of the filter.

9. The plain bearing according claim 4, wherein
the oil passage outlet is an opening having an oblong shape, and
the filtering portion of the filter covers the oil passage outlet.

10. The plain bearing according to claim 4, wherein
the filtering area of the filtering portion of the filter is larger than the passage area of the oil passage outlet.

11. The plain bearing according to claim 10, wherein
where a cross section of the oil passage outlet that is perpendicular to the flow direction of the lubrication oil is a reference cross section, an area in which the oil passage outlet overlaps with the reference cross section is substantially equal to the passage area of the oil passage outlet.

12. The plain bearing according to claim 10, wherein
where the flow direction of the lubrication oil flowing through the oil passage outlet is a reference direction, a plane perpendicular to the reference direction is a reference plane, and a figure obtained by projecting the oil passage outlet onto the reference plane in the reference direction is an outlet figure, the area of the outlet figure is substantially equal to the passage area of the oil passage outlet.

13. The plain bearing according to claim 3, wherein
the bearing body has at least one oil-passage inlet which is an inlet of the bearing-body oil passage and which opens toward the outer side of the bearing body, and
the lubrication oil, after passing through the filtering portion of the filter, flows into between the inner peripheral face of the bearing body and the outer peripheral face of the shaft via the oil-passage inlet.

14. The plain bearing according to claim 13, wherein
the bearing body has an outer groove that opens toward the outer side of the bearing body, and
the lubrication oil, after passing through the outer groove, flows into between the inner peripheral face of the bearing body and the outer peripheral face of the shaft via the oil-passage inlet.

15. The plain bearing according to claim 14, wherein
the outer groove provides a space between the filtering portion of the filter and the bearing body.

16. The plain bearing according to claim 14, wherein
faces of the bearing body that define the outer groove include a pair of side faces of the outer groove opposite each other across a space and a bottom face of the outer groove that connects the side faces, and
the filtering portion of the filter has side walls, each of which is opposite the corresponding side face of the outer groove and a peripheral wall opposite the bottom face of the outer groove.

17. The plain bearing according to claim 13, wherein
the bearing body is provided with a plurality of the oil-passage inlets, and
the lubrication oil, after passing through the filtering portion of the filter, flows into between the inner peripheral face of the bearing body and the outer peripheral face of the shaft via the plurality of oil-passage inlets.

18. The plain bearing according to claim 13, wherein
the oil-passage inlet is an opening having an oblong shape, and
the filtering portion of the filter covers the oil-passage inlet.

19. The plain bearing according to claim 13, wherein
the filtering area of the filtering portion is larger than the passage area of the oil-passage inlet.

20. The plain bearing according to claim 19, wherein
where a cross section of the oil-passage inlet that is perpendicular to the flow direction of the lubrication oil is a reference cross section, an area in which the oil-passage inlet overlaps with the reference cross section is substantially equal to the passage area of the oil-passage inlet.

21. The plain bearing according to claim 19, wherein
where the flow direction of the lubrication oil flowing through the oil-passage inlet is a reference direction, a plane perpendicular to the reference direction is a reference plane, and a figure obtained by projecting the oil-passage inlet onto the reference plane in the reference direction is an inlet figure, the area of the inlet figure is substantially equal to the passage area of the oil-passage inlet.

22. The plain bearing according to claim 3, wherein
a space is provided between the filtering portion of the filter and the bearing body.

23. The plain bearing according to claim 3, wherein
the bearing body has at least one oil-passage inlet which is an inlet of the bearing-body oil passage and which opens toward the outer side of the bearing body and at least one oil-passage outlet which is an outlet of the bearing-body oil passage and which opens toward the inner side of the bearing body, and
the filtering portion of the filter is arranged between the oil-passage inlet and the oil passage outlet.

24. The plain bearing according to claim 1, wherein
the lubrication oil is supplied to the outer side of the bearing body via an oil passage formed in a structure that is provided with the shaft, and
the filter traps foreign particles in the oil passage formed in the structure.

25. The plain bearing according to claim 1, wherein
the shaft is a rotational shaft of an engine.

26. The plain bearing according to claim 25, wherein
the engine is configured such that a crankshaft, which is the rotational shaft, is supported by a bearing portion provided in a cylinder block of the engine and an auxiliary member that is attached to the bearing portion, and
the plain bearing is constituted of the bearing body, having a semi-circular shape, that is attached to the bearing portion of the cylinder block and an auxiliary bearing, having a semi-circular shape, that is attached to the auxiliary member.

27. The plain bearing according to claim 26, wherein
the engine is configured such that the lubrication oil that has been discharged from an oil pump flows to the bearing portion of the cylinder block via an oil filter, and
the filter traps foreign particles that pass through the oil filter and enter the bearing portion of the cylinder block together with the lubrication oil.

28. The plain bearing according to claim 26, wherein the filter has a lower body portion that extends from the fixing portion, the lower body portion extending within a bearing-body oil passage formed in the bearing body.

29. The plain bearing according to claim 26, wherein the fixing portion is formed as a flange.

30. The plain bearing according to claim 25, wherein
the engine is configured such that a crankshaft, which is the rotational shaft, is supported by a bearing portion provided in a cylinder block of the engine and an auxiliary member that is attached to the bearing portion, and
the plain bearing is constituted of the bearing body, having a semi-circular shape, that is attached to the auxiliary member and an auxiliary bearing, having a semi-circular shape, that is attached to the bearing portion of the cylinder block.

31. The plain bearing according to claim 25, wherein
the engine is configured such that a crankshaft, which is the rotational shaft, is supported by a bearing portion provided in a cylinder block of the engine and an auxiliary member that is attached to the bearing portion, and
the bearing body is constituted of a first bearing body, having a semi-circular shape, that is attached to the bearing portion of the cylinder block and a second bearing body, having a semi-circular shape, that is attached to the auxiliary member.

* * * * *